United States Patent
Hato

(10) Patent No.: US 10,229,543 B2
(45) Date of Patent: Mar. 12, 2019

(54) INFORMATION PROCESSING DEVICE, INFORMATION SUPERIMPOSED IMAGE DISPLAY DEVICE, NON-TRANSITORY COMPUTER READABLE MEDIUM RECORDED WITH MARKER DISPLAY PROGRAM, NON-TRANSITORY COMPUTER READABLE MEDIUM RECORDED WITH INFORMATION SUPERIMPOSED IMAGE DISPLAY PROGRAM, MARKER DISPLAY METHOD, AND INFORMATION-SUPERIMPOSED IMAGE DISPLAY METHOD

(71) Applicant: Mitsubishi Electric Corporation, Tokyo (JP)

(72) Inventor: Jumpei Hato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 83 days.

(21) Appl. No.: 15/311,809

(22) PCT Filed: Jun. 13, 2014

(86) PCT No.: PCT/JP2014/065685
§ 371 (c)(1),
(2) Date: Nov. 16, 2016

(87) PCT Pub. No.: WO2015/189973
PCT Pub. Date: Dec. 17, 2015

(65) Prior Publication Data
US 2017/0092010 A1 Mar. 30, 2017

(51) Int. Cl.
*G06T 19/00* (2011.01)
*G06T 11/00* (2006.01)

(52) U.S. Cl.
CPC .......... *G06T 19/006* (2013.01); *G06T 11/001* (2013.01)

(58) Field of Classification Search
CPC ........................... G06T 19/006; G06T 11/001
See application file for complete search history.

(56) References Cited

U.S. PATENT DOCUMENTS 9,424,765 B2  8/2016 Sato et al.
9,613,448 B1 * 4/2017 Margolin ................ G06T 11/60
(Continued)

FOREIGN PATENT DOCUMENTS

CN   101262586 A   9/2008
CN   101510928 A   8/2009
(Continued)

OTHER PUBLICATIONS

U.S. Office Action issued in corresponding U.S. Appl. No. 15/311,812 dated May 30, 2018.
(Continued)

*Primary Examiner* — Maurice L. McDowell, Jr.
(74) *Attorney, Agent, or Firm* — Birch, Stewart, Kolasch & Birch, LLP

(57) ABSTRACT

An information processing device displays a marker serving as a sign for a display area, to the display area. An AR device detects the marker from a photographic image showing the information processing device, and selects the display area of the information processing device from the photographic image based on the detected marker. The AR device displays an AR image by superimposing an information illustration over the photographic image to avoid the display area of the information processing device. AR is an abbreviation of augmented reality.

17 Claims, 47 Drawing Sheets

(56) References Cited

U.S. PATENT DOCUMENTS

| | | | |
|---|---|---|---|
| 2004/0070611 A1 | 4/2004 | Tanaka et al. | |
| 2005/0234333 A1* | 10/2005 | Takemoto | G02B 27/017 |
| | | | 600/426 |
| 2008/0222233 A1 | 9/2008 | Shi et al. | |
| 2009/0204923 A1 | 8/2009 | Tachibana | |
| 2011/0029903 A1 | 2/2011 | Schooleman et al. | |
| 2011/0187731 A1 | 8/2011 | Tsuchida | |
| 2011/0304646 A1 | 12/2011 | Kato | |
| 2012/0140040 A1 | 6/2012 | Sakurai et al. | |
| 2013/0222424 A1 | 8/2013 | Morinaga et al. | |
| 2013/0222425 A1 | 8/2013 | Kato | |
| 2015/0161923 A1* | 6/2015 | Saga | G09F 27/00 |
| | | | 348/383 |

FOREIGN PATENT DOCUMENTS

| | | | |
|---|---|---|---|
| CN | 102047199 A | 5/2011 | |
| CN | 102292978 A | 12/2011 | |
| CN | 103189899 A | 7/2013 | |
| JP | 2003-140832 A | 5/2003 | |
| JP | 2004-178554 A | 6/2004 | |
| JP | 2005-267094 A | 9/2005 | |
| JP | 2006-155238 A | 6/2006 | |
| JP | 2006-267604 A | 10/2006 | |
| JP | 2011-71746 A | 4/2011 | |
| JP | 2011-258120 A | 12/2011 | |
| JP | 2012-3598 A | 1/2012 | |
| JP | 2012-123546 A | 6/2012 | |
| JP | 2013-127509 A | 6/2013 | |
| JP | 2013-130930 A | 7/2013 | |
| JP | 2013-210793 A | 10/2013 | |
| WO | WO 2011/004612 A1 | 1/2011 | |

OTHER PUBLICATIONS

Office Action dated Jul. 26, 2018 in corresponding Chinese Patent Application No. 201480079673.9.

* cited by examiner

INFORMATION PROCESSING DEVICE, INFORMATION SUPERIMPOSED IMAGE DISPLAY DEVICE, NON-TRANSITORY COMPUTER READABLE MEDIUM RECORDED WITH MARKER DISPLAY PROGRAM, NON-TRANSITORY COMPUTER READABLE MEDIUM RECORDED WITH INFORMATION SUPERIMPOSED IMAGE DISPLAY PROGRAM, MARKER DISPLAY METHOD, AND INFORMATION-SUPERIMPOSED IMAGE DISPLAY METHOD

TECHNICAL FIELD

The present invention relates to a technique for displaying information by superimposing the information over a photographic image.

BACKGROUND ART

An AR technology has been prevailing which superimposes and displays CG generated by a computer over the real word or an image that reflects the real world. CG is an abbreviation of computer graphics and AR is an abbreviation of augmented reality.

For example, a method is available which projects CG from a projector over a building existing in a direction in which the user faces. Also, a method is available which superimposes and displays CG when an image photographed by a camera provided to an information terminal such as a smart phone, a tablet-type terminal, or a wearable terminal is to be displayed on the screen of the information terminal.

These techniques can be used in usages such as a tourist assistance system which displays information explaining a neighboring building to a tourist and a navigation system which displays a route to a destination by CG.

When CG is superimposed and displayed over the real world, part of the real world existing in the portion where the CG is superimposed and displayed cannot be seen or is difficult to see. This situation will not pose a problem if the real world corresponding to the CG superimposed portion need not be seen, but will become an issue in terms of usability if the real world is to be seen.

A display device which transmits information useful to the user exists in the real word, other than an information processing terminal which superimposes and displays CG by the AR technology. Therefore, if CG is superimposed and displayed over a portion where a display device is displayed, information transmitted by the display device will be blocked, and the profit of the user will be impaired.

Patent Literature 1 discloses a technique which, by specifying a CG excluding area where CG will not be superimposed and displayed, prevents CG from being superimposed and displayed over the CG excluding area.

Note that the user must clearly specify the CG excluding area by using a CG excluding frame or an electronic pen, or with his or her own hands.

This requires a labor for adjusting the position and size of the CG excluding area. Also, as the CG will not be superimposed and displayed on the CG excluding area, the CG to be superimposed and displayed is likely to be missed partly. If the CG excluding area is larger than needed, it is likely that the CG is not displayed at all. As a result, information will not be transmitted effectively.

When CG is superimposed and displayed on the display device, it is difficult for the user to recognize information displayed on the display device.

CITATION LIST

Patent Literature

Patent Literature 1: JP 2004-178554

Non-Patent Literature

Non-Patent Literature 1: Yasushi KANAZAWA, "Measurement of Obstacles on Road by Mobile Monocular Camera", [online], Jul. 10, 2012, [retrieved on Apr. 7, 2014], Internet (URL:http://jstshingi.jp/abst/p/12/1216/toyohashi04.pdf)

SUMMARY OF INVENTION

Technical Problem

The present invention has as its objective to enable superimposing and displaying information over a photographic image without concealing the display area of a display device shown on the photographic image.

Solution to Problem

An information processing device according to the present invention includes a marker display unit to display in a display area of a display device, a marker which is determined to cause a computer having acquired a photographic image showing the display device having the display area, to select the display area from the photographic image.

Advantageous Effects of Invention

According to the present invention, the display area of a display device shown on the photographic image can be selected based on a marker displayed in the display area.

As the display area of the display device shown on the photographic image can be selected, information can be superimposed and displayed over a photographic image without concealing the display area of the display device shown on the photographic image.

DESCRIPTION OF EMBODIMENTS

Embodiment 1.

An embodiment will be described in which information is superimposed and displayed over a photographic image without concealing the display area of a display device shown on the photographic image.

Figure 1:
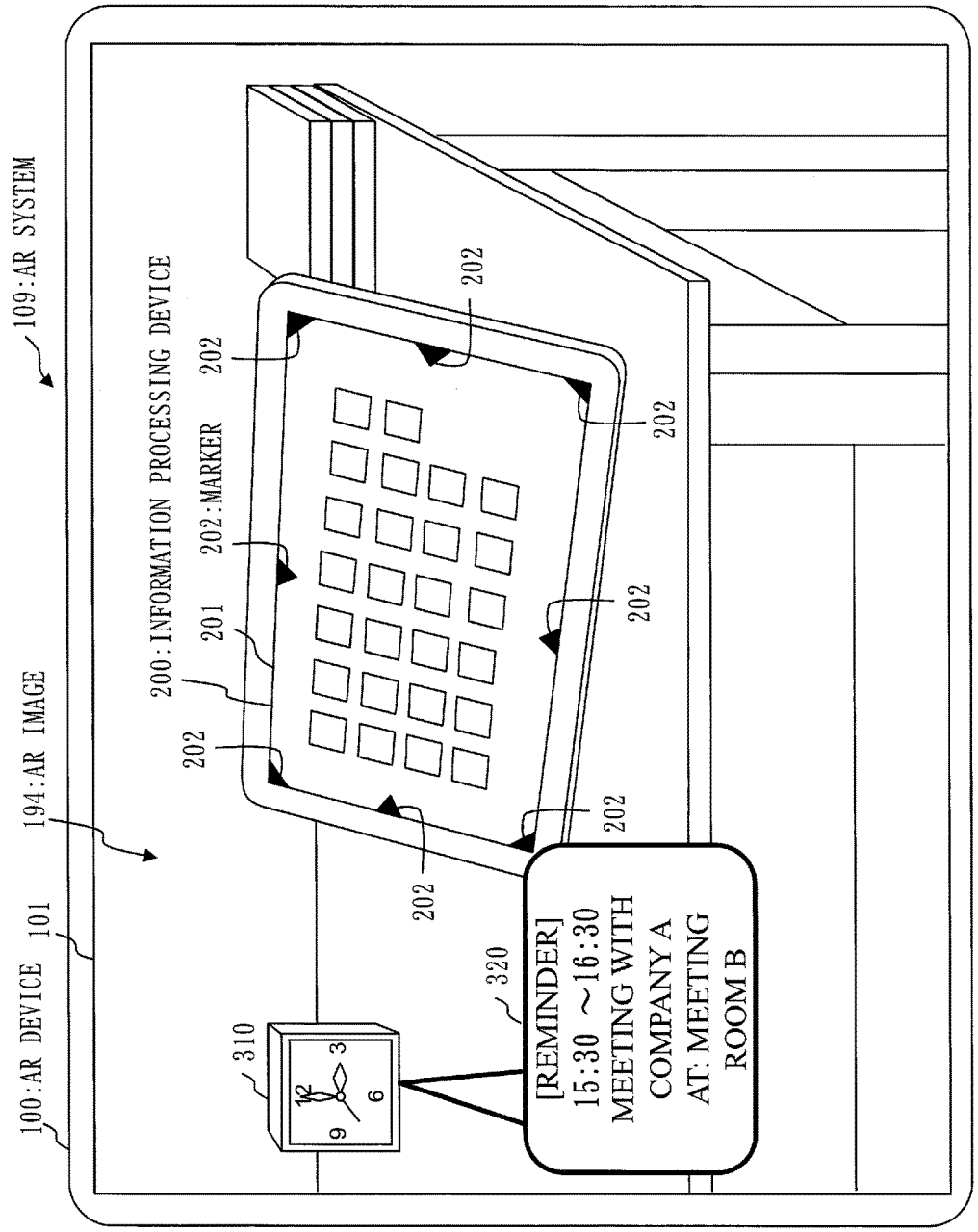
FIG. 1 is a schematic diagram of an AR system 109 according to Embodiment 1.

FIG. 1 is a schematic diagram of an AR system 109 according to Embodiment 1. AR is an abbreviation of Augmented Reality.

The outline of the AR system 109 according to Embodiment 1 will be described with referring to FIG. 1.

The AR system 109 (an example of an information superimposed image display system) is a system that displays an AR image 194. The AR image 194 is an information superimposed image in which information is superimposed over a photographic image. Information to be superimposed over a photographic image will be referred to as superimposing image hereinafter.

The AR system 109 is provided with an AR device 100 (an example of an information superimposed image display device) and an information processing device 200.

The information processing device 200 is provided with a display device. The display device may be connected to the information processing device 200 via a cable or the like. A tablet-type computer, a smart phone, and a desktop computer are examples of the information processing device 200. A display device provided to the information processing device 200 will be called a display device or an information processing display device hereinafter.

The information processing display device is photographed by a camera provided to the AR device 100.

The information processing device 200 displays markers 202 in a display area 201 of the information processing display device.

The markers 202 are illustrations determined as signs that allow the AR device 100 having acquired a photographic image on which the information processing display device is shown, to select the display area 201 from the photographic image.

The AR device 100 is provided with a camera which generates a photographic image and a display device which displays the AR image 194. The camera and display device may be connected to the AR device 100 via cables or the like. A tablet-type computer, a smart phone, and a desktop computer are examples of the AR device 100. The display device provided to the AR device 100 will be called display device or AR display device hereinafter.

The AR device 100 selects an unusable area based on the markers 202 shown on the photographic image. The unusable area is an image area that shows the display area 201 of the information processing display device.

The AR device 100 generates the AR image 194 by superimposing an information illustration 320 over the photographic image to avoid the display area 201 of the information processing device. The information illustration 320 is an illustration that describes superimposing information. Schedule information related to the time indicated by a clock 310 shown in the photographic image is an example of the superimposing information.

The AR device 100 displays the AR image 194 in a display area 101 of the AR display device.

The AR device 100 will be described in detail in another embodiment.

Figure 2:
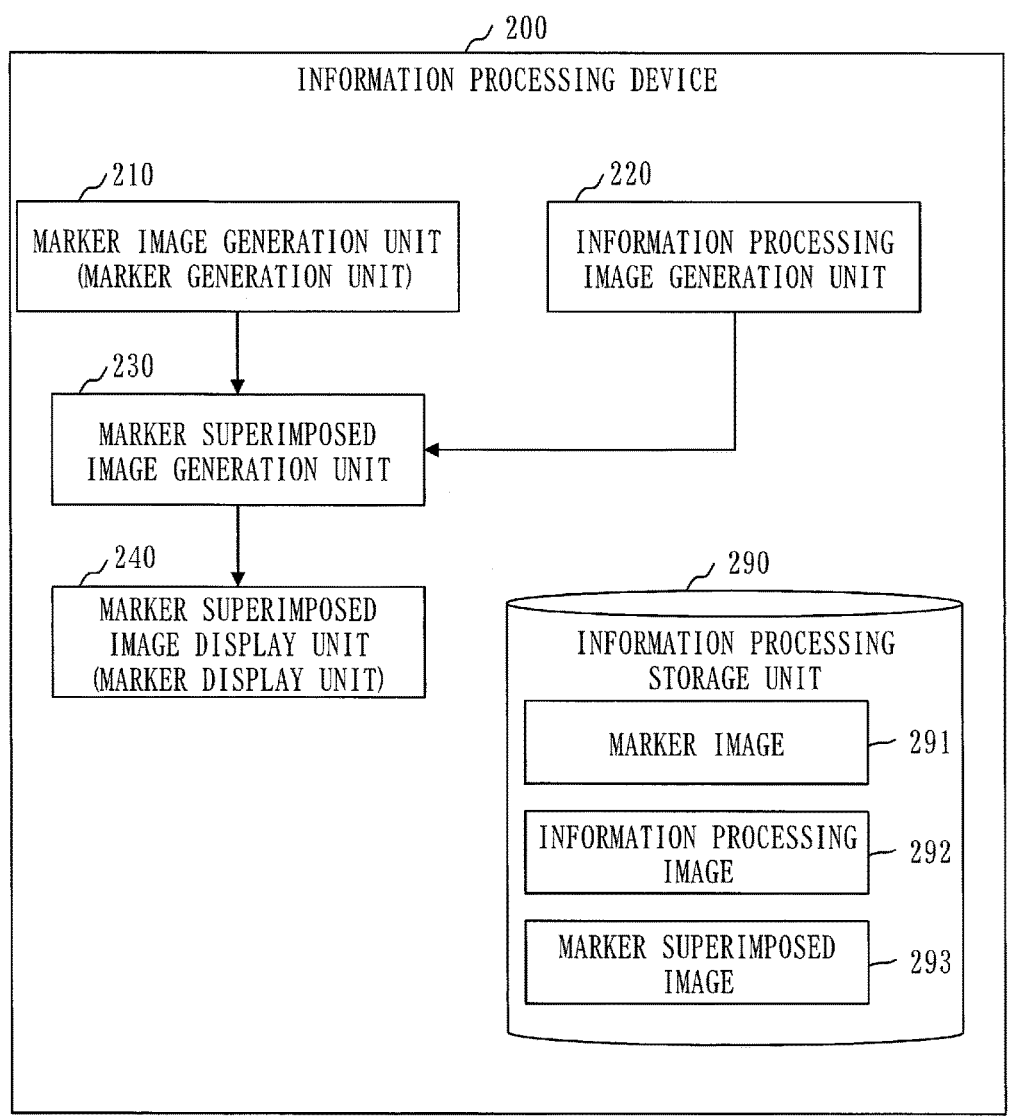
FIG. 2 is a functional configuration diagram of an information processing device 200 according to Embodiment 1.

FIG. 2 is a functional configuration diagram of the information processing device 200 according to Embodiment 1.

The functional configuration of the information processing device 200 according to Embodiment 1 will be described with referring to FIG. 2. The functional configuration of the information processing device 200 may be different from that of FIG. 2.

The information processing device 200 is provided with a marker image generation unit 210 (example of a marker generation unit), an information processing image generation unit 220, a marker superimposed image generation unit 230, a marker superimposed image display unit 240 (example of a marker display unit), and an information processing storage unit 290.

The marker image generation unit 210 generates a marker image 291 indicating the markers 202 being the signs for the display area 201.

The information processing image generation unit 220 generates an information processing image 292 to be displayed in the display area 201. The start screen of the information processing device 200, the menu screen of the information processing device 200, or an image indicating a window for an application program is an example of the information processing image 292.

The marker superimposed image generation unit 230 generates a marker superimposed image 293 in which the markers 202 are superimposed over the information processing image 292.

The marker superimposed image display unit 240 displays the marker superimposed image 293 to the display area 201.

The information processing storage unit 290 stores data which the information processing device 200 is to use, generate, or takes as input, or outputs.

For example, the information processing storage unit 290 stores the marker image 291, the information processing image 292, the marker superimposed image 293, and so on.

The functional configuration of the AR device 100 will be described in another embodiment.

Figure 3:
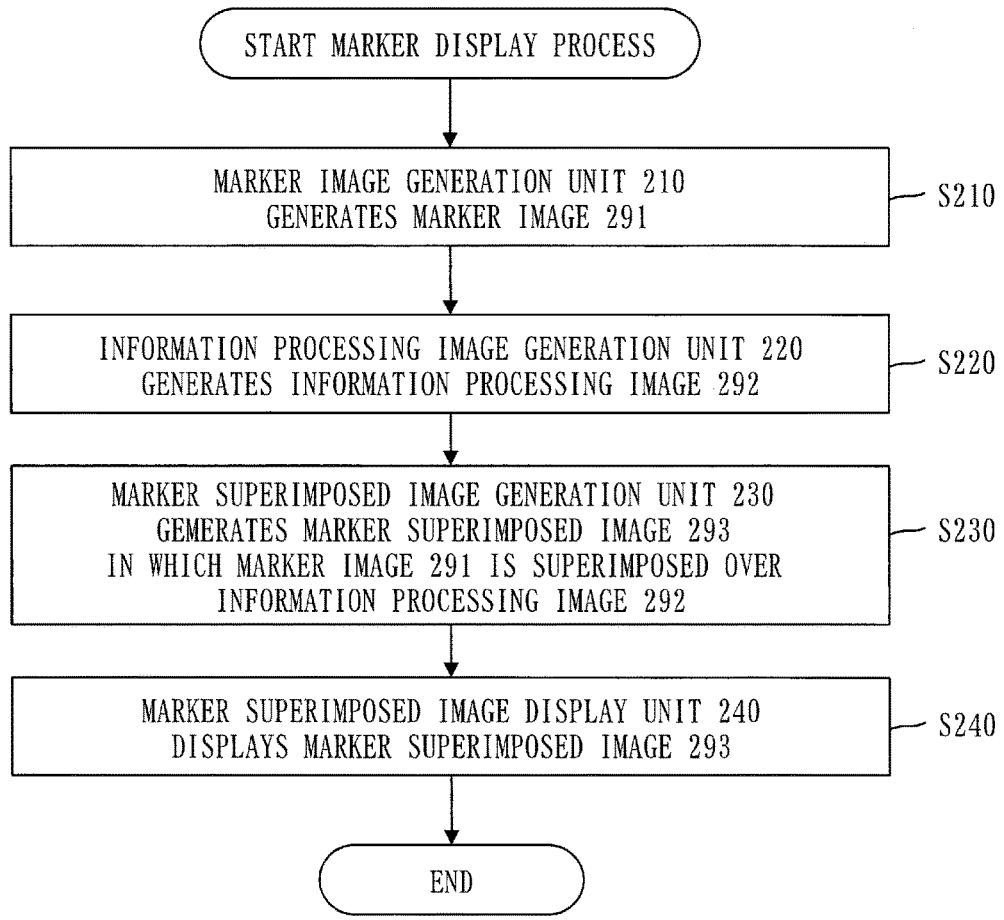
FIG. 3 is a flowchart illustrating a marker display process of the information processing device 200 according to Embodiment 1.

FIG. 3 is a flowchart illustrating a marker display process of the information processing device 200 according to Embodiment 1.

The marker display process of the information processing device 200 according to Embodiment 1 will be described with referring to FIG. 3. The marker display process may be different from that illustrated in FIG. 3.

In S210, the marker image generation unit 210 generates the marker image 291 indicating the markers 202 being the signs for the display area 201.

After S210, the process proceeds to S220.

FIGS. 4, 5, 6, and 7 are diagrams illustrating examples of the marker image 291 according to Embodiment 1.

Figure 4:
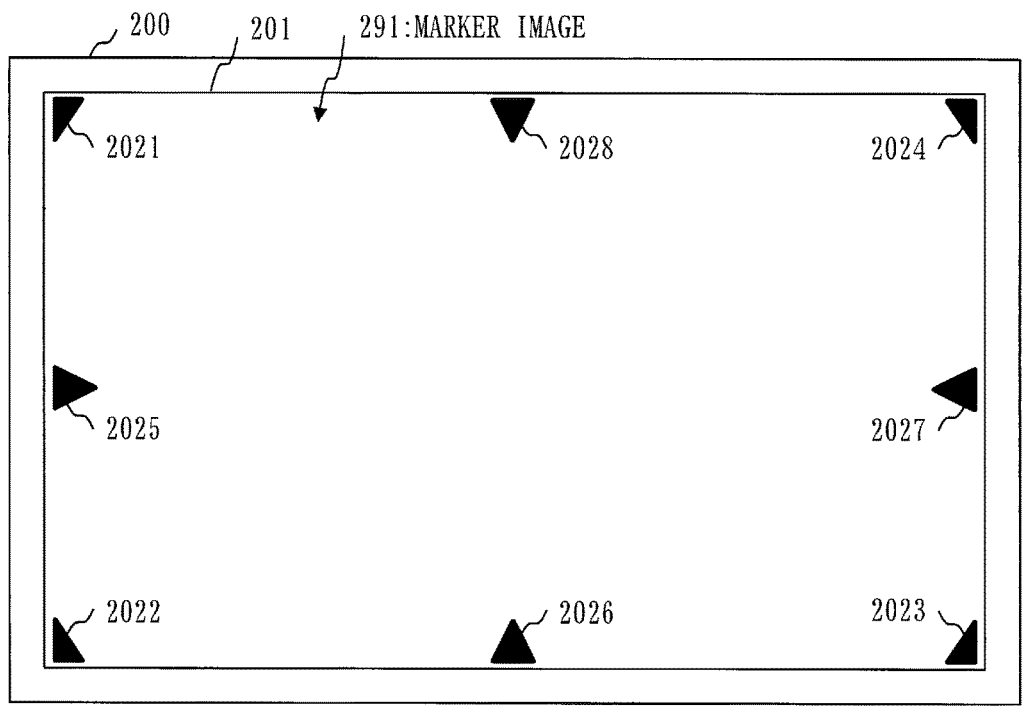
FIG. 4 is a diagram illustrating an example of a marker image 291 according to Embodiment 1.

Referring to FIG. 4, the marker image generation unit 210 generates the marker image 291 to be displayed in the rectangular display area 201. The shape of the display area 201 is not limited to rectangle. The shape of the display area 201 may be a polygon other than a rectangle, or a circle.

The marker image 291 involves eight markers consisting of markers 2021 to 2024 (examples of a corner marker) arranged at the corners of the display area 201 and markers 2025 to 2028 (examples of a side marker) arranged at the intermediate portions of the individual sides of the display area 201.

The display area 201 is specified by the eight markers 2021 to 2028. The display area 201 is an area surrounded by a rectangular frame that encloses the eight markers 2021 to 2028 to be in contact with the eight markers 2021 to 2028. Namely, the display area 201 is an area surrounded by the minimum rectangular frame that encloses the eight markers 2021 to 2028.

The marker image 291 need not involve all of the eight markers 2021 to 2028 but may involve one or a plurality of markers out of the eight markers 2021 to 2028. With one marker, the direction in which the central portion of the display area 201 exists can be specified.

The marker image 291 may involve nine markers or more.

For example, the marker image generation unit 210 determines the number and positions of the markers based on the size of the display area 201. The larger the display area 201, the more markers are involved in the marker image 291. The size of the display area 201 is determined based on the display size and resolution of the information processing display device. The marker image generation unit 210 may determine the number and positions of the markers based on the shape of the display area 201.

The marker image 291 may include a plurality of markers at the intermediate portion of a side having a length larger than the length threshold. For example, the marker image 291 may include two markers 2026 and two markers 2028.

By increasing the number of markers involved in the marker image 291, the display area 201 can be specified more accurately from the marker image 291.

Figure 5:
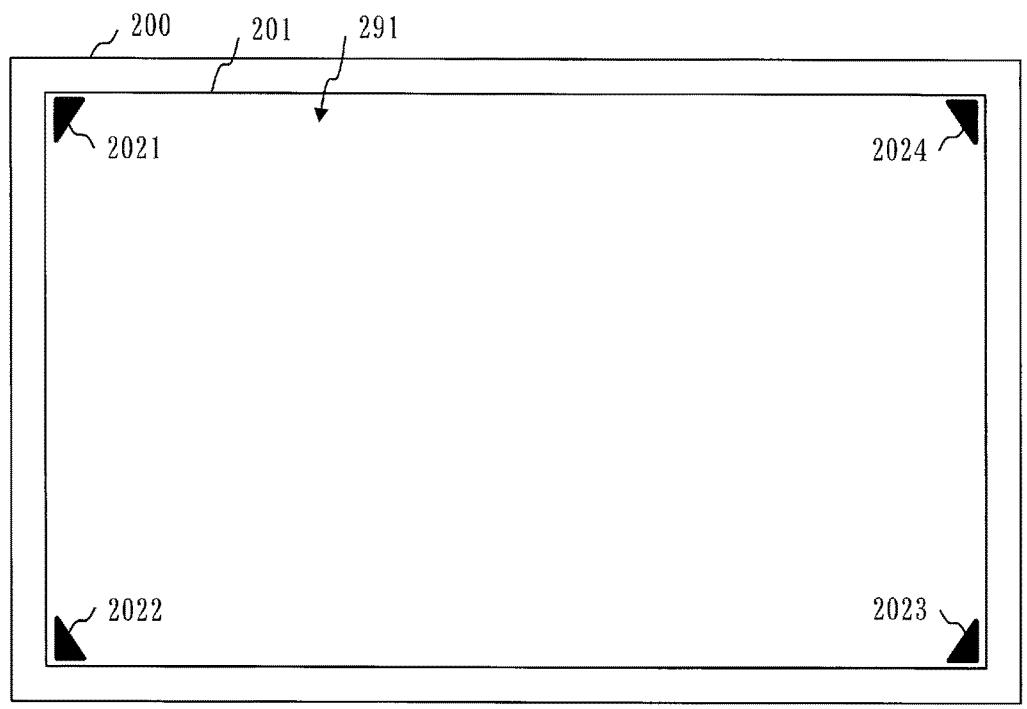
FIG. 5 is a diagram illustrating an example of the marker image 291 according to Embodiment 1.

Referring to FIG. 5, the marker image generation unit 210 generates a marker image 291 which involves four markers 2021 to 2024 arranged at the corners of the display area 201.

Figure 6:
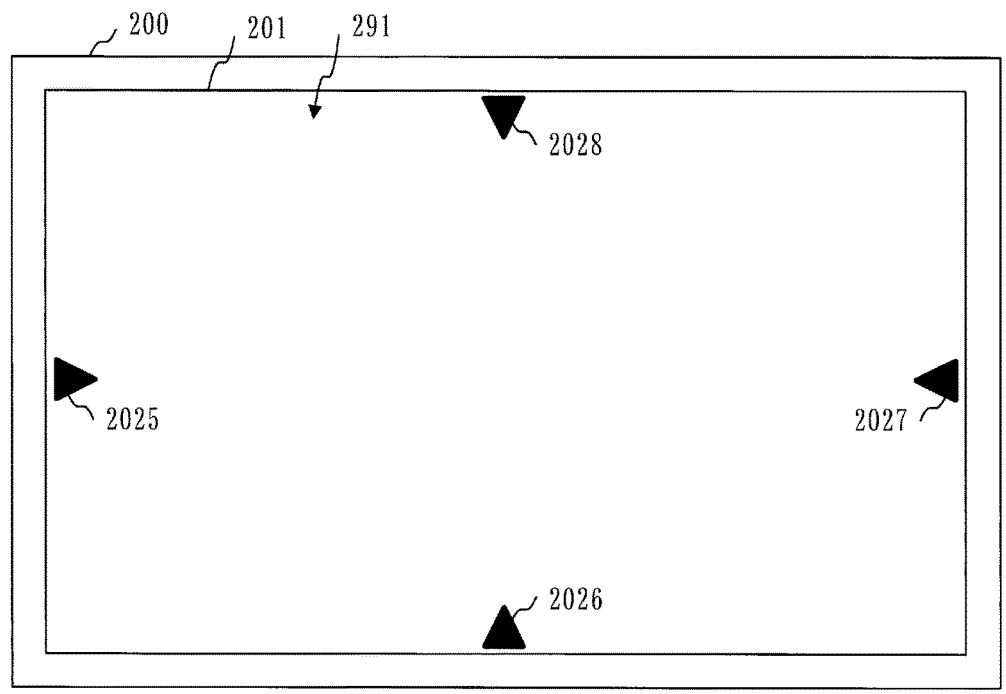
FIG. 6 is a diagram illustrating an example of the marker image 291 according to Embodiment 1.

Referring to FIG. 6, the marker image generation unit 210 generates a marker image 291 which involves four markers 2025 to 2028 arranged at the intermediate portions of the sides of the display area 201.

Figure 7:
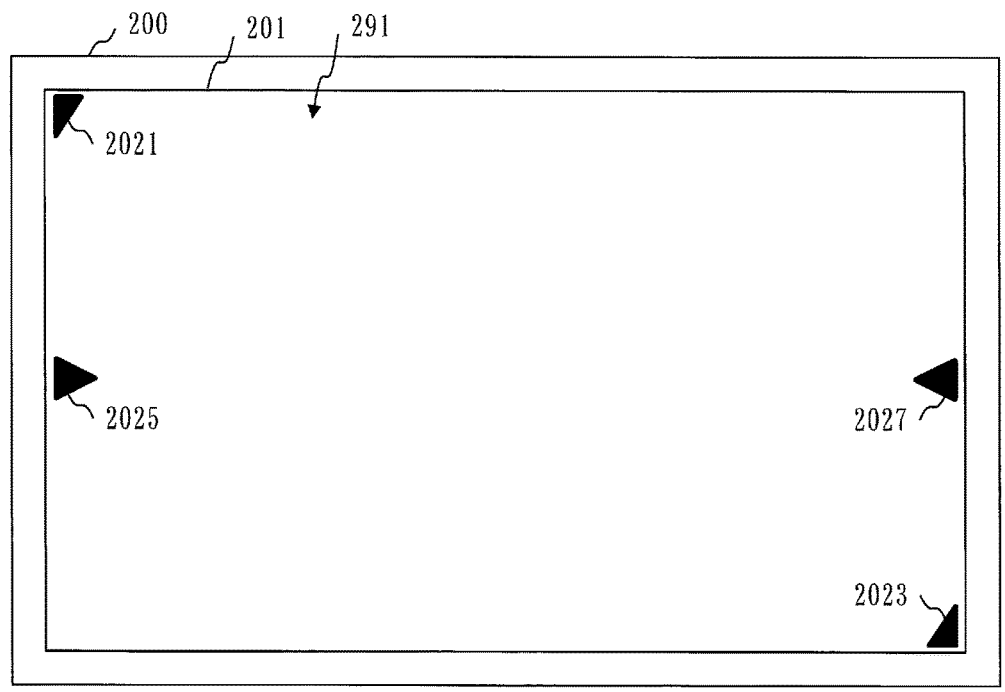
FIG. 7 is a diagram illustrating an example of the marker image 291 according to Embodiment 1.

Referring to FIG. 7, the marker image generation unit 210 generates a marker image 291 which involves a marker 2021 arranged at the upper left corner, a marker 2023 arranged at the lower right corner, a marker 2025 arranged at the intermediate portion of the left side, and a marker 2027 arranged at the intermediate portion of the right side.

In FIGS. 5 to 7, the display area 201 is specified by the four markers 202. The display area 201 is an area surrounded by a frame that encloses the four markers 202 to be in contact with the four markers 202. Namely, the display area 201 is an area surrounded by the minimum rectangular frame that encloses the four markers 202.

Figure 8:
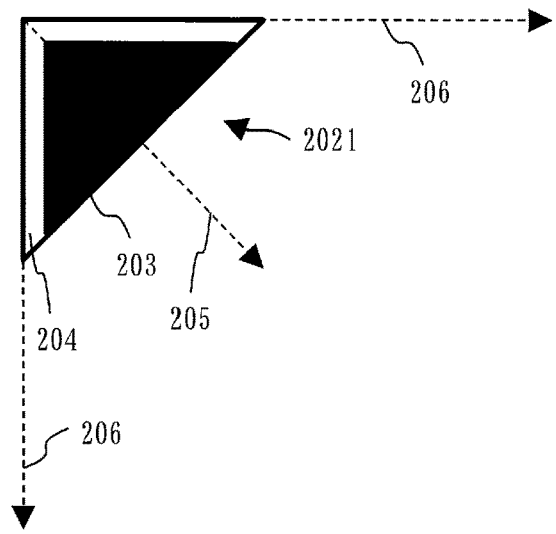
FIG. 8 is an enlarged diagram of a marker 2021 according to Embodiment 1.

FIG. 8 is an enlarged diagram of the marker 2021 according to Embodiment 1.

The marker 2021 according to Embodiment 1 will be described with referring to FIG. 8.

The marker 2021 forms a right-angled triangle.

The marker 2021 has a right-angled triangular black area 203 and an L-shaped white area 204 which is in contact with two sides that form the right angle of the black area 203.

The black area 203 indicates the direction where the central portion (a portion including the center) of the display area 201 is located. The central portion of the display area 201 is located in the direction of a perpendicular vector 205 that starts at the right-angled vertex of the marker 2021 as the origin and lies at the right angle to the hypotenuse of the black area 203. The perpendicular vector 205 is a vector extending through the right-angled vertex of the black area 203 and the central point of the hypotenuse of the black area 203.

The white area 204 indicates the sides of the display area 201, that is, the boundary lines of the display area 201. The boundary lines of the display area 201 are located on extension lines 206 being extensions of the sides of the white area 204, the extension line starting at the right-angled vertex of the marker 2021 as the origin.

The three other markers 2022 to 2024 arranged at the corners of the display area 201 have the same configuration as that of the marker 2021.

The marker 2022 is obtained by rotating the marker 2021 counterclockwise through 90 degrees.

The marker 2023 is obtained by rotating the marker 2021 clockwise through 180 degrees.

The marker 2024 is obtained by rotating the marker 2021 clockwise through 90 degrees.

Figure 9:
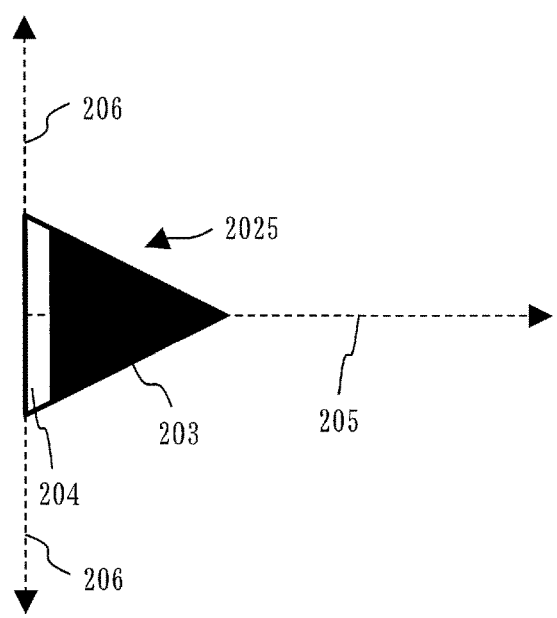
FIG. 9 is an enlarged diagram of a marker 2025 according to Embodiment 1.

FIG. 9 is an enlarged diagram of the marker 2025 according to Embodiment 1.

The marker 2025 according to Embodiment 1 will be described with referring to FIG. 9.

The marker 2025 forms an isosceles triangle.

The marker 2025 has an isosceles triangular black area 203 and a linear white area 204 which is in contact with the base of the black area 203.

The black area 203 indicates the direction where the central portion (a portion that includes the center) of the display area 201 is located. The central portion of the display area 201 is located in the direction of a perpendicular vector 205 that starts at the center of the base of the marker marker 2025 as the origin and lies at the right angle to the base of the black area 203. The perpendicular vector 205 is a vector extending through the central point of the base of the black area 203 and the vertex of the black area 203.

The white area 204 indicates the sides of the display area 201, that is, the boundary lines of the display area 201. The boundary lines of the display area 201 are located on extension lines 206 being extensions of the sides of the white area 204 including the base of the marker 2025.

The three other markers 2026 to 2028 arranged at the intermediate portions of the sides of the display area 201 have the same configuration as that of the marker 2025.

The marker 2026 is obtained by rotating the marker 2025 counterclockwise through 90 degrees.

The marker 2027 is obtained by rotating the marker 2025 clockwise through 180 degrees.

The marker 2028 is obtained by rotating the marker 2025 clockwise through 90 degrees.

The shapes of the markers 2021 to 2028 are not limited to rectangles. The shapes of the markers 2021 to 2028 may form polygons other than rectangles, or circles.

The black areas 203 of the markers 2021 to 2028 may be areas colored with colors other than black. The white areas 204 of the markers 2021 to 2028 may be areas colored with colors other than white.

The markers 2021 to 2028 may specify the display area 201 in accordance with a scheme other than the shape and color. For example, the markers 2021 to 2028 may be two-dimensional codes including information that specifies the display area 201.

Figure 10:
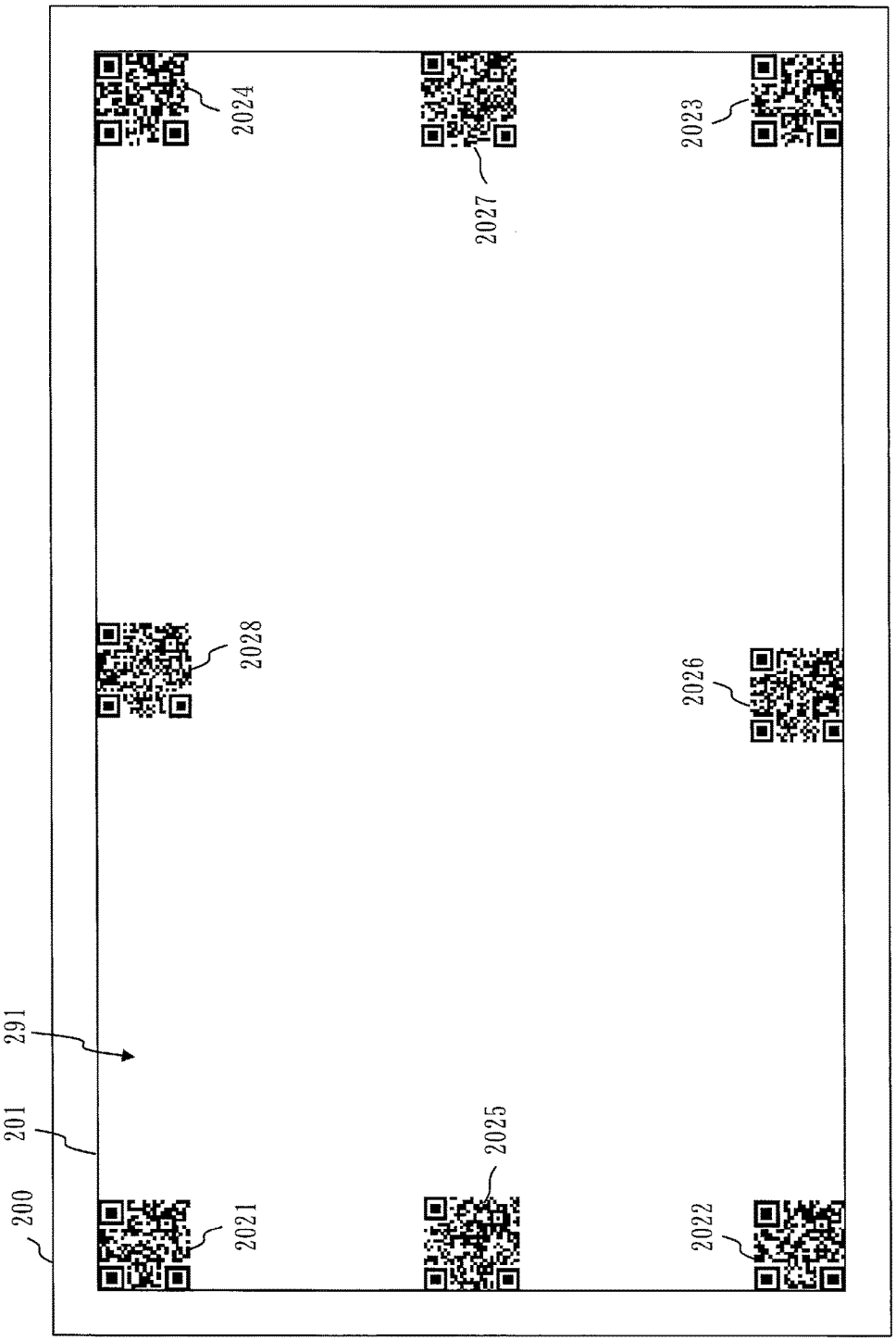
FIG. 10 is a diagram illustrating an example of the marker image 291 according to Embodiment 1.

FIG. 10 is a diagram illustrating an example of the marker image 291 according to Embodiment 1.

As illustrated in FIG. 10, the marker image 291 involves the markers 2021 to 2028 at the corners of the display area 201 and at the intermediate portions of the sides of the display area 201.

The markers 2021 to 2028 are two-dimensional codes including information that specifies the display area 201.

For example, the marker 2021 includes information "upper left" indicating that the marker 2021 is arranged at the upper left corner of the display area 201. Likewise, the markers 2022 to 2024 include information "lower left", "lower right", and "upper right", respectively.

For example, the marker 2025 includes information "left side" indicating that the marker 2025 is arranged at the intermediate portion of the left side of the display area 201. Likewise, the markers 2026 to 2028 include information "lower side", "right side", and "upper side", respectively.

As described above, the marker image 291 may include seven markers or less, or nine markers or more.

Figure 11:
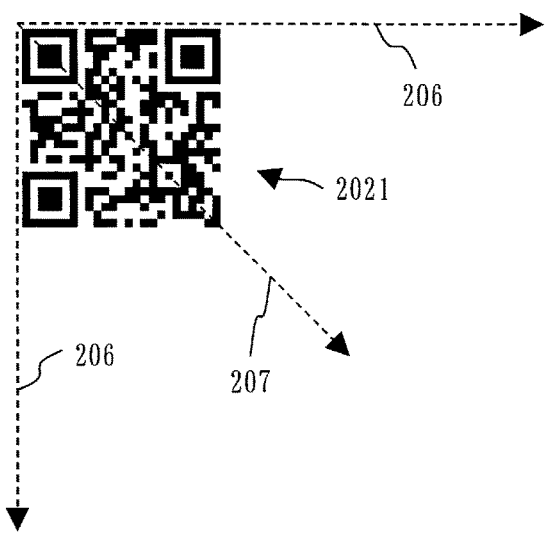
FIG. 11 is an enlarged diagram of the marker 2021 (two-dimensional code) according to Embodiment 1.

FIG. 11 is an enlarged diagram of the marker 2021 (two-dimensional code) according to Embodiment 1.

The marker 2021 (two-dimensional code) according to Embodiment 1 will be described with referring to FIG. 11.

The marker 2021 (an example of a corner marker) includes information "upper left" indicating that the marker 2021 is arranged at the upper left corner of the display area 201.

The central portion of the display area 201 is located in the direction of a diagonal vector 207 which starts at the upper left vertex of the marker 2021 as the origin and extends through the lower right vertex of the marker 2021.

The upper boundary line of the display area 201 is located on an extension line 206 being an extension of the upper side of the marker 2021, the extension line 206 starting at the upper left vertex of the marker 2021 as the origin.

The left boundary line of the display area 201 is located on an extension line 206 being an extension of the left side of the marker 2021, the extension line 206 starting at the upper left vertex of the marker 2021 as the origin.

The three other markers 2022 to 2024 arranged at the corners of the display area 201 specify the display area 201, in the same manner as the marker 2021 does.

More specifically, the central portion of the display area 201 is located in the direction of a diagonal vector extending from the lower left vertex of the marker 2022 through the upper right vertex of the marker 2022. Likewise, the central portion of the display area 201 is located in the direction of a diagonal vector extending from the lower right vertex of the marker 2023 through the upper left vertex of the marker 2023, and in the direction of a diagonal vector extending from the upper right vertex of the marker 2024 through the lower left vertex of the marker 2024.

Namely, the left boundary line of the display area 201 is located on an extension line being an extension of the left side of the marker 2022, the extension line starting at the lower left vertex of the marker 2022. The lower boundary line of the display area 201 is located on an extension line being an extension of the lower side of the marker 2022, the extension line starting at the lower left vertex of the marker 2022, and on an extension line being an extension of the lower side of the marker 2023, the extension line starting at the lower right vertex of the marker 2023. The right boundary line of the display area 201 is located on an extension line being an extension of the left side of the marker 2023, the extension line starting at the lower right vertex of the marker 2023, and on an extension line being an extension of the right side of the marker 2024, the extension line starting at the upper right vertex of the marker 2024. The upper boundary line of the display area 201 is located on an extension line being an extension of the upper side of the marker 2024, the extension line starting at the upper right vertex of the marker 2024.

Figure 12:
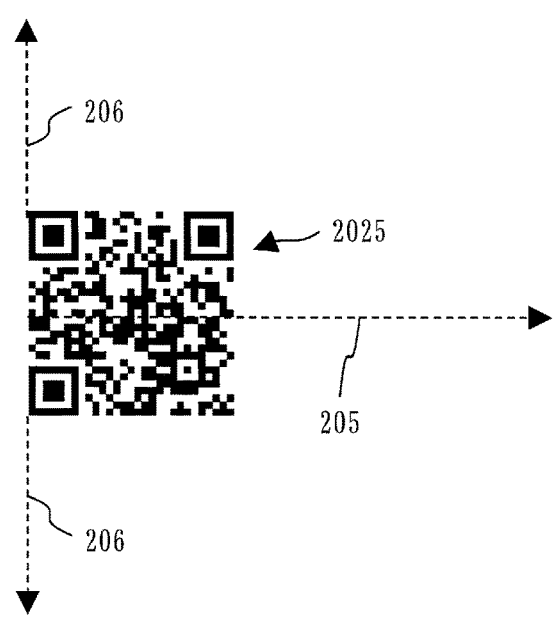
FIG. 12 is an enlarged diagram of the marker 2025 (two-dimensional code) according to Embodiment 1.

FIG. 12 is an enlarged diagram of the marker 2025 (two-dimensional code) according to Embodiment 1.

The marker 2025 according to Embodiment 1 will be described with referring to FIG. 12.

The marker 2025 (an example of a side marker) includes information "left side" indicating that the marker 2025 is arranged at the intermediate portion of the left side of the display area 201.

The central portion of the display area 201 is located in the direction of the perpendicular vector 205 that starts at the center of the left side of the marker 2025 as the origin and lies at the right angle to the right side of the marker 2025.

The left boundary line of the display area 201 is located on an extension line being an extension of the left side of the marker 2025.

The three other markers 2026 to 2028 arranged at intermediate portions of the sides of the display area 201 specify the display area 201 in the same manner as the marker 2025 does.

More specifically, the central portion of the display area 201 is located in the direction of a perpendicular vector that starts at the center of the lower side of the marker 2026 as the origin and lies at the right angle to the upper side of the marker 2026. Likewise, the central portion of the display area 201 is located in the direction of a perpendicular vector that starts at the center of the right side of the marker 2027 as the origin and lies at the right angle to the left side of the marker 2027, and in the direction of a perpendicular vector that starts at the center of the upper side of the marker 2028 as the origin and lies at the right angle to the lower side of the marker 2028.

Namely, the lower boundary line of the display area 201 is located on an extension line being an extension of the lower side of the marker 2026. Likewise, the right boundary line of the display area 201 is located on an extension line being an extension of the right side of the marker 2027, and the upper boundary line of the display area 201 is located on an extension line being an extension of the upper side of the marker 2028.

Back to FIG. 3, the explanation resumes with S220.

In S220, the information processing image generation unit 220 generates the information processing image 292.

The start screen of the information processing device 200, the menu screen of the information processing device 200, or the image indicating a window for an application program is an example of the information processing image 292.

After S220, the process proceeds to S230.

Figure 13:
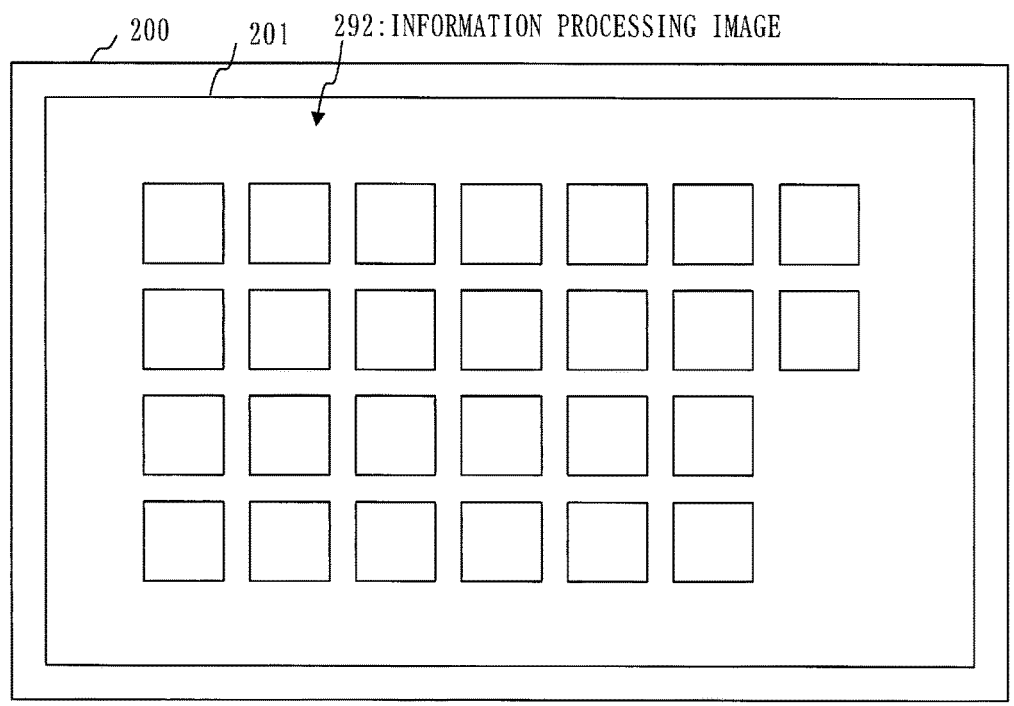
FIG. 13 is a diagram illustrating an example of an information processing image 292 according to Embodiment 1.

FIG. 13 is a diagram illustrating an example of the information processing image 292 according to Embodiment 1.

For example, the information processing image generation unit 220 generates an information processing image 292 (see FIG. 13) indicating a menu screen where a plurality of icons line up. The squares involved in the information processing image 292 represent icons.

Back to FIG. 3, the explanation resumes with S230.

In S230, the marker superimposed image generation unit 230 generates the marker superimposed image 293 by superimposing the marker image 291 over the information processing image 292.

After S230, the process proceeds to S240.

Figure 14:
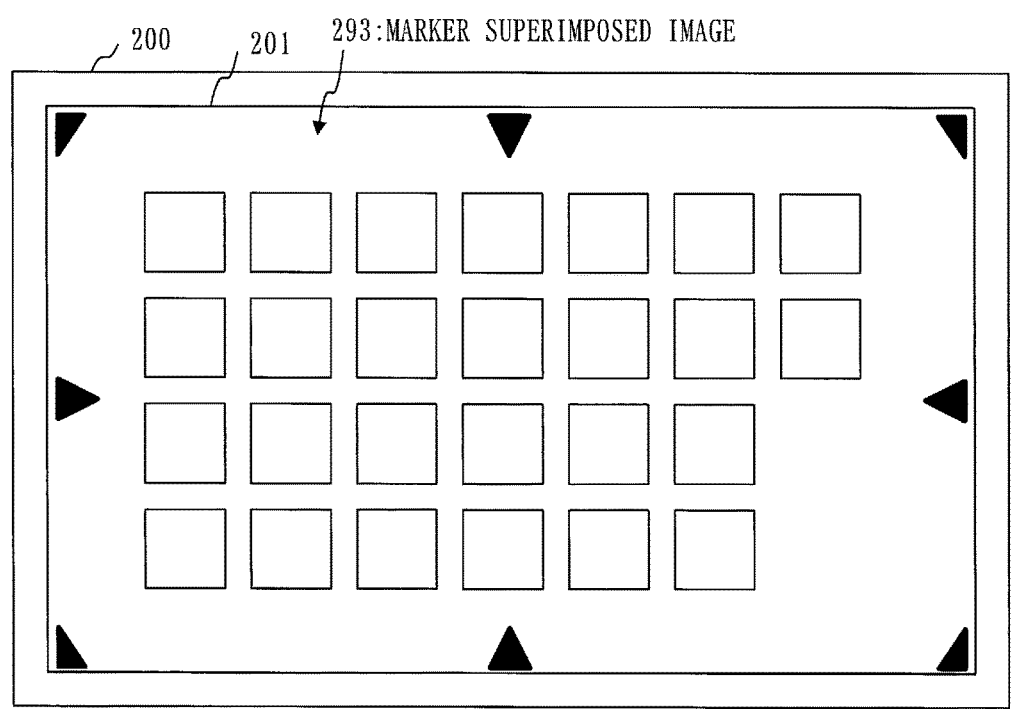
FIG. 14 is a diagram illustrating an example of a marker superimposed image 293 according to Embodiment 1.

FIG. 14 is a diagram illustrating an example of the marker superimposed image 293 according to Embodiment 1.

For example, the marker superimposed image generation unit 230 generates a marker superimposed image 293 as illustrated in FIG. 14 by superimposing the marker image 291 (see FIG. 4) over the information processing image 292 (see FIG. 13).

Back to FIG. 3, the explanation resumes with S240.

In S240, the marker superimposed image display unit 240 displays the marker superimposed image 293 to the display area 201 of the information processing display device.

For example, the marker superimposed image display unit 240 displays the marker superimposed image 293 to the display area 201, as illustrated in FIG. 14.

After S240, the marker display process ends.

Figure 15:
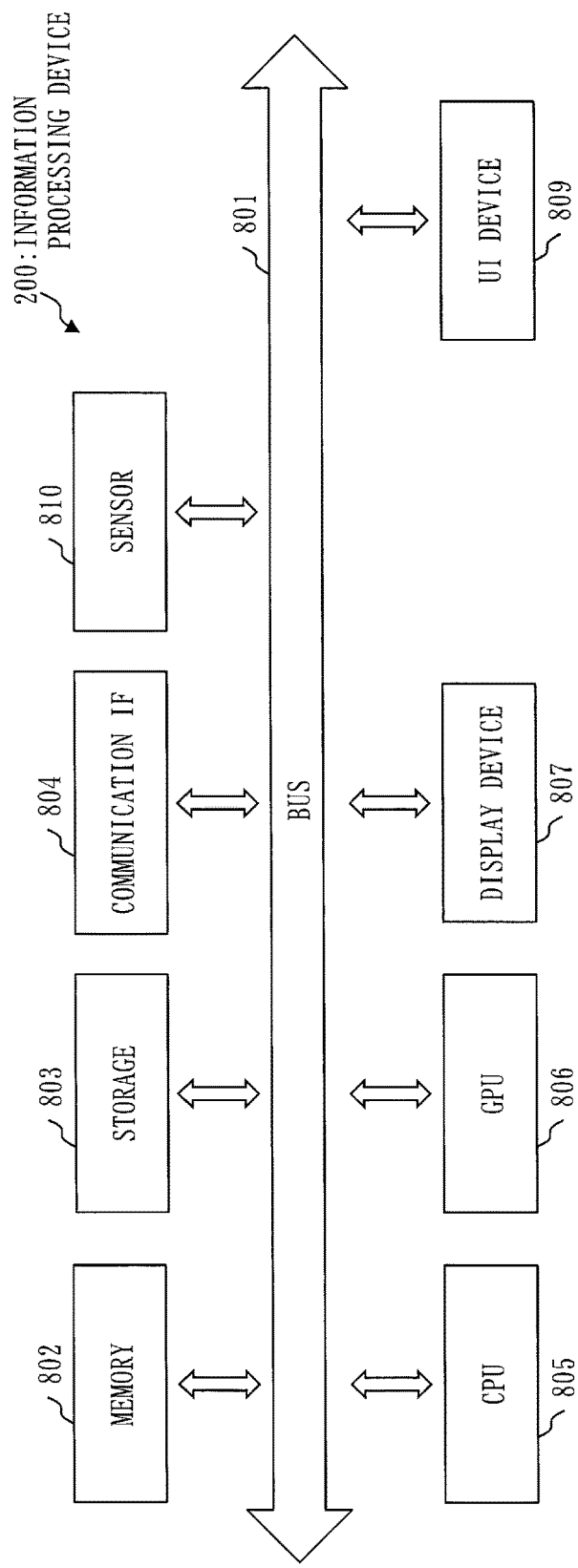
FIG. 15 is a hardware configuration diagram of the information processing device 200 according to Embodiment 1.

FIG. 15 is a hardware configuration diagram of the information processing device 200 according to Embodiment 1.

The hardware configuration of the information processing device 200 according to Embodiment 1 will be described with referring to FIG. 15. The hardware configuration of the information processing device 200 may be different from the configuration illustrated in FIG. 15.

The information processing device 200 is a computer.

The information processing device 200 is provided with a bus 801, a memory 802, a storage 803, a communication interface 804, a CPU 805, and a GPU 806.

The information processing device 200 is further provided with a display device 807, a user interface device 809, and a sensor 810.

The bus 801 is a data transmission path which the hardware of the information processing device 200 uses to exchange data.

The memory 802 is a volatile storage device into which data is written or from which data is read out by the hardware of the information processing device 200. The memory 802 may be a non-volatile storage device. The memory 802 is also called main storage device.

The storage 803 is a non-volatile storage device into which data is written or from which data is read out by the hardware of the information processing device 200. The storage 803 may also be called auxiliary storage device.

The communication interface 804 is a communication device which the information processing device 200 uses to exchange data with an external computer.

The CPU 805 is a computation device that executes a process (for example, marker display process) carried out by the information processing device 200. CPU is an abbreviation of Central Processing Unit.

The GPU 806 is a computation device that executes a process related to computer graphics (CG). The process related to CG may be executed by the CPU 805. The marker image 291, the information processing image 292, and the marker superimposed image 293 are examples of data generated by the CG technology. GPU is an abbreviation of Graphics Processing Unit.

The display device 807 is a device that converts CG data into an optical output. Namely, the display device 807 is a display device that displays CG.

The user interface device 809 is an input device which the user utilizing the information processing device 200 uses to operate the information processing device 200. The keyboard and pointing device provided to a desktop-type computer are examples of the user interface device 809. A mouse and tracking ball are examples of the pointing device. A touch panel and microphone provided to a smart phone or tablet-type computer are examples of the user interface device 809.

The sensor 810 is a measuring device for detecting the information processing device 200 or the surrounding circumstances. A GPS which measures the position, an acceleration sensor which measures the acceleration, a gyro sensor which measures the angular velocity, a magnetic sensor which measures the orientation, a proximity sensor which detects the presence of a nearby object, and an illuminance sensor which detects the illuminance are examples of the sensor 810.

Programs each for implementing the function described as "unit" are stored in the storage 803, loaded to the memory 802 from the storage 803, and executed by the CPU 805.

Information, data, files, signal values, or variable values representing the results of processes such as "determination", "checking", "extraction", "detection", "setting", "registration", "selection", "generation", "inputting", and "outputting" are stored in the memory 802 or storage 803.

Figure 16:
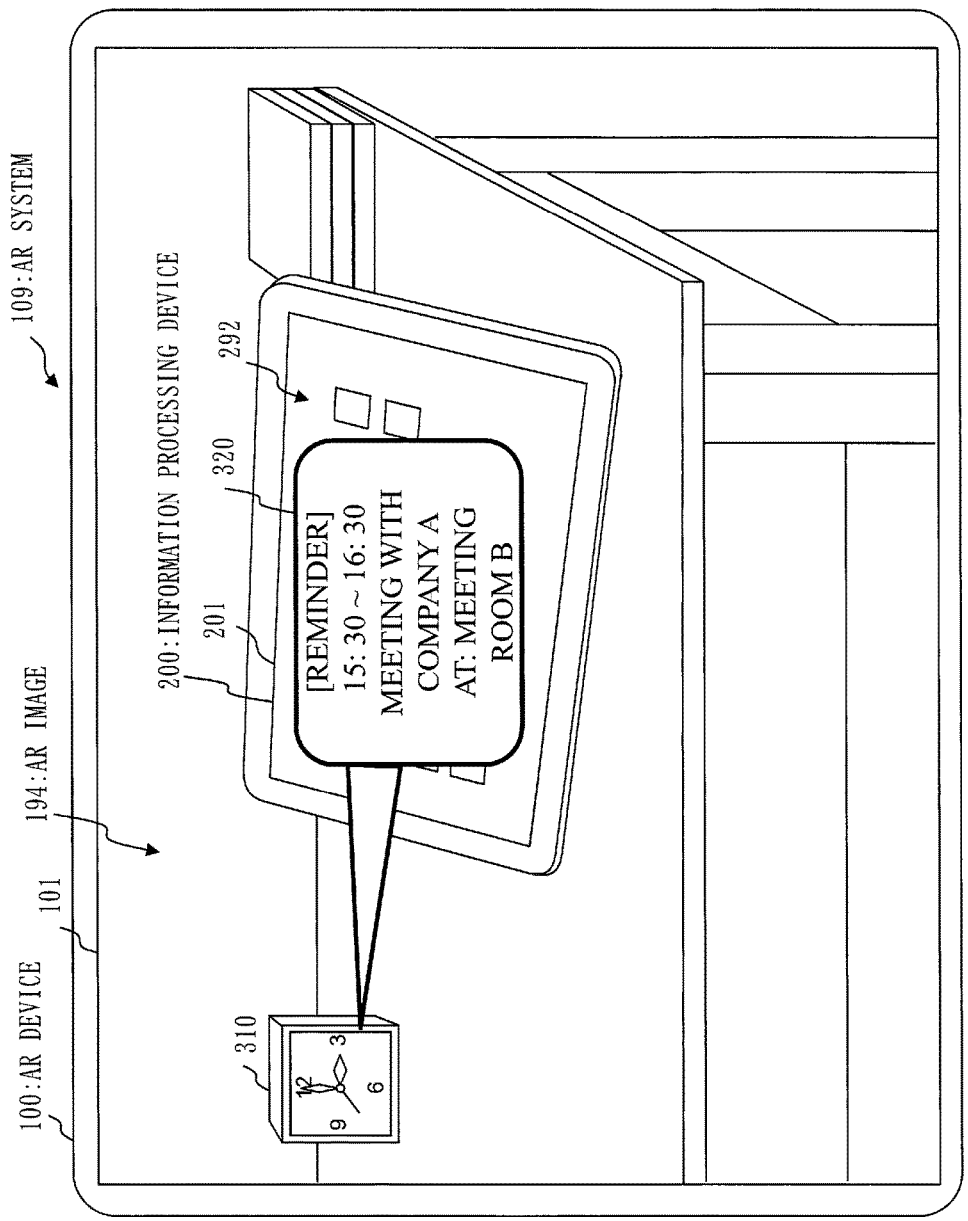
FIG. 16 is a diagram illustrating an example of an AR image 194 according to the prior art.

FIG. 16 is a diagram illustrating an example of the AR image 194 according to the prior art.

In the prior art, the information illustration 320 may be superimposed on the display area 201 of the information processing device 200 (see FIG. 16).

In this case, the information processing image 292 displayed in the display area 201 of the information processing device 200 is hidden by the information illustration 320 and thus cannot be seen.

Therefore, when useful information is included in the information processing image 292, the user cannot obtain the useful information from the AR image 194. If the user wishes to see the information processing image 292, he or she must switch the gaze from the display device of the AR image 194 to the display device of the information processing device 200.

In Embodiment 1, as the information processing device 200 displays the markers 202 to the display area 201, the AR device 100 can display the information illustration 320 to avoid the display area 201 of the information processing device 200 (see FIG. 1).

Referring to FIG. 1, the information illustration 320 overlaps with the bezel of the information processing device 200 but not with the display area 201. If the information illustration 320 should overlap with the peripheral equipment of the information processing device 200, it will not overlap with the display area 201.

Therefore, the user can obtain both of information described on the information illustration 320 and information described on the information processing image 292, from the AR image 194.

According to Embodiment 1, the information processing device 200 can display the markers 202 serving as the signs for the display area 201, in the display area 201 of the information processing display device.

The AR device 100 can select the display area 201 of the information processing display device shown on the photographic image 191, based on the markers 202 displayed in the display area 201.

As the AR device 100 can select the display area 201 of the information processing display device shown in the photographic image 191, the AR device 100 can superimpose and display information over the photographic image 191 without hiding the display area 201 of the display device shown on the photographic image 191.

Embodiment 2.

An embodiment will be described in which markers are displayed in a window area that displays a window for an application program.

Matters that are not described in Embodiment 1 will mainly be described hereinafter. Matters whose description is omitted are equivalent to their counterparts in Embodiment 1.

Figure 17:
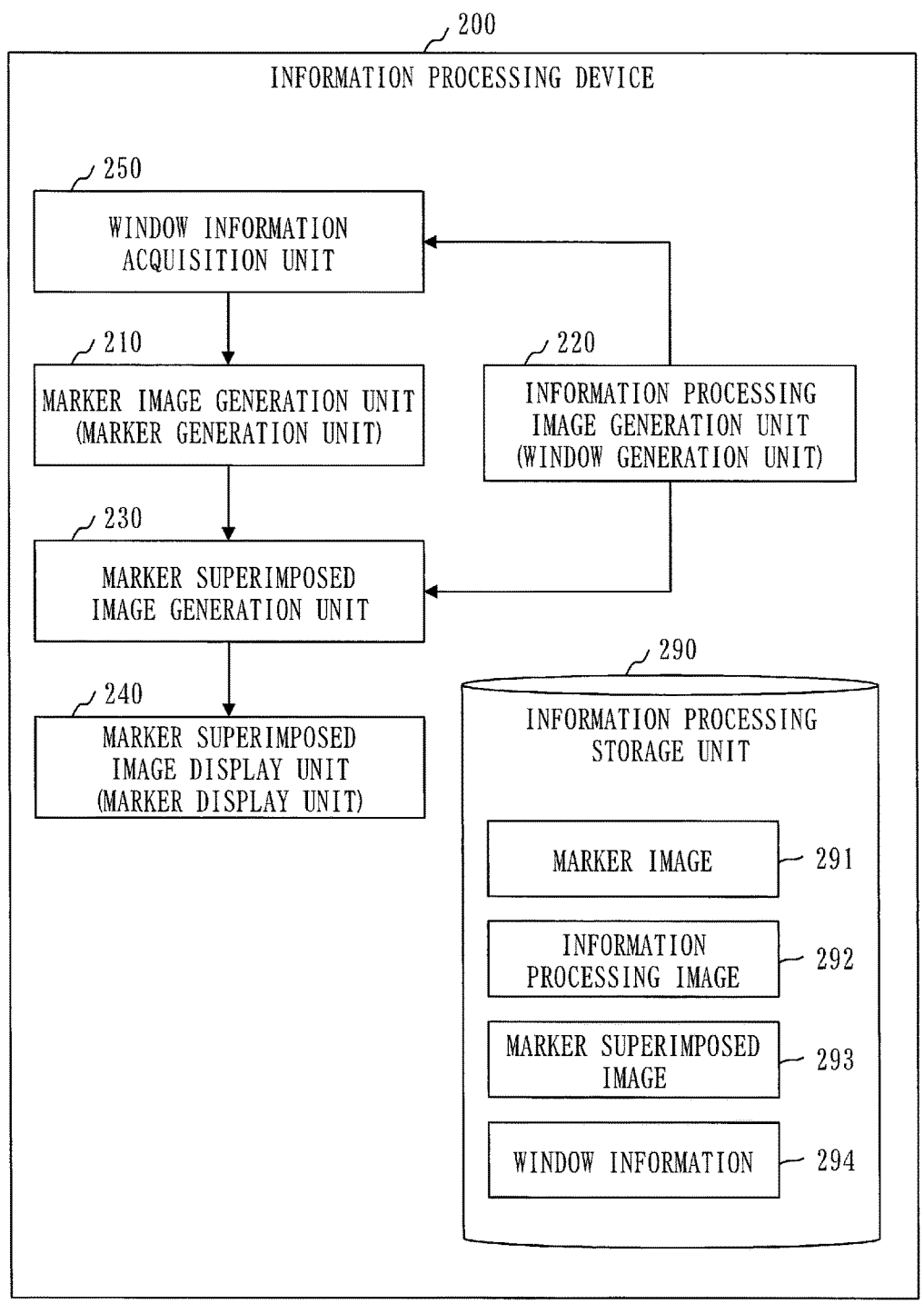
FIG. 17 is a functional configuration diagram of an information processing device 200 according to Embodiment 2.

FIG. 17 is a functional configuration diagram of an information processing device 200 according to Embodiment 2.

The functional configuration of the information processing device 200 according to Embodiment 2 will be described with referring to FIG. 17. The functional configuration of the information processing device 200 may be different from that of FIG. 17.

The information processing device 200 is provided with a window information acquisition unit 250 in addition to the function described in Embodiment 1 (see FIG. 2).

The window information acquisition unit 250 acquires window information 294 from the information processing image generation unit 220 when an information processing image generation unit 220 (an example of a window generation unit) generates a window for an application program.

The window information 294 includes window area information indicating a window area, the significance degree of the window, a window handle for identifying the window, and so on. The window is an execution screen of the application program. The window area is an area where the window is displayed, of a display area 201. The significance degree of the window means the significance degree of the application program that uses the window.

A marker image generation unit 210 generates a marker image 291 involving markers 202 which specify the window area, based on the window information 294 acquired by the window information acquisition unit 250.

Figure 18:
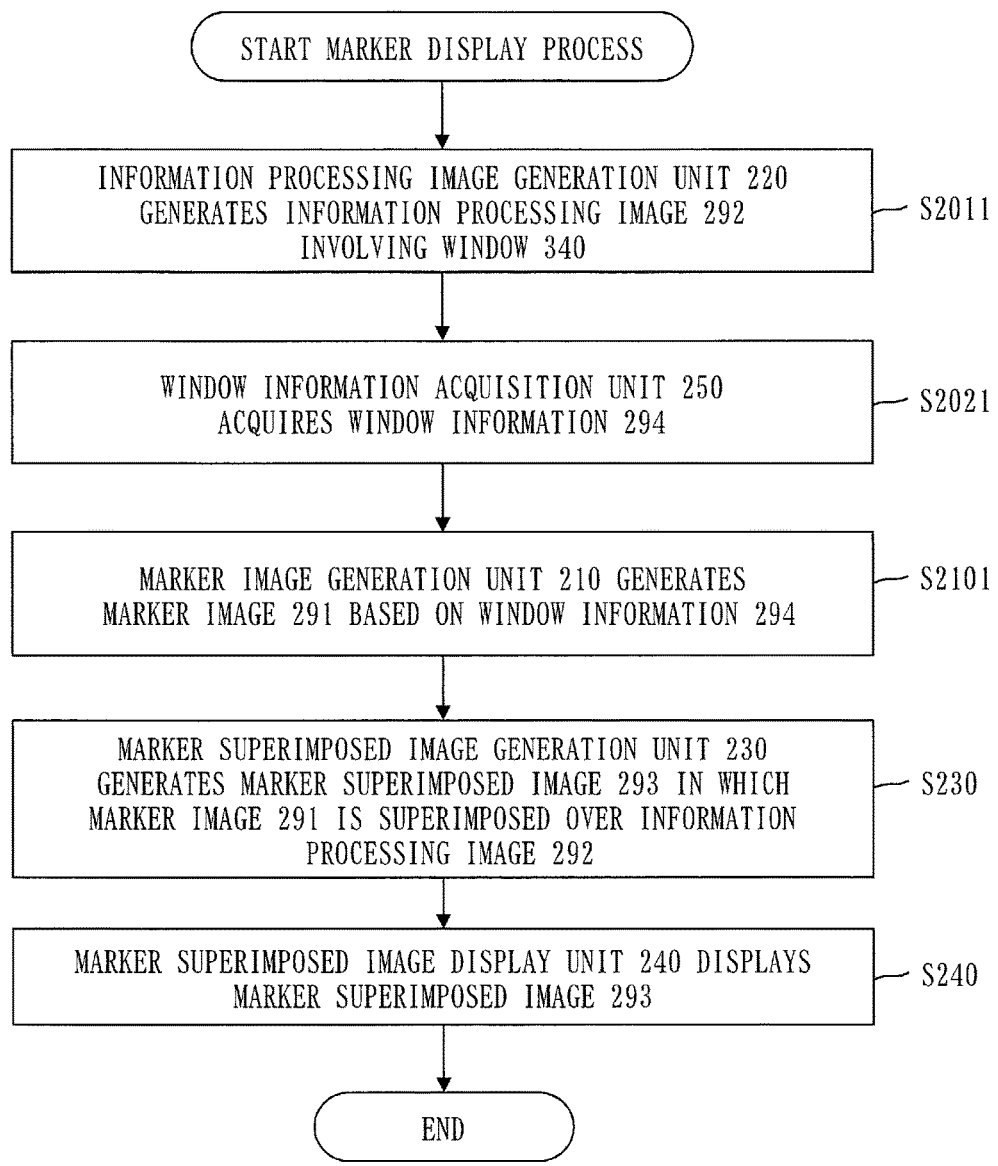
FIG. 18 is a flowchart illustrating a marker display process of the information processing device 200 according to Embodiment 2.

FIG. 18 is a flowchart illustrating a marker display process of the information processing device 200 according to Embodiment 2.

The marker display process of the information processing device 200 according to Embodiment 2 will be described with referring to FIG. 18. The marker display process may be different from that of FIG. 18.

In S2011, the information processing image generation unit 220 generates an information processing image 292 which involves a window 340.

The information processing image generation unit 220 also generates the window information 294 including the window area information. Where there are a plurality of windows 340, the information processing image generation unit 220 generates window information 294 for each window 340.

The information processing image generation unit 220 may generate window information 294 including the significance degree of the window 340. For example, the information processing image generation unit 220 acquires, from a significance degree table, the significance degree correlated to the program identifier of the application program that uses the window 340. The significance degree table is an example of data stored in the information processing storage unit 290.

After S2011, the process proceeds to S2021.

Figure 19:
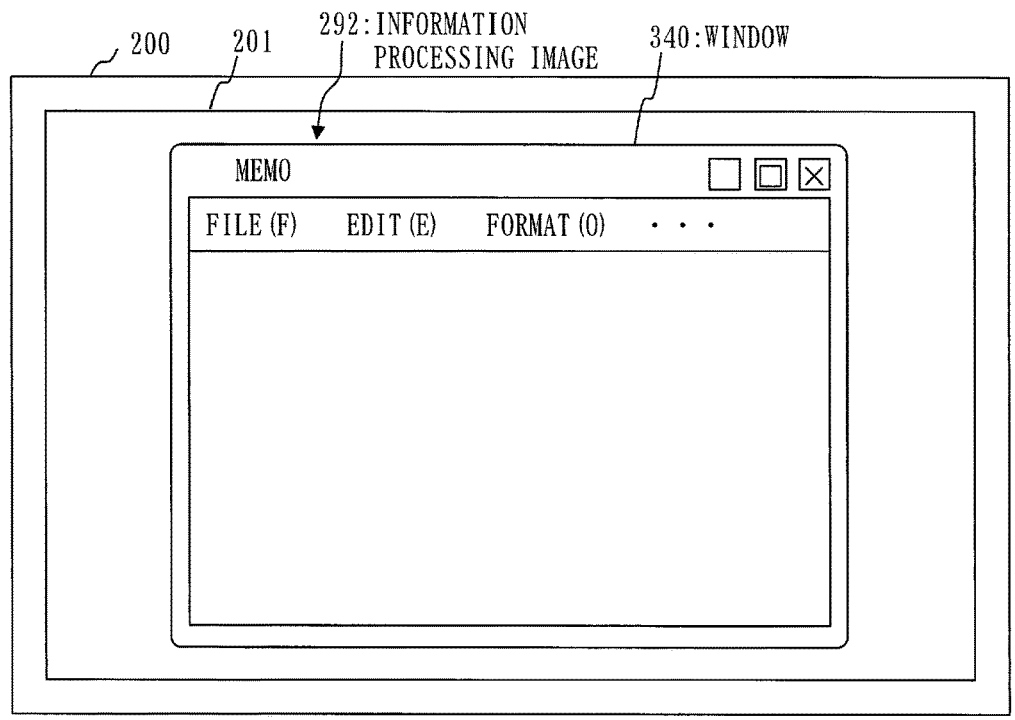
FIG. 19 is a diagram illustrating an example of an information processing image 292 according to Embodiment 2.

FIG. 19 is a diagram illustrating an example of an information processing image 292 according to Embodiment 2.

For example, the information processing image generation unit 220 generates an information processing image 292 (see FIG. 19) in which a window 340 is arranged at the center.

Back to FIG. 18, the explanation resumes with S2021.

In S2021, the window information acquisition unit 250 acquires the window information 294 from the information processing image generation unit 220.

After S2021, the process proceeds to S2101.

In S2101, the marker image generation unit 210 acquires the window information 294 from the window information acquisition unit 250.

The marker image generation unit 210 generates the marker image 291 based on the window area information included in the window information 294. The marker0 image 291 is an image in which the markers 202 specifying the window area are arranged in the window area.

The marker image generation unit 210 may determine at least either the shapes of the markers 202 or the colors of the markers 202 based on the significance degree of the window 340 included in the window information 294.

After S2101, the process proceeds to S230.

Figure 20:
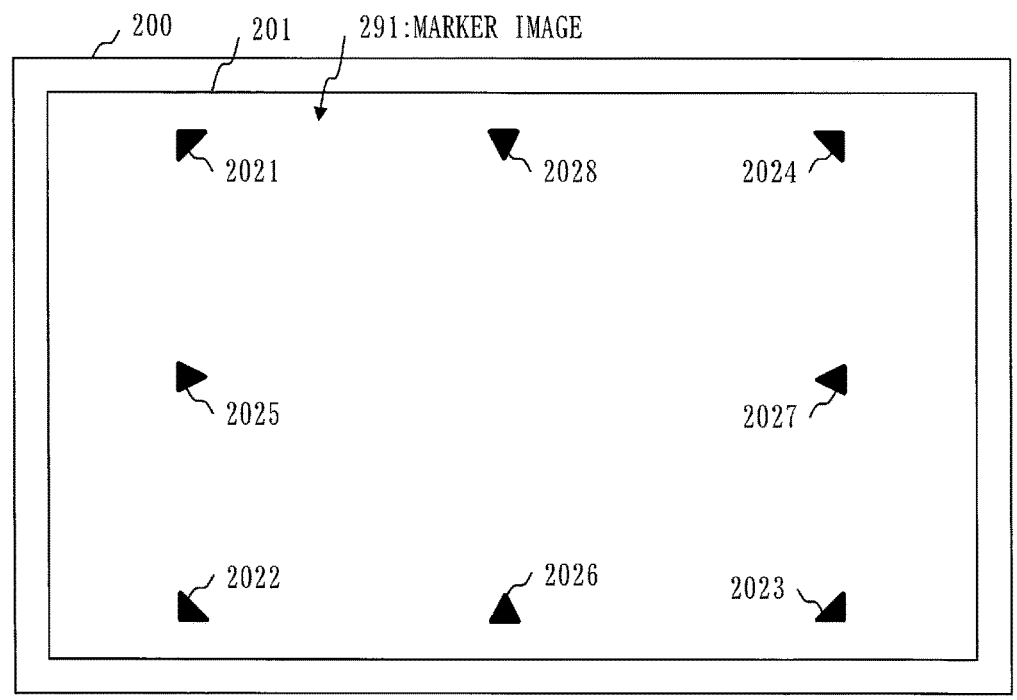
FIG. 20 is a diagram illustrating an example of a marker image 291 according to Embodiment 2.

FIG. 20 is a diagram illustrating an example of the marker image 291 according to Embodiment 2.

For example, the marker image generation unit 210 generates a marker image 291 as illustrated in FIG. 20. This marker image 291 is an image in which eight markers 2021 to 2028 are arranged in a window area where the window 340 (see FIG. 19) is displayed.

The markers 2021 to 2028 may be two-dimensional codes (see FIGS. 11 and 12).

Back to FIG. 18, the explanation resumes with S230.

In S230, the marker superimposed image generation unit 230 generates a marker superimposed image 293 by superimposing the marker image 291 over the information processing image 292.

After S230, the process proceeds to S240.

Figure 21:
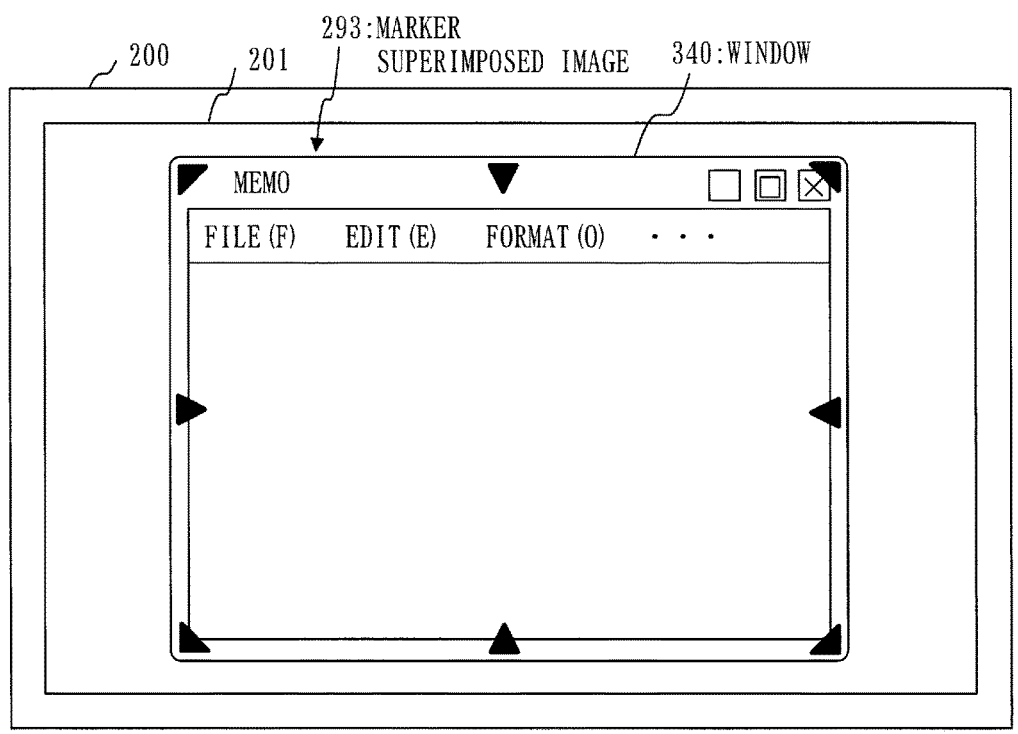
FIG. 21 is a diagram illustrating an example of a marker superimposed image 293 according to Embodiment 2.

FIG. 21 is a diagram illustrating an example of the marker superimposed image 293 according to Embodiment 2.

For example, a marker superimposed image generation unit 230 generates a marker superimposed image 293 as illustrated in FIG. 21 by superimposing the marker image 291 (see FIG. 20) over the information processing image 292 (see FIG. 19).

Back to FIG. 18, the explanation resumes with S240.

In S240, a marker superimposed image display unit 240 displays the marker superimposed image 293 to the display area 201 of the information processing display device.

For example, the marker superimposed image display unit 240 displays the marker superimposed image 293 to the display area 201, as illustrated in FIG. 21.

After S240, the marker display process ends.

According to Embodiment 2, the information processing device 200 can display the markers to the window area where the window for the application program is displayed. Namely, the information processing device 200 limits the unusable area on which no information is superimposed, to the window area, so that a situation where the unusable area is enlarged unnecessarily can be avoided.

An AR device 100 can superimpose and display information over an image area showing a display area (for example, a desktop screen) that does not display a window.

Embodiment 3.

An embodiment will be described in which markers are displayed in a window area where a significant window among a plurality of windows is displayed.

Matters that are not described in Embodiments 1 and 2 will mainly be described hereinafter. Matters whose description is omitted are equivalent to their counterparts in Embodiment 1 or 2.

Figure 22:
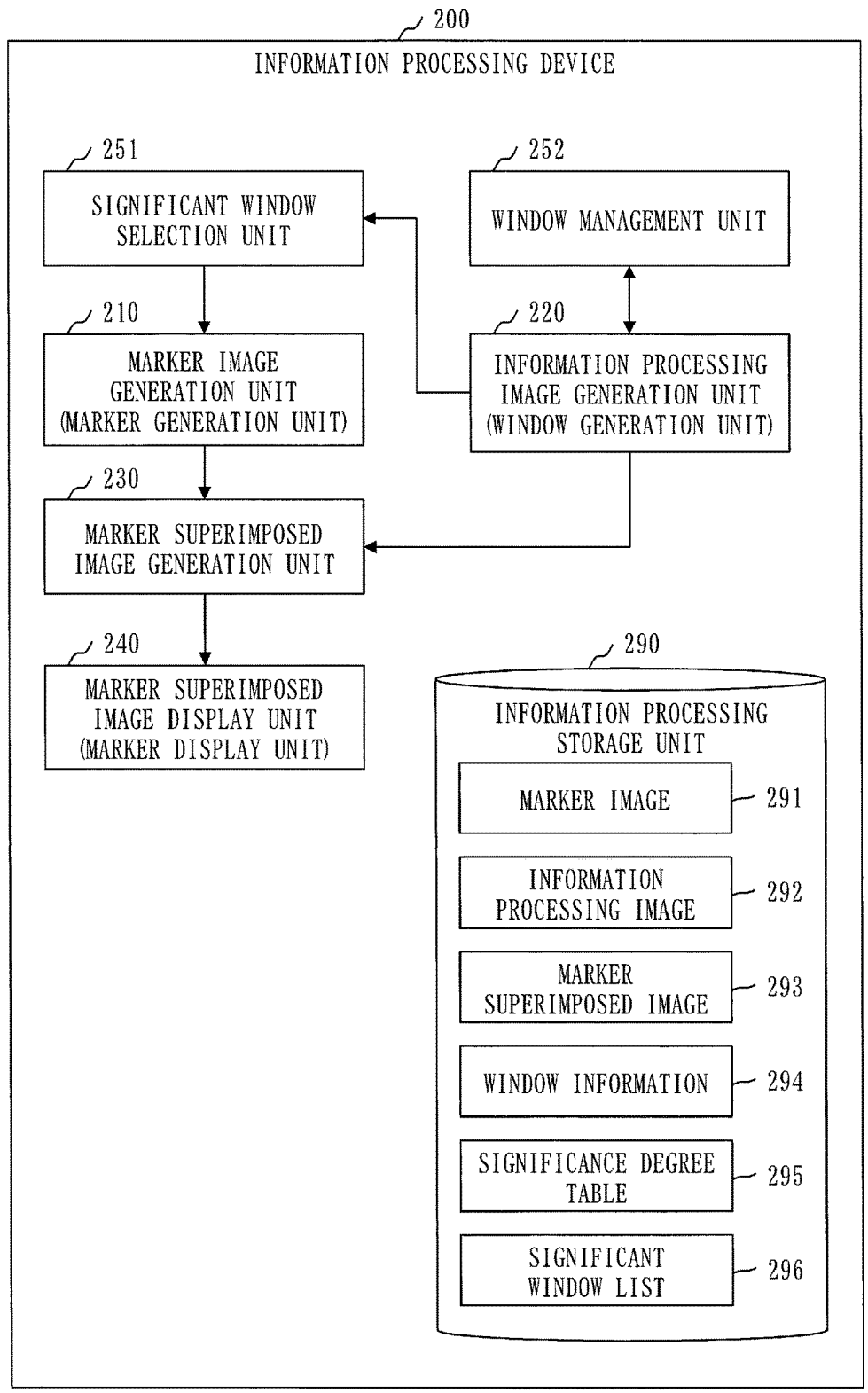
FIG. 22 is a functional configuration diagram of an information processing device 200 according to Embodiment 3.

FIG. 22 is a functional configuration diagram of an information processing device 200 according to Embodiment 3.

The functional configuration of the information processing device 200 according to embodiment 3 will be described with referring to FIG. 22. The functional configuration of the information processing device 200 may be different from that of FIG. 22.

The information processing device 200 is provided with a significant window selection unit 251 and a window management unit 252 in addition to the function described in Embodiment 1 (see FIG. 2).

The significant window selection unit 251 selects a significant window based on a significance degree table 295 and window information 294 of each window, and generates significant window list 296 that indicates the significant window. The significant window selection unit 251 may generate a list indicating a non-significant window.

The significance degree table 295 indicates the significance degree of an application program.

The window information 294 includes window area information indicating a window area, the significance degree of the window, a window handle for identifying the window, and so on. The significance degree of the window means the significance degree of the application program that uses the window.

The significant window is a window where markers 202 are displayed. The non-significant window is a window where markers 202 are not displayed.

The window management unit 252 manages the windows.

For example, the window management unit 252 conducts processes such as generation of the window handle, determination of the window area, determination of the appearance of the window, and generation of the image of the window.

Figure 23:
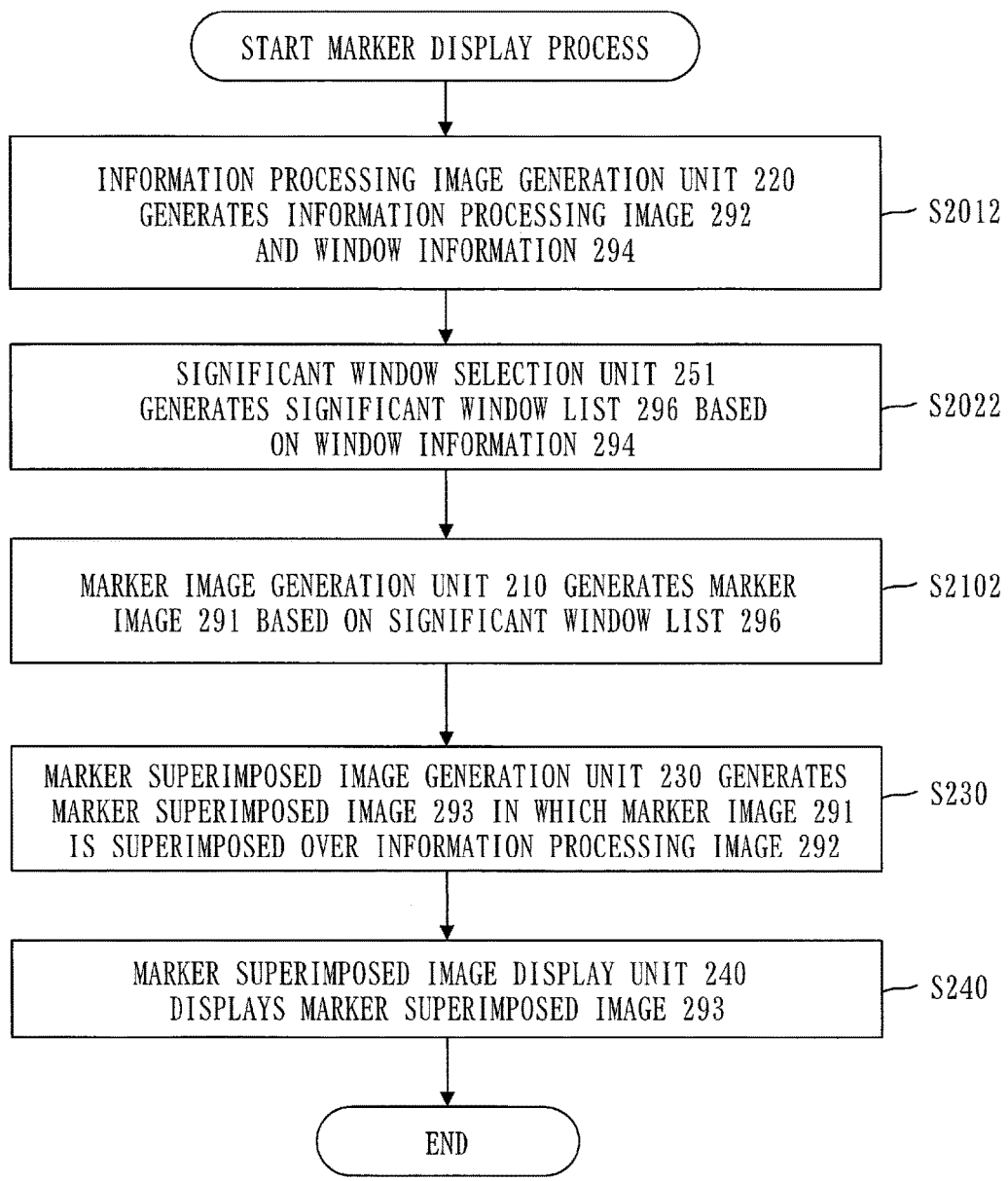
FIG. 23 is a flowchart illustrating a marker display process of the information processing device 200 according to Embodiment 3.

FIG. 23 is a flowchart illustrating a marker display process of the information processing device 200 according to Embodiment 3.

The marker display process of the information processing device 200 according to Embodiment 3 will be described with referring to FIG. 23. The marker display process may be different from that of FIG. 23.

In S2012, an information processing image generation unit 220 generates an information processing image 292 and the window information 294 by utilizing the window management unit 252.

The information processing image 292 involves a plurality of windows 340.

The window information 294 includes a window handle, a window area, the significance degree of the application program, and so on of each window 340.

For example, the information processing image generation unit 220 acquires the window handle and the window area from the window management unit 252.

For example, the information processing image generation unit 220 acquires for each window 340 the significance degree correlated to a program identifier which identifies the application program that uses the window 340, from the significance degree table 295.

After S2012, the process proceeds to S2022.

Figure 24:
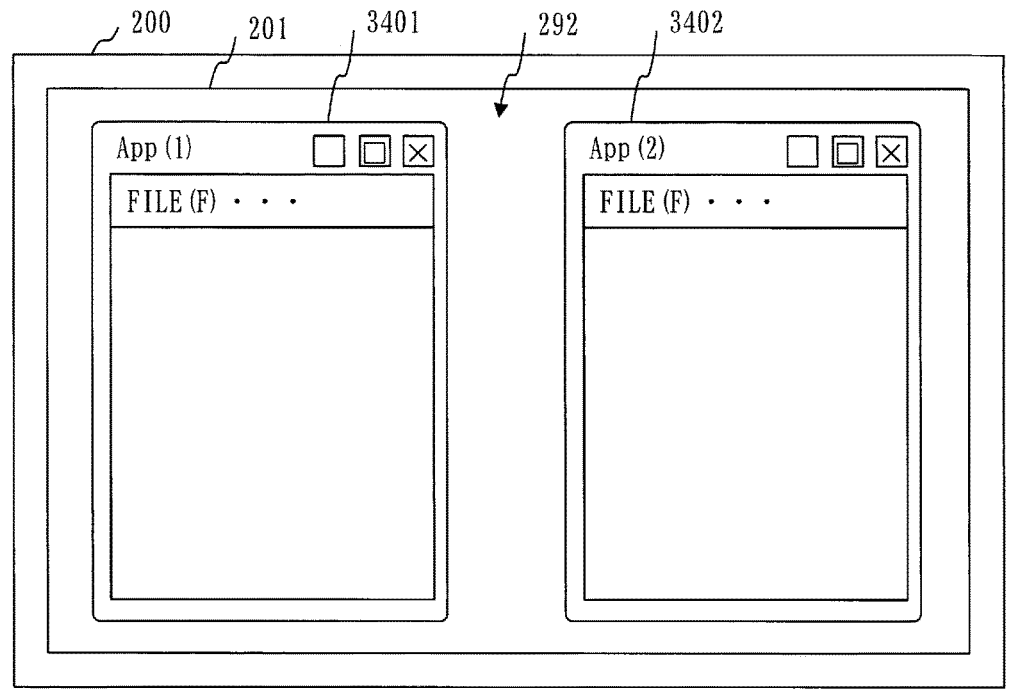
FIG. 24 is a diagram illustrating an example of an information processing image 292 according to Embodiment 3.

FIG. 24 is a diagram illustrating an example of the information processing image 292 according to Embodiment 3.

For example, the information processing image generation unit 220 generates the information processing image 292 involving a window 3401 for an application program (1) and a window 3402 for an application program (2).

Back to FIG. 23, the explanation resumes with S2022.

In S2022, the significant window selection unit 251 selects the window information 294 of the individual window 340 from the information processing image generation unit 220.

The significant window selection unit 251 generates the significant window list 296 based on the significance degree included in the window information 294 of each window 340. The significant window list 296 includes the window handle of the significant window 340.

For example, the significant window selection unit 251 selects the window information 294 by at least either one of the following processes. The significant window selection unit 251 acquires the window handle from the selected window information 294 and sets the acquired window handle to the significant window list 296.

The significant window selection unit 251 selects window information 294 including significance degree higher than a significance degree threshold.

The significant window selection unit 251 selects pieces of window information 294 corresponding in number to the selected windows, according to the priority of significance degree.

When a new window 340 having high significance degree is generated, a significant window 340 may become a window 340 that is less significant than the other windows 340 including the new window 340. When the significant window 340 is closed, a window that has not been significant may become a significant window.

Therefore, when a new window 340 is generated or an existing window 340 is closed, the significant window selection unit 251 updates the significant window list 296.

After S2022, the process proceeds to S2102.

In S2102, a marker image generation unit 210 acquires the window information 294 and the significant window list 296 from the significant window selection unit 251.

The marker image generation unit 210 selects window information 294 including a window handle that is the same as the window handle included in the significant window list 296.

The marker image generation unit 210 then generates a marker image 291 based on the selected window information 294. The marker image 291 is an image in which markers 202 serving as the signs for a window area are arranged in the window area where the significant window 340 is displayed.

When the significant window list 296 is updated, the marker image generation unit 210 updates the marker image 291 based on the updated significant window list 296.

The marker image generation unit 210 may determine at least either the shapes of the markers 202 or the colors of the markers 202 based on the significance degree of the window 340 included in the window information 294.

After S2102, the process proceeds to S230.

Figure 25:
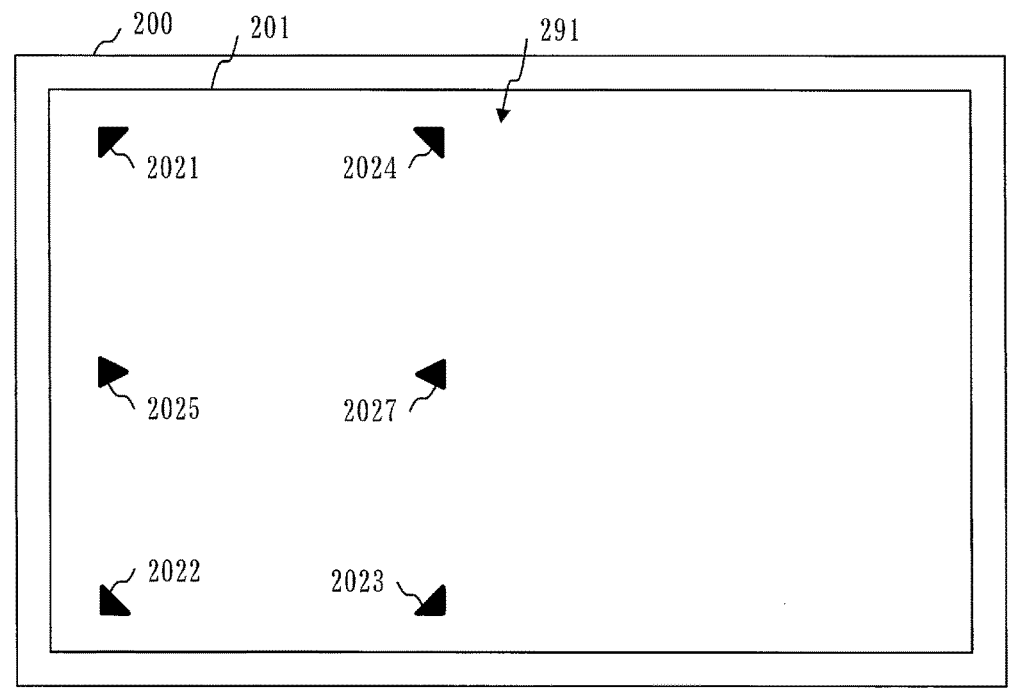
FIG. 25 is a diagram illustrating an example of a marker image 291 according to Embodiment 3.

FIG. 25 is a diagram illustrating an example of the marker image 291 according to Embodiment 3.

When the significant window list 296 shows the window handle of the window 3401 (see FIG. 24), the marker image generation unit 210 generates a marker image 291 as illustrated in FIG. 25. The marker image 291 is an image in which markers 2021 to 2027 are arranged in a window area where the window 3401 is displayed. The markers 2021 to 2027 may be two-dimensional codes (see FIGS. 11 and 12).

When the significant window list 296 indicates the window handles of the window 3401 and window 3402, the marker image generation unit 210 generates a marker image 291 in which markers 202 are arranged in each window area of the window 3401 and window 3402.

Back to FIG. 23, the explanation resumes with S230.

In S230, the marker superimposed image generation unit 230 generates a marker superimposed image 293 by superimposing the marker image 291 over the information processing image 292.

After S230, the process proceeds to S240.

Figure 26:
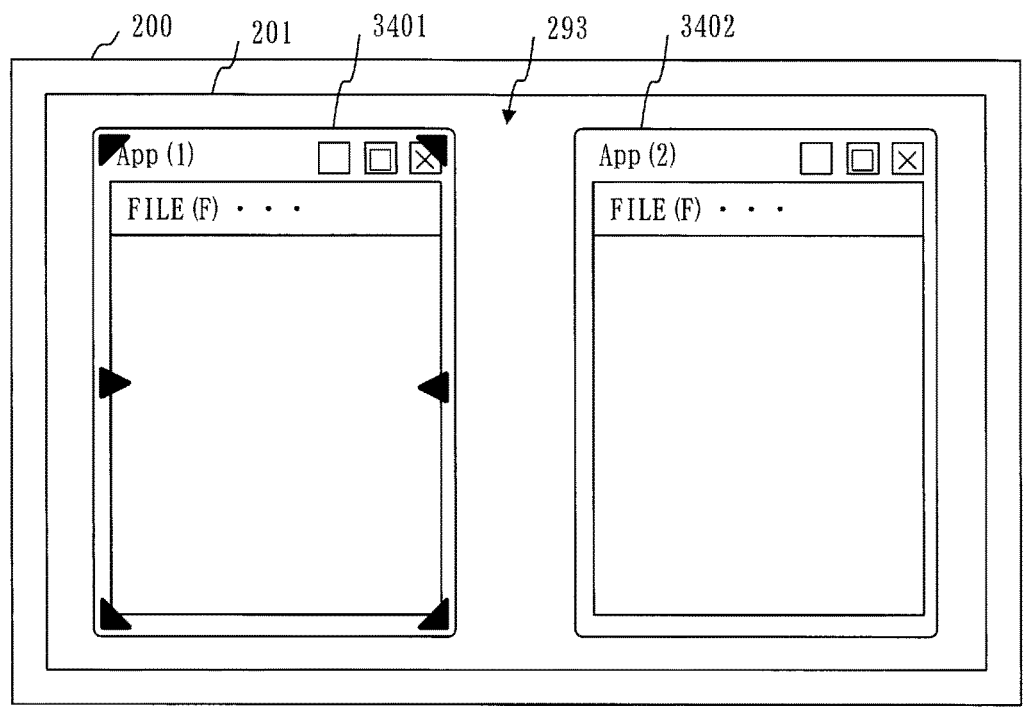
FIG. 26 is a diagram illustrating an example of a marker superimposed image 293 according to Embodiment 3.

FIG. 26 is a diagram illustrating an example of the marker superimposed image 293 according to Embodiment 3.

For example, the marker superimposed image generation unit 230 generates a marker superimposed image 293 as illustrated in FIG. 26 by superimposing the marker image 291 (see FIG. 25) over the information processing image 292 (see FIG. 24).

Back to FIG. 23, the explanation resumes with S240.

In S240, the marker superimposed image display unit 240 displays the marker superimposed image 293 to a display area 201 of the information processing display device.

For example, the marker superimposed image display unit 240 displays the marker superimposed image 293 to the display area 201, as illustrated in FIG. 26.

After S240, the marker display process ends.

According to Embodiment 3, the information processing device 200 can display markers in the window area where a significant window among the plurality of windows is displayed.

Embodiment 4.

An embodiment will be described in which markers are displayed in a merged area formed by merging a plurality of window areas that overlap partly.

Matters that are not described in Embodiments 1 to 3 will mainly be described hereinafter. Matters whose description is omitted are equivalent to their counterparts in Embodiments 1 to 3.

Figure 27:
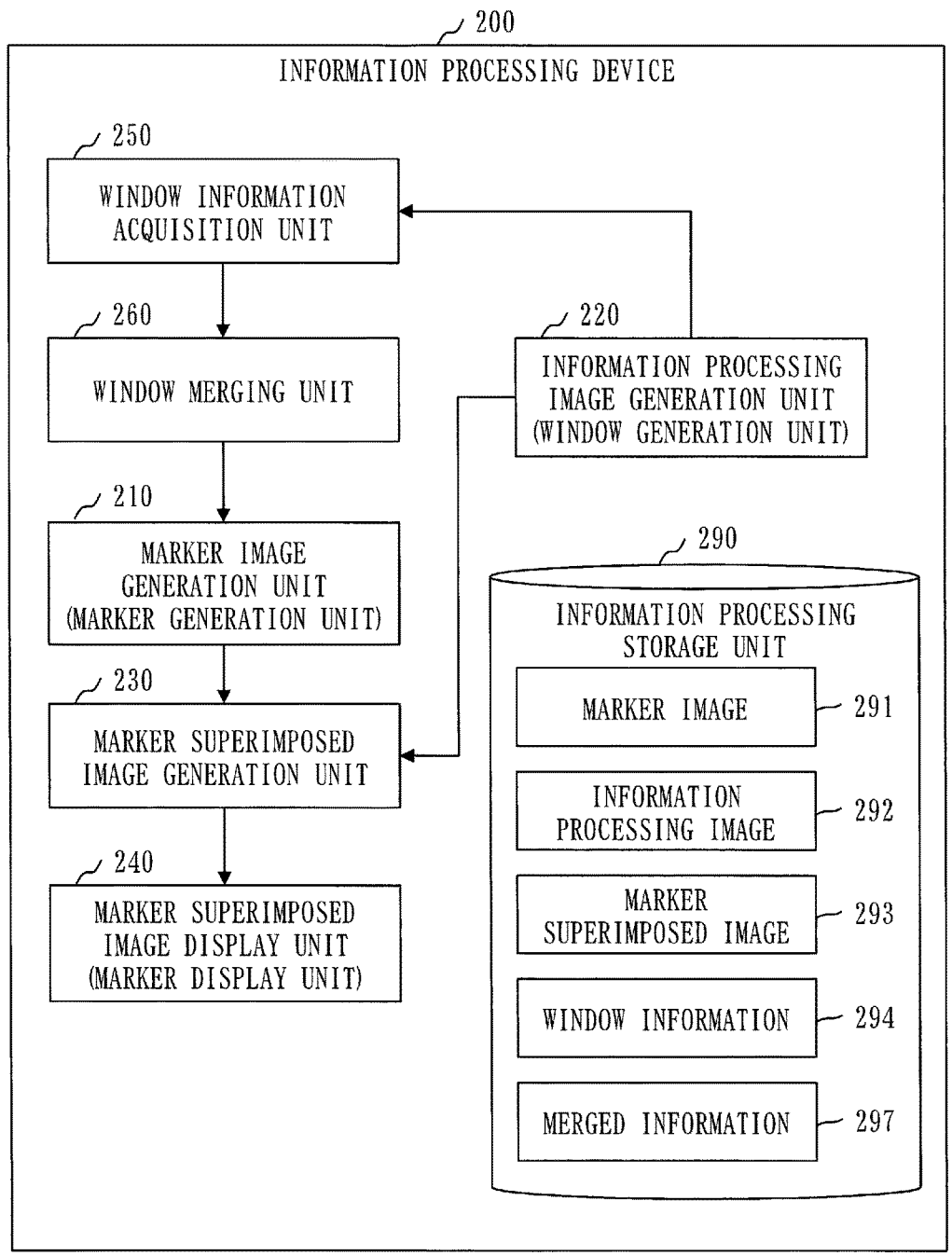
FIG. 27 is a functional configuration diagram of an information processing device 200 according to Embodiment 4.

FIG. 27 is a functional configuration diagram of an information processing device 200 according to Embodiment 4.

The functional configuration of the information processing device 200 according to Embodiment 4 will be described with referring to FIG. 27. The functional configuration of the information processing device 200 may be different from that of FIG. 27.

The information processing device 200 is provided with a window merging unit 260 in addition to the function described in Embodiment 2 (see FIG. 17).

The window merging unit 260 calculates a merged area based on window information 294 of the individual windows, and generates merged information 297 including merged area information indicating the calculated merged area. The merged area is an area including a plurality of windows that overlap partly. The merged area may be an area including a plurality of window areas that do not overlap.

The merged information 297 includes the merged area information indicating the merged area, the window handle of a window 340 included in the merged area, and so on.

Based on the merged information 297, a marker image generation unit 210 generates a marker image 291 in which markers 202 that specify the merged area are arranged in the merged area.

Figure 28:
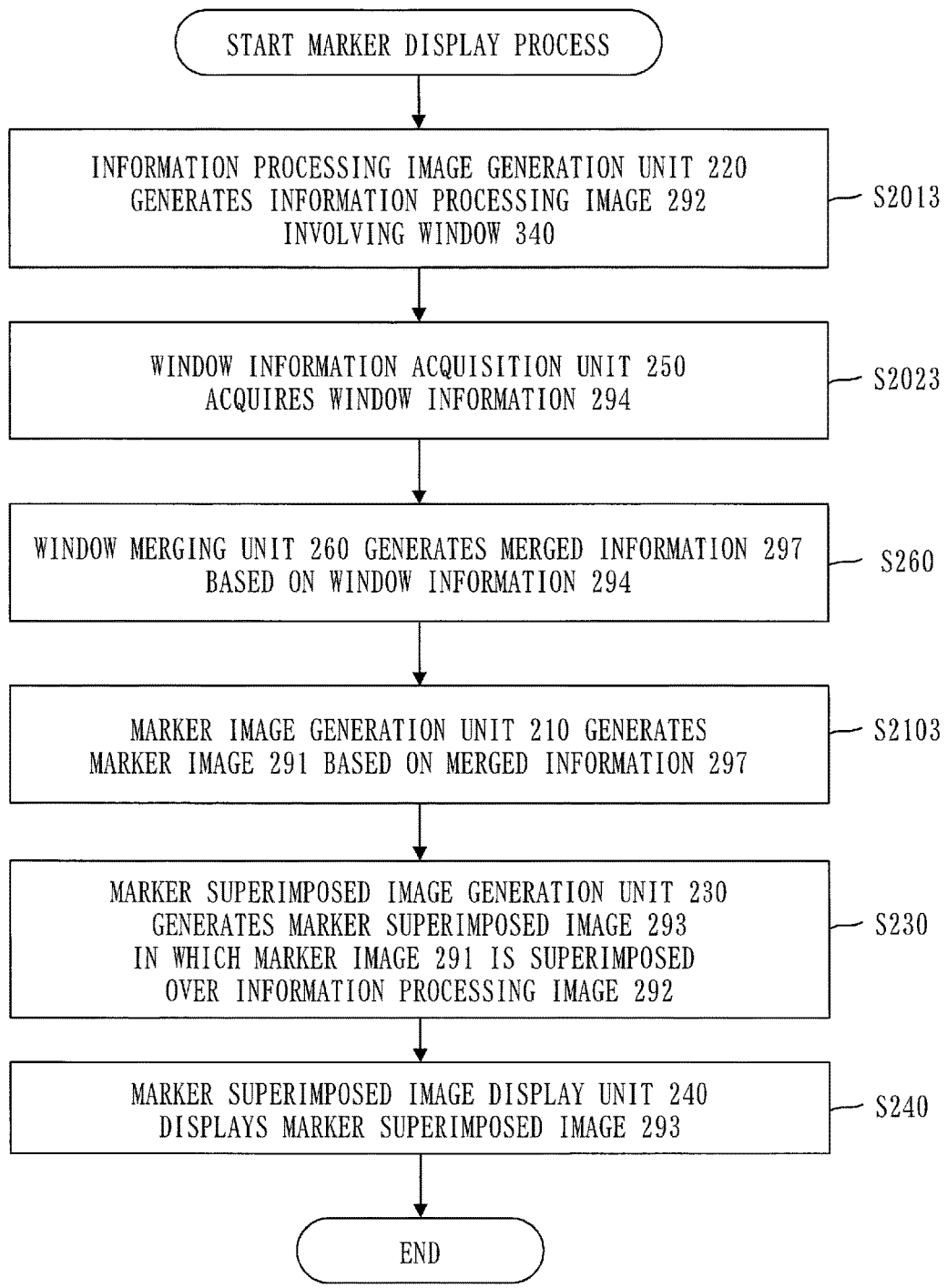
FIG. 28 is a flowchart illustrating a marker display process of the information processing device 200 according to Embodiment 4.

FIG. 28 is a flowchart illustrating a marker display process of the information processing device 200 according to Embodiment 4.

The marker display process of the information processing device 200 according to Embodiment 4 will be described with referring to FIG. 28. The marker display process may be different from that of FIG. 28.

In S2013, the information processing image generation unit 220 generates an information processing image 292 involving a plurality of windows 340, and generates window information 294 of each generated window 340.

After S2013, the process proceeds to S2023.

Figure 29:
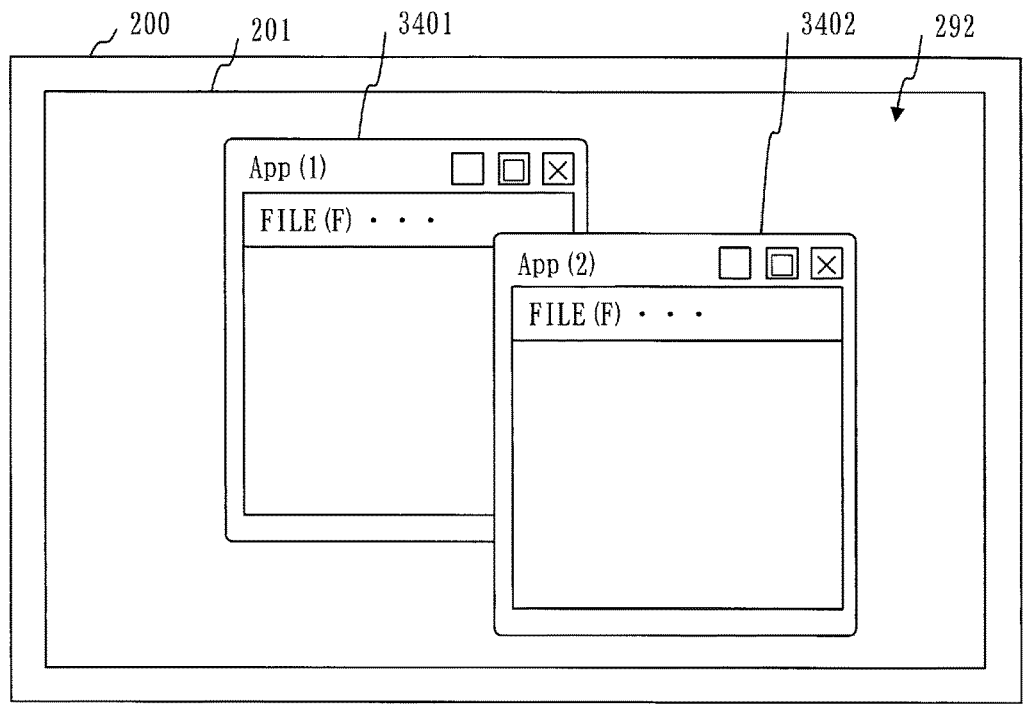
FIG. 29 is a diagram illustrating an example of an information processing image 292 according to Embodiment 4.

FIG. 29 is a diagram illustrating an example of the information processing image 292 according to Embodiment 4.

For example, an information processing image generation unit 220 generates an information processing image 292 (see FIG. 29) involving a window 3401 for an application program (1), a window 3402 for an application program (2). The window 3402 partly overlaps with the window 3401.

Back to FIG. 28, the explanation resumes with S2023.

In S2023, the window information acquisition unit 250 acquires window information 294 of each window 340 from the information processing image generation unit 220.

After S2023, the process proceeds to S260.

In S260, the window merging unit 260 acquires the window information 294 of each window 340 from the window information acquisition unit 250. The window information 294 includes window area information.

The window merging unit 260 calculates a merged area 350 based on the window area information of the individual windows 340, and generates merged information 297 including merged area information indicating the calculated merged area 350. Where there are a plurality of merged areas 350, the window merging unit 260 generates merged information 297 for each merged area 350.

The merged information 297 includes the merged area information indicating the merged area 350, the window handle of the window 340 involved in the merged area 350, and so on.

The window merging process (S260) will be described later in detail.

After S260, the process proceeds to S2103.

Figure 30:
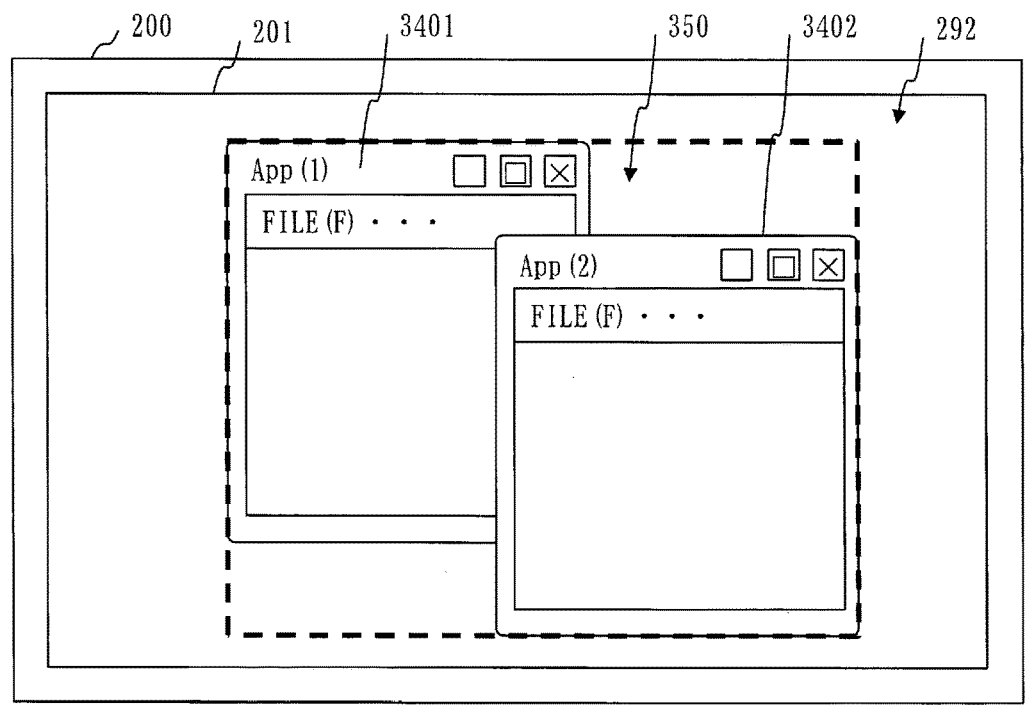
FIG. 30 is a diagram illustrating an example of a merged area 350 according to Embodiment 4.

FIG. 30 is a diagram illustrating an example of the merged area 350 according to Embodiment 4.

For example, the window merging unit 260 calculates the minimum rectangular area involving a window area where the window 3401 is displayed and a window area where the window 3402 is displayed, as the merged area 350 (see FIG. 30). The merged area 350 is the area surrounded by the broken-line frame.

Back to FIG. 28, the explanation resumes with S2103.

In S2103, the marker image generation unit 210 acquires the merged information 297 from the window merging unit 260.

The marker image generation unit 210 generates the marker image 291 based on the merged area information included in the merged information 297. The marker image 291 is an image in which the markers 202 that specify the merged area 350 are arranged in the merged area 350.

The marker image generation unit 210 may acquire the window information 294 of each window from the window merging unit 260 and may include the markers 202 that specify the window area of the window 340 not displayed in the merged area 350, into the marker image 291.

In this case, the marker image generation unit 210 selects window information 294 that includes a window handle different from the window handle included in the merged information 297, and acquires window area information from the selected window information 294. The marker image generation unit 210 generates markers 202 that specify the window area indicated by the acquired window area information, and includes the generated markers 202 into the marker image 291.

After S2103, the process proceeds to S230.

Figure 31:
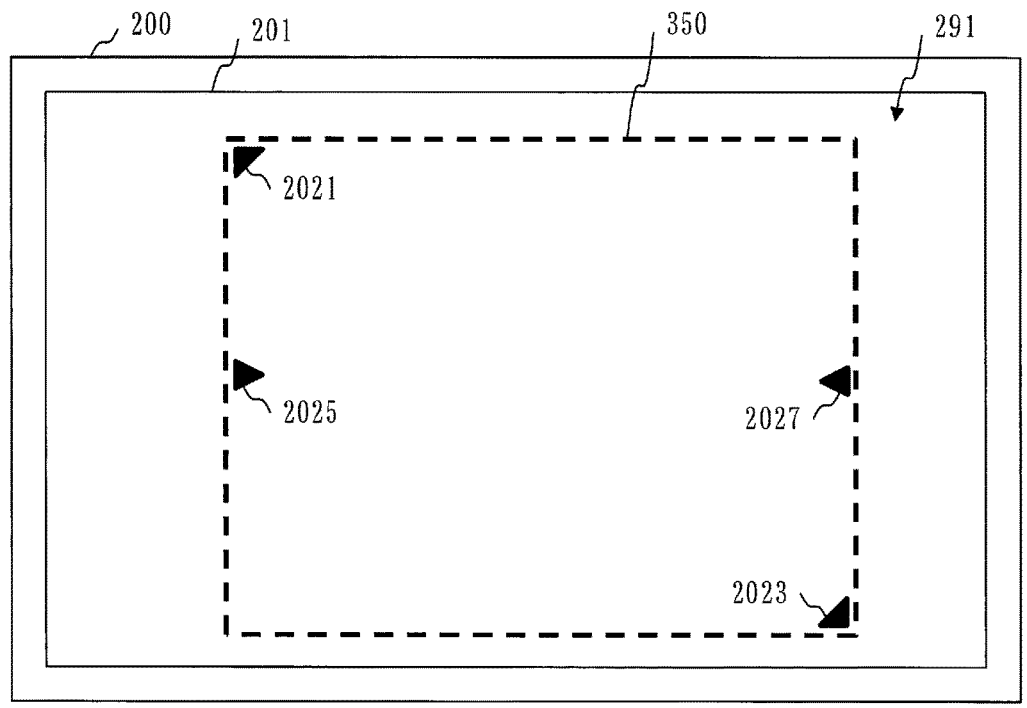
FIG. 31 is a diagram illustrating an example of a marker image 291 according to Embodiment 4.

FIG. 31 is a diagram illustrating an example of the marker image 291 according to Embodiment 4.

For example, the marker image generation unit 210 generates a marker image 291 as illustrated in FIG. 31. The marker image 291 is an image in which four markers 2021 to 2027 are arranged in a merged area 350. The markers 2021 to 2027 may be two-dimensional codes (see FIGS. 11 and 12).

For example, the marker image generation unit 210 determines the number and positions of the markers 202 based on the individual window areas of the windows 3401 and 3402 (see FIG. 30) displayed in the merged area 350.

For example, the marker image generation unit 210 arranges markers at the two corners among the four corners of the merged area 350, that is, the marker 2021 at the upper left corner in contact with the window 3401 and the marker 2023 at the lower right corner in contact with the window 3402.

For example, the marker image generation unit 210 arranges markers at the intermediate portions of the two sides among the four sides of the merged area 350, that is, the marker 2025 at the intermediate portion of the left side in contact with the window 3401 and the marker 2027 at the intermediate portion of the right side in contact with the window 3402.

The marker image generation unit 210 may generate a marker image 291 in which one to three markers 202 or five or more markers 202 are arranged.

Back to FIG. 28, the explanation resumes with S230.

In S230, a marker superimposed image generation unit 230 generates a marker superimposed image 293 by superimposing the marker image 291 over the information processing image 292.

After S230, the process proceeds to S240.

Figure 32:
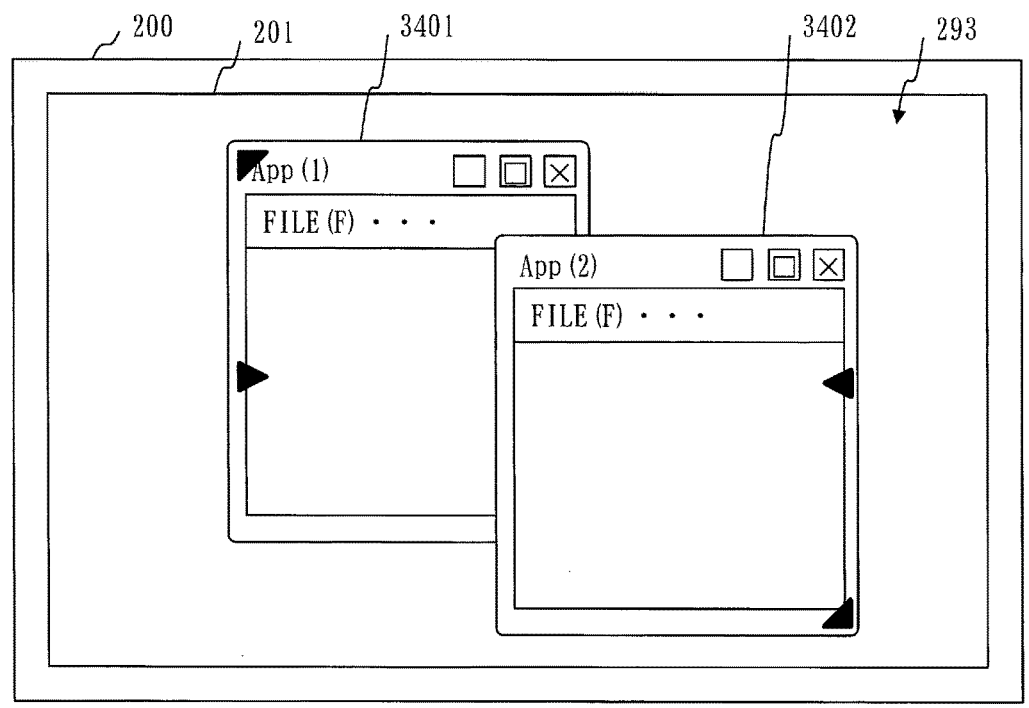
FIG. 32 is a diagram illustrating an example of a marker superimposed image 293 according to Embodiment 4.

FIG. 32 is a diagram illustrating an example of the marker superimposed image 293 according to Embodiment 4.

For example, the marker superimposed image generation unit 230 generates a marker superimposed image 293 as illustrated in FIG. 32 by superimposing the marker image 291 (see FIG. 31) over the information processing image 292 (see FIG. 29).

Back to FIG. 28, the explanation resumes with S240.

In S240, a marker superimposed image display unit 240 displays the marker superimposed image 293 to a display area 201 of the information processing device. For example, the marker superimposed image display unit 240 displays the marker superimposed image 293 to the display area 201, as illustrated in FIG. 32.

After S240, the marker display process ends.

Figure 33:
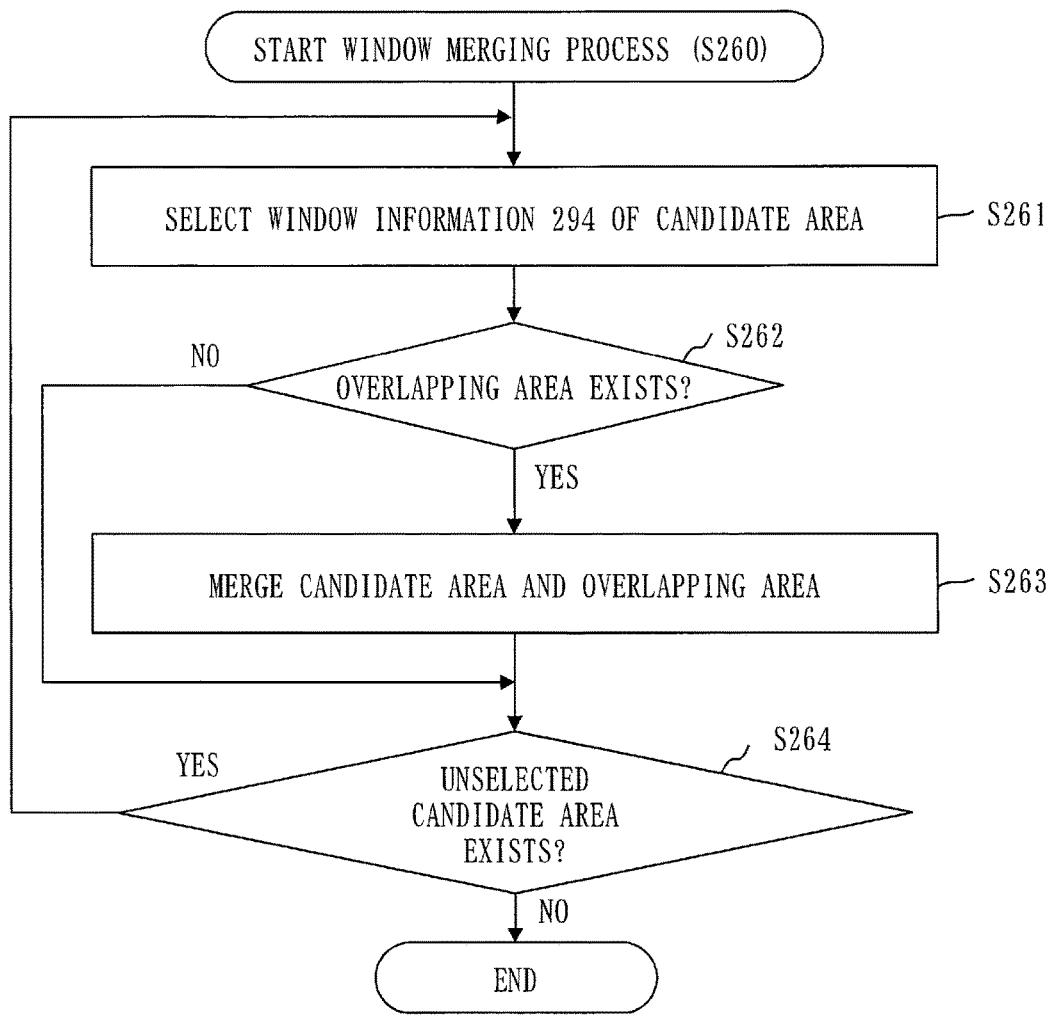
FIG. 33 is a flowchart illustrating a window merging process (S260) according to Embodiment 4.

FIG. 33 is a flowchart illustrating a window merging process (S260) according to Embodiment 4.

The window merging process (S260) according to Embodiment 4 will be described with referring to FIG. 33. The window merging process (S260) may be different from that of FIG. 33.

In S261, the window merging unit 260 selects one piece of window information 294 that has not been selected as the window information 294 of a candidate area. A candidate area signifies a candidate of a window area involved in the merged area 350.

After S261, the process proceeds to S262.

In S262, based on the individual window area information included in the window information 294 of a candidate area and in the other window information 294, the window merging unit 260 checks whether there is window information 294 of an overlapping area. An overlapping area is a window area that overlaps with the candidate area at least partly.

If there is window information 294 of an overlapping area (YES), the process proceeds to S263.

If there is no window information 294 of an overlapping area (NO), the process proceeds to S264.

In S263, the window merging unit 260 generates dummy window information 294 based on the window information 294 of the candidate area and the window information 294 of the overlapping area.

The dummy window information 294 includes dummy window area information, the window handle of the candidate area, the window handle of the overlapping area, and so on.

The dummy window area information indicates a tentative merged area formed by merging the candidate area and the overlapping area. The window merging unit 260 calculates the tentative merged area based on the window area information of the candidate area and the window area information of the overlapping area. For example, the window merging unit 260 calculates the minimum rectangular area involving the candidate area and overlapping area, as the tentative merged area.

In the window merging process (S260), after the dummy window information 294 is generated, the window information 294 of the candidate area and the window information 294 of the overlapping area are replaced by the dummy window information 294.

After S263, the process proceeds to S264.

In S264, the window merging unit 260 checks whether there is unselected window information 294 that has not been selected as the window information 294 of the candidate area. The dummy window information 294 generated in S263 is unselected window information 294.

If there is unselected window information 294 (YES), the process returns to S261.

If there is no unselected window information 294 (NO), the window merging process (S260) ends.

The dummy window information 294 remaining after the window merging process (S260) becomes the merged information 297. Namely, the dummy window area information becomes the merged area information. The window handle included in the dummy window information 294 identifies the window 340 involved in the merged area 350.

Figure 34:
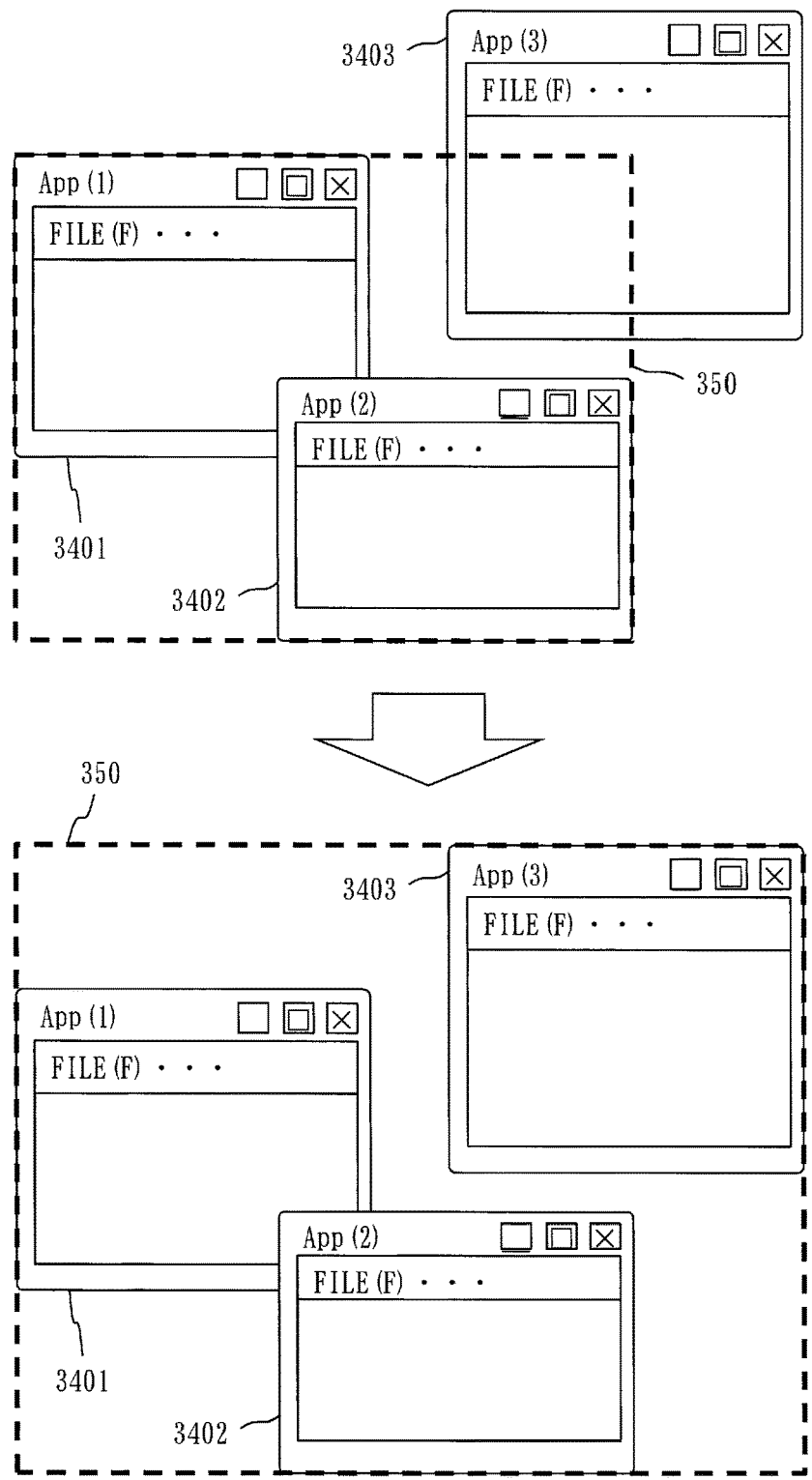
FIG. 34 is a diagram illustrating an example of the merged area 350 according to Embodiment 4.

FIG. 34 is a diagram illustrating an example of the merged area 350 according to Embodiment 4.

In the upper half of FIG. 34, assume that the window area of the window 3401 and the window area of the window 3402 overlap. In this case, the window merging unit 260 calculates a tentative merged area 350 including the window area of the window 3401 and the window area of the window 3402. The tentative merged area 350 means the dummy window area.

If the dummy window area (tentative merged area 350) and the window area of the window 3403 overlap, the window merging unit 260 calculates a merged area 350 involving the dummy window area and the window area of the window 3403 (see the lower half of FIG. 4).

If the windows 3401, 3402, and 3403 do not overlap with each other, the window merging unit 260 may calculate a merged area 350 that involves the windows 3401, 3402, and 3403.

According to Embodiment 4, the information processing device 200 can display markers to a merged area formed by merging a plurality of window areas some of which overlap.

Embodiment 5.

An embodiment will be described in which markers are displayed in a merged area formed by merging a plurality of window areas some of which overlap.

Matters that are not described in Embodiments 1 to 4 will mainly be described hereinafter. Matters whose description is omitted are equivalent to their counterparts in Embodiments 1 to 4.

Figure 35:
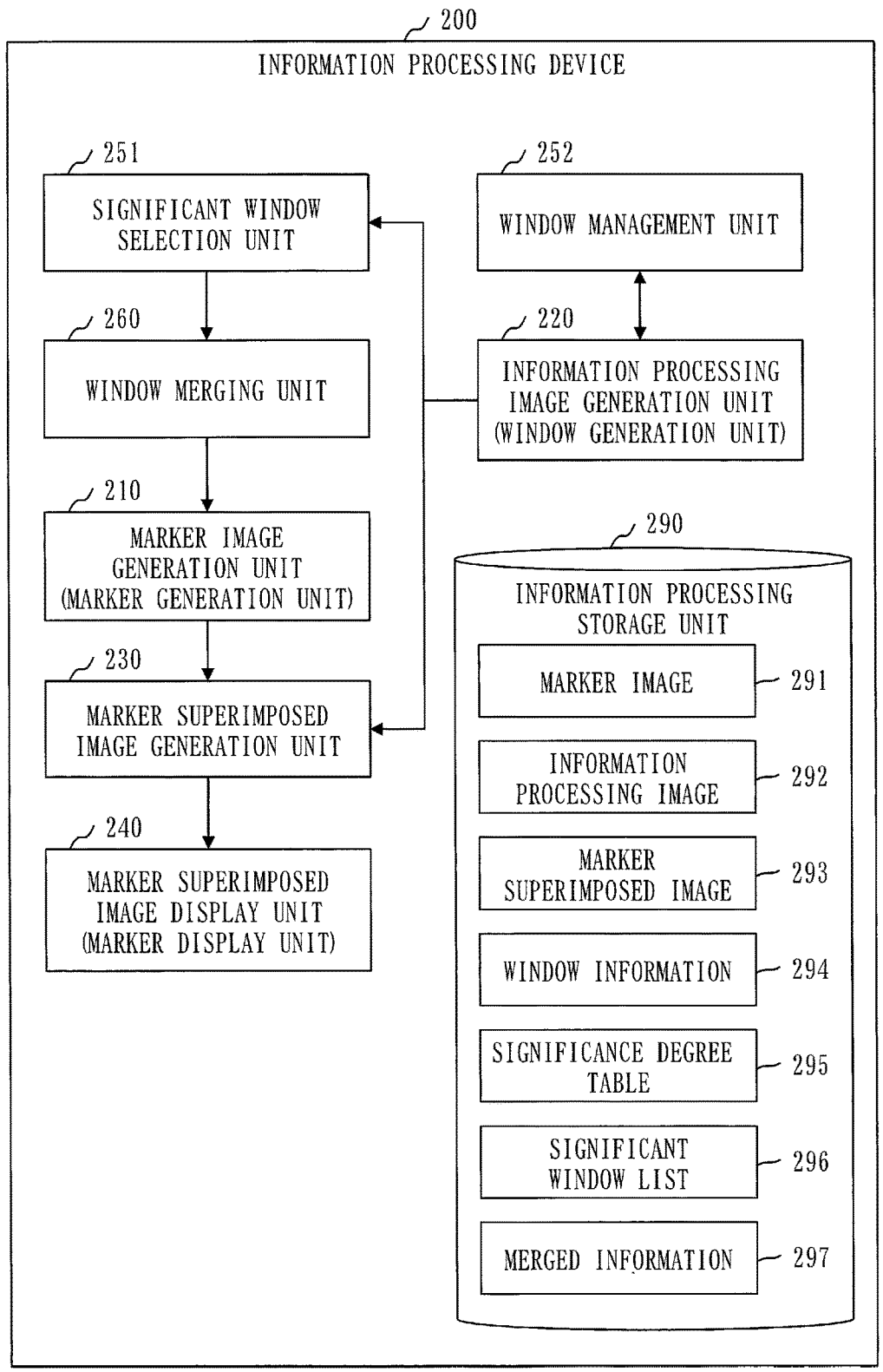
FIG. 35 is a functional configuration diagram of an information processing device 200 according to Embodiment 5.

FIG. 35 is a functional configuration diagram of an information processing device 200 according to Embodiment 5.

The functional configuration of the information processing device 200 according to Embodiment 5 will be described with referring to FIG. 35. The functional configuration of the information processing device 200 may be different from that of FIG. 35.

The information processing device 200 is provided with a window merging unit 260 in addition to the function described in Embodiment 3 (see FIG. 22).

The window merging unit 260 is equivalent to the function described in Embodiment 4 (see FIGS. 27, 33, and so on).

Figure 36:
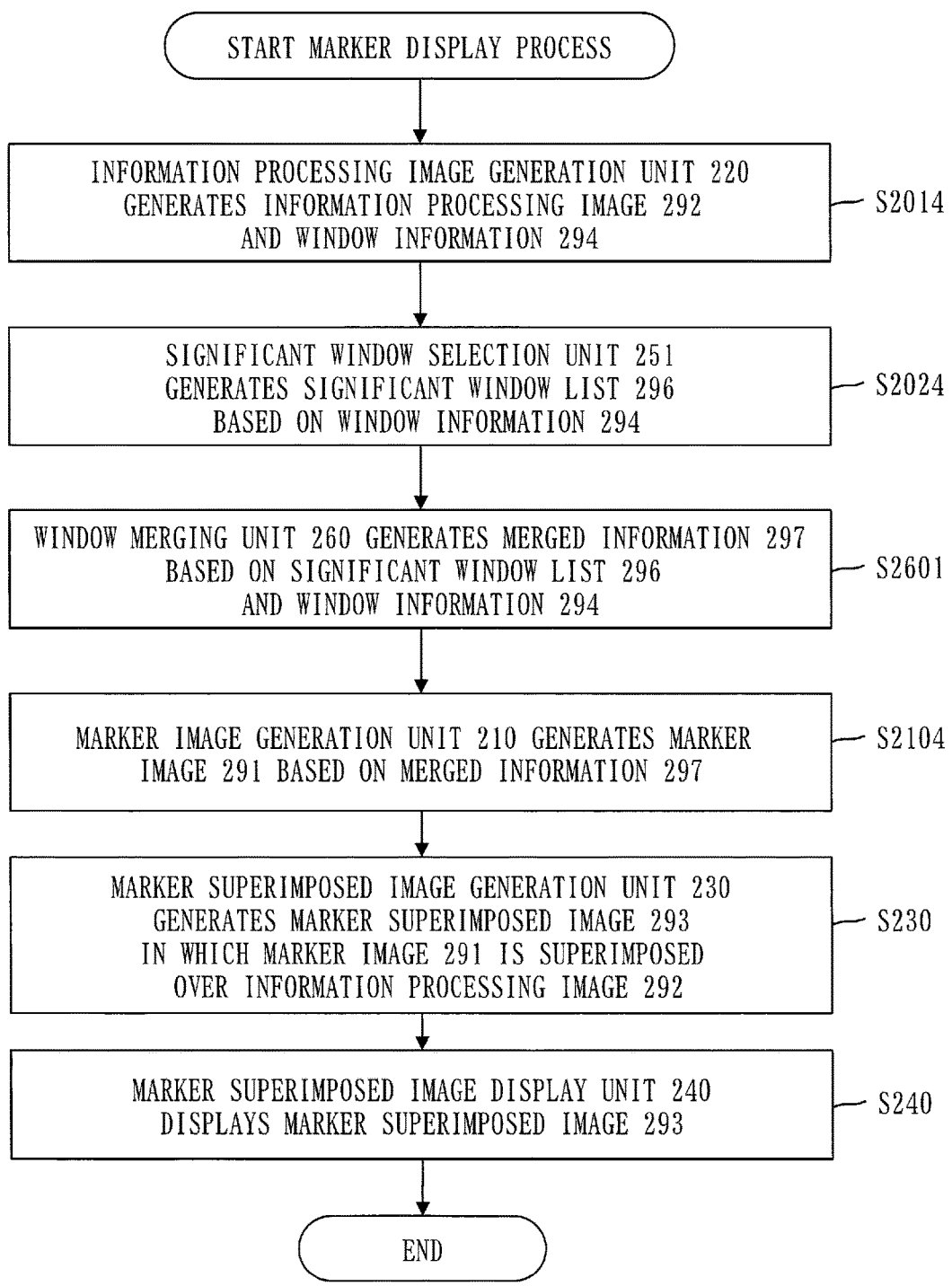
FIG. 36 is a flowchart illustrating a marker display process of the information processing device 200 according to Embodiment 5.

FIG. 36 is a flowchart illustrating a marker display process of the information processing device 200 according to Embodiment 5.

The marker display process of the information processing device 200 according to Embodiment 5 will be described with referring to FIG. 36. The marker display process may be different from that of FIG. 36.

In S2014, an information processing image generation unit 220 generates an information processing image 292 and window information 294 by utilizing a window management unit 252 (the same as S2012 of FIG. 23).

After S2014, the process proceeds to S2024.

In S2024, a significant window selection unit 251 generates a significant window list 296 based on the significance degree included in the window information 294 of the individual windows 340 (the same as S2024 of FIG. 23).

After S2024, the process proceeds to S2601.

In S2601, the window merging unit 260 selects window information 294 including the same window handle as the window handle included in the significant window list 296.

The window merging unit 260 calculates a merged area 350 based on the window area included in the selected window information 294 and generates merged information 297 including merged area information indicating the calculated merged area 350. A method of calculating the merged area 350 and a method of generating the merged information 297 are the same as those of Embodiment 4 (see S260 of FIG. 28).

With S2601, a merged area 350 as illustrated in FIG. 30 is calculated.

After S2601, the process proceeds to S2104.

In S2104, the marker image generation unit 210 generates a marker image 291 based on the merged information 297 (the same as S2103 of FIG. 28).

With S2104, the marker image 291 as illustrated in FIG. 31 is generated.

After S2104, the process proceeds to S230.

In S230, a marker superimposed image generation unit 230 generates a marker superimposed image 293 by superimposing the marker image 291 over the information processing image 292.

With S230, a marker superimposed image 293 as illustrated in FIG. 32 is generated.

After S230, the process proceeds to S240.

In S240, a marker superimposed image display unit 240 displays the marker superimposed image 293 to a display area 201 of the information processing device.

With S240, the marker superimposed image 293 is displayed in the display area 201, as illustrated in FIG. 32.

After S240, the marker display process ends.

According to Embodiment 5, markers can be displayed in a merged area formed by merging a plurality of window areas some of which overlap.

Embodiment 6.

An AR device 100 will be described in detail.

Matters that are not described in Embodiments 1 to 5 will mainly be described hereinafter. Matters whose description is omitted are equivalent to their counterparts in Embodiments 1 to 5.

Figure 37:
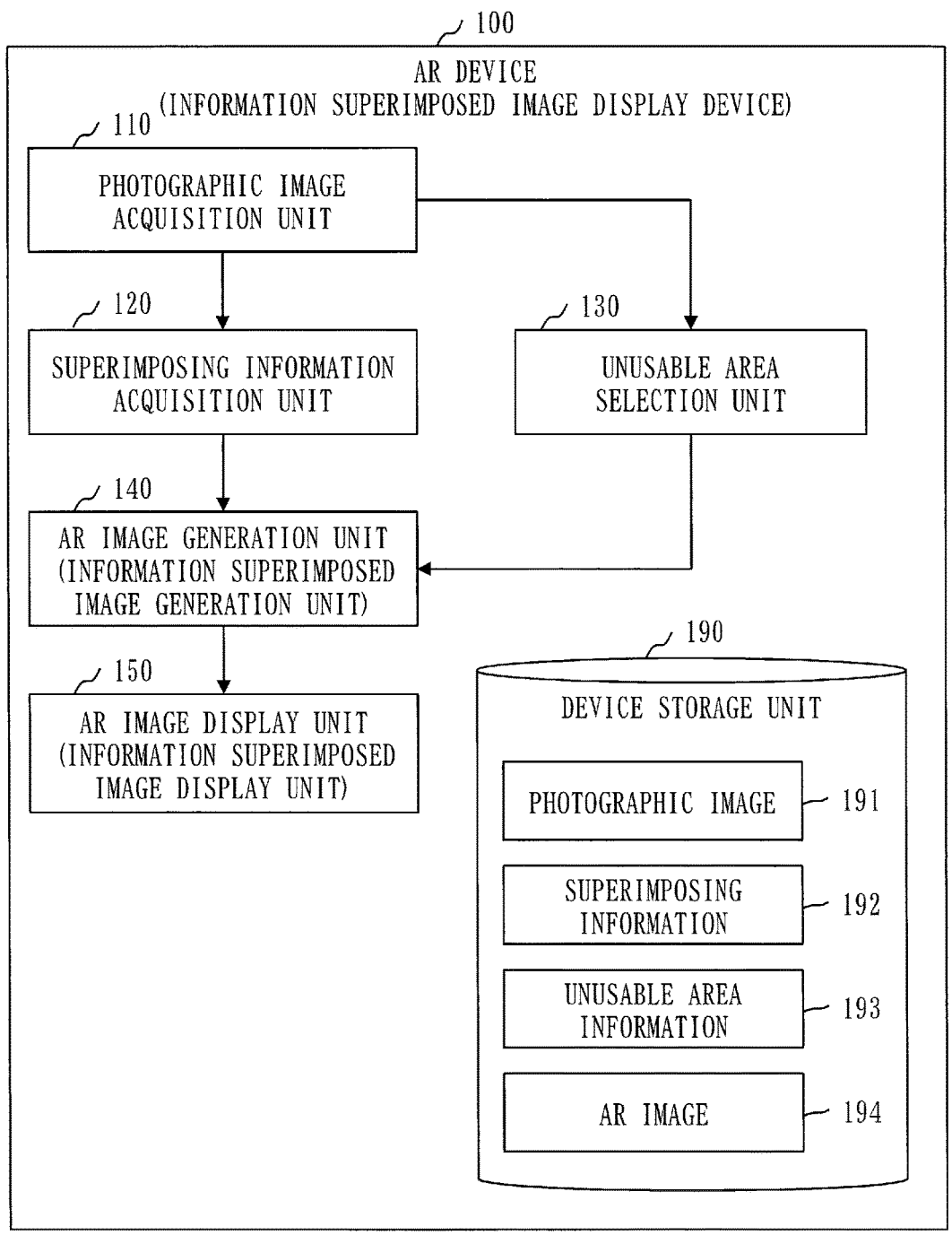
FIG. 37 is a functional configuration diagram of an AR device 100 according to Embodiment 6.

FIG. 37 is a functional configuration diagram of an AR device 100 according to Embodiment 6.

The functional configuration of the AR device 100 according to Embodiment 6 will be described with referring to FIG. 37. The functional configuration of the AR device 100 may be different from that illustrated in FIG. 37.

The AR device 100 (an example of an information superimposed image display device) is a device that displays an AR image 194 in the display area of an AR display device provided to the AR device 100.

The AR device 100 is provided with a photographic image acquisition unit 110, a superimposing information acquisition unit 120, an unusable area selection unit 130, an AR image generation unit 140 (an example of an information superimposed image generation unit), an AR image display unit 150 (an example of an information superimposed image display unit), and a device storage unit 190.

The photographic image acquisition unit 110 acquires a photographic image 191 generated by a camera. The photographic image 191 shows a photographic area where an information processing display device exists. The information processing display device displays, in the display area, markers 202 being signs for the display area.

The superimposing information acquisition unit 120 acquires superimposing information 192 to be superimposed over the photographic image 191.

The unusable area selection unit 130 selects an image area showing the display area of the information processing display device from the photographic image 191 based on the markers 202 shown on the photographic image 191, and generates unusable area information 193 indicating the selected image area as an unusable area.

The AR image generation unit 140 generates an AR image 194 based on the superimposing information 192 and the unusable area information 193. The AR image 194 is the photographic image 191 with the superimposing information 192 being superimposed on an image area other than the unusable area.

The AR image display unit 150 displays the AR image 194 onto an AR display device.

The device storage unit 190 stores data which is used, generated, or received/outputted by the AR device 100.

For example, the device storage unit 190 stores the photographic image 191, superimposing information 192, unusable area information 193, AR image 194, and so on.

Figure 38:
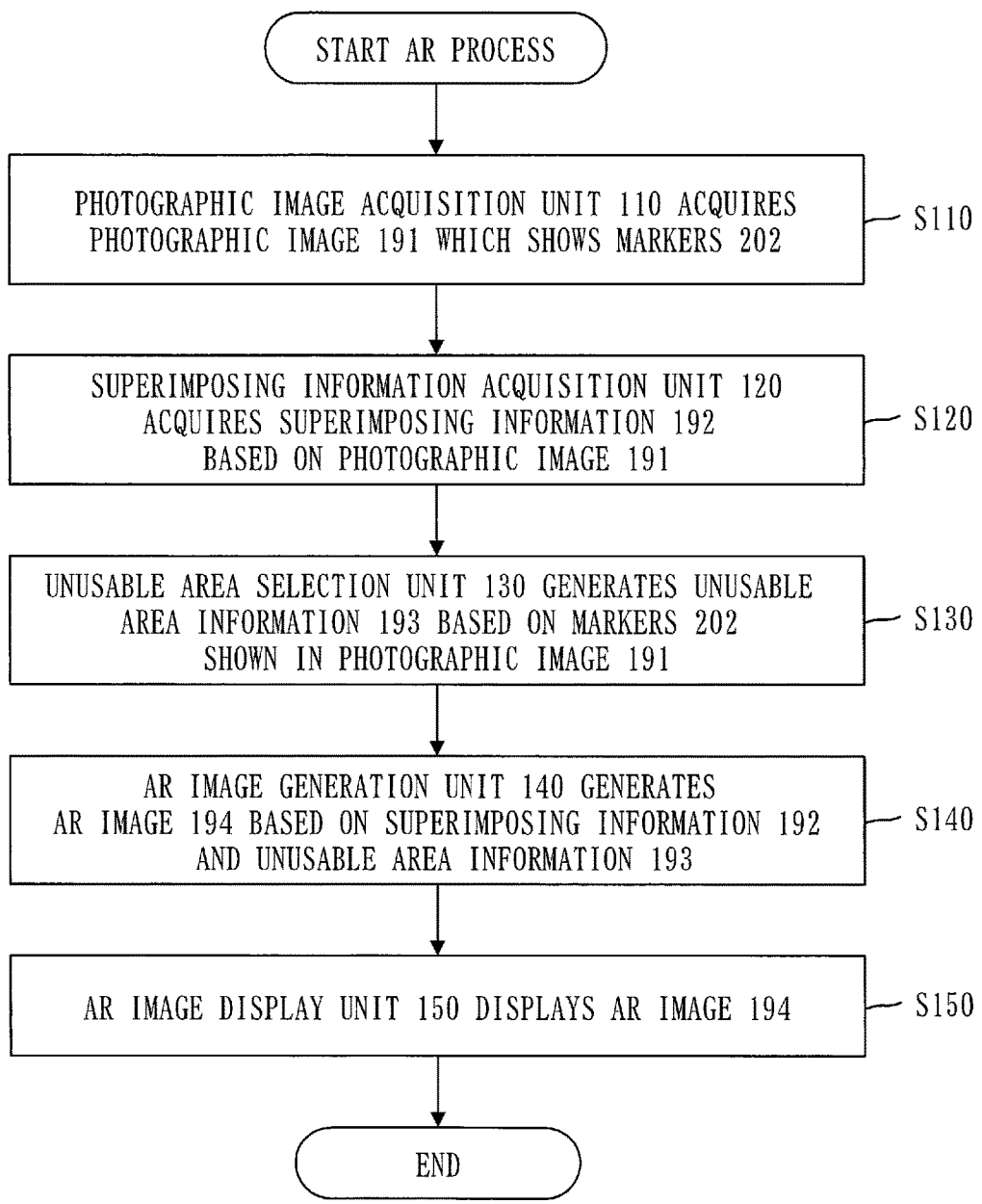
FIG. 38 is a flowchart illustrating an AR process of the AR device 100 according to Embodiment 6.

FIG. 38 is a flowchart illustrating the AR process of the AR device 100 according to Embodiment 1.

The AR process of the AR device 100 according to Embodiment 6 will be described with referring to FIG. 38. The AR process may be a process different from that of FIG. 38.

The AR process illustrated in FIG. 38 is executed each time the camera of the AR device 100 generates a photographic image 191.

In S110, the photographic image acquisition unit 110 acquires the photographic image 191 generated by the camera of the AR device 100.

The photographic image 191 shows an information processing device whose display area displays the markers 202.

After S110, the process proceeds to S120.

Figure 39:
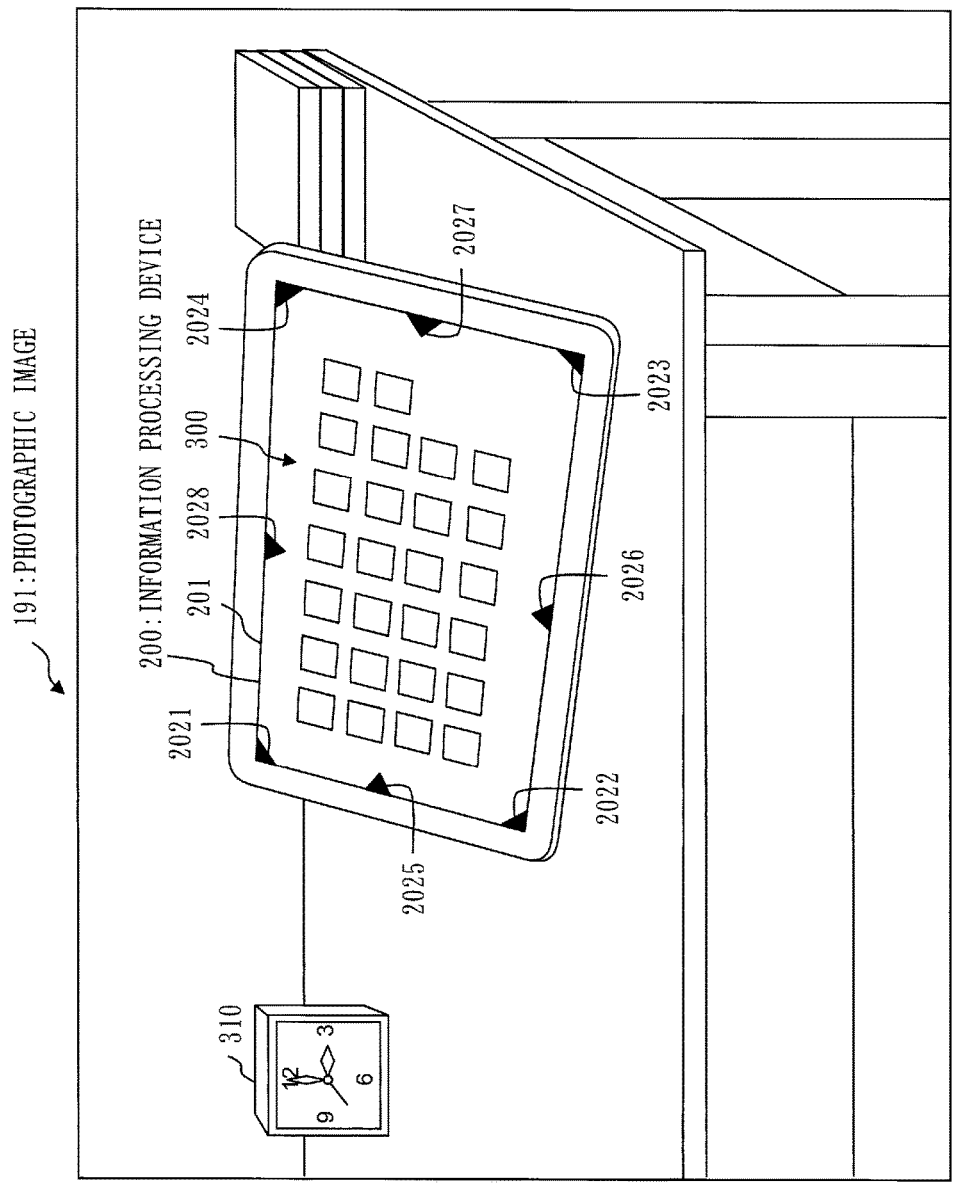
FIG. 39 is a diagram illustrating an example of a photographic image 191 according to Embodiment 6.

FIG. 39 is a diagram illustrating an example of a photographic image 191 according to Embodiment 1.

For example, the photographic image acquisition unit 110 acquires a photographic image 191 as illustrated in FIG. 39.

The photographic image 191 shows a photographic area including a tablet-type information processing device 200 and a clock 310.

The tablet-type information processing device 200 is provided with a display device. The display device of the information processing device 200 is provided with a display area 201 that displays the markers 202.

Back to FIG. 38, the explanation resumes with S120.

In S120, the superimposing information acquisition unit 120 acquires the superimposing information 192 to be superimposed over the photographic image 191.

For example, the superimposing information acquisition unit 120 detects the clock 310 from the photographic image 191 (see FIG. 39) and acquires superimposing information 192 concerning the clock 310.

A superimposing information acquisition process (S120) will be described later in detail in another embodiment.

After S120, the process proceeds to S130. S120 may be executed after S130. Alternatively, S120 may be executed in parallel with S130.

In S130, the unusable area selection unit 130 detects the markers 202 from the photographic image 191.

The unusable area selection unit 130 selects an image area that shows the display area 201 of the information processing device 200, from the photographic image 191 as an unusable area 390 based on the positions, shapes, colors, and the like of the detected markers 202.

The unusable area selection unit 130 then generates the unusable area information 193 which shows the unusable area.

When markers 202 are displayed in a window area that displays a window 340 (see FIG. 21), the unusable area selection unit 130 selects the image area that shows the window 340, as the unusable area 390.

For example, the unusable area selection unit 130 detects markers 2021 to 2028 from the photographic image 191 (see FIG. 39) and selects the display area 201 as an unusable area 390 based on the shapes and colors of the detected markers 2021 to 2028.

When only some of the markers out of the markers 2021 to 2028 displayed in the display area 201 can be detected, the unusable area selection unit 130 selects the unusable area 390 based on those some detected markers.

If an image area closed by those some detected markers cannot be obtained, the unusable area selection unit 130 need not necessarily select the unusable area 390 based on those some detected markers.

When the markers 202 are two-dimensional codes, the unusable area selection unit 130 reads information included in the two-dimensional codes and selects the unusable area 390 based on the readout information.

An information processing storage unit 290 may store a selection rule file which indicates selection rules for selecting the unusable area 390 based on the markers 202.

In this case, the unusable area selection unit 130 selects the unusable area 390 based on the markers 202 and the selection rule file.

After S130, the process proceeds to S140.

Figure 40:
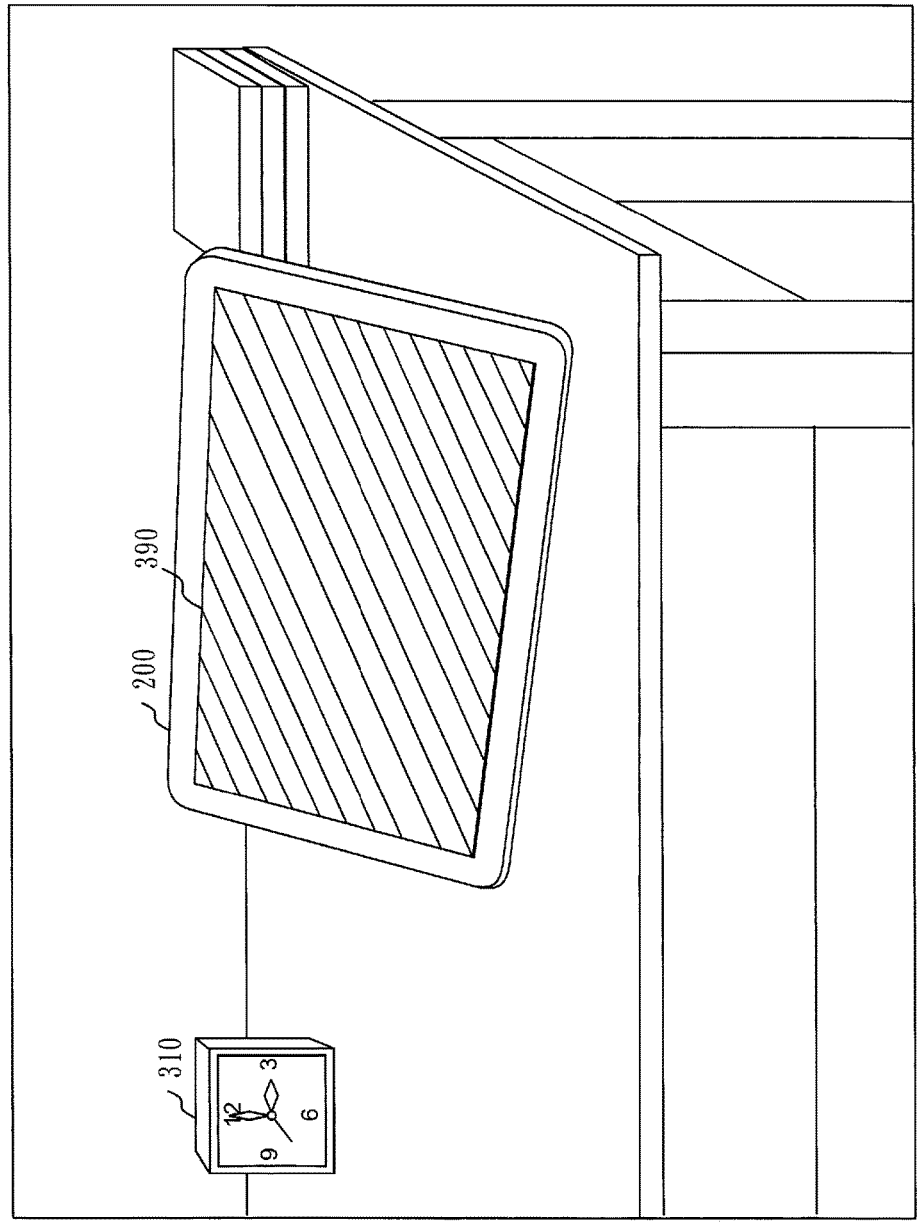
FIG. 40 is a diagram illustrating an example of an unusable area 390 involved in the photographic image 191 according to Embodiment 6.

FIG. 40 is a diagram illustrating an example of the unusable area 390 involved in the photographic image 191 according to Embodiment 6.

The unusable area selection unit 130 selects the display area 201 (halftone portion) of the information processing device 200 as the unusable area 390 based on the markers 2021 to 2028 shown on the photographic image 191 (see FIG. 39).

Figure 41:
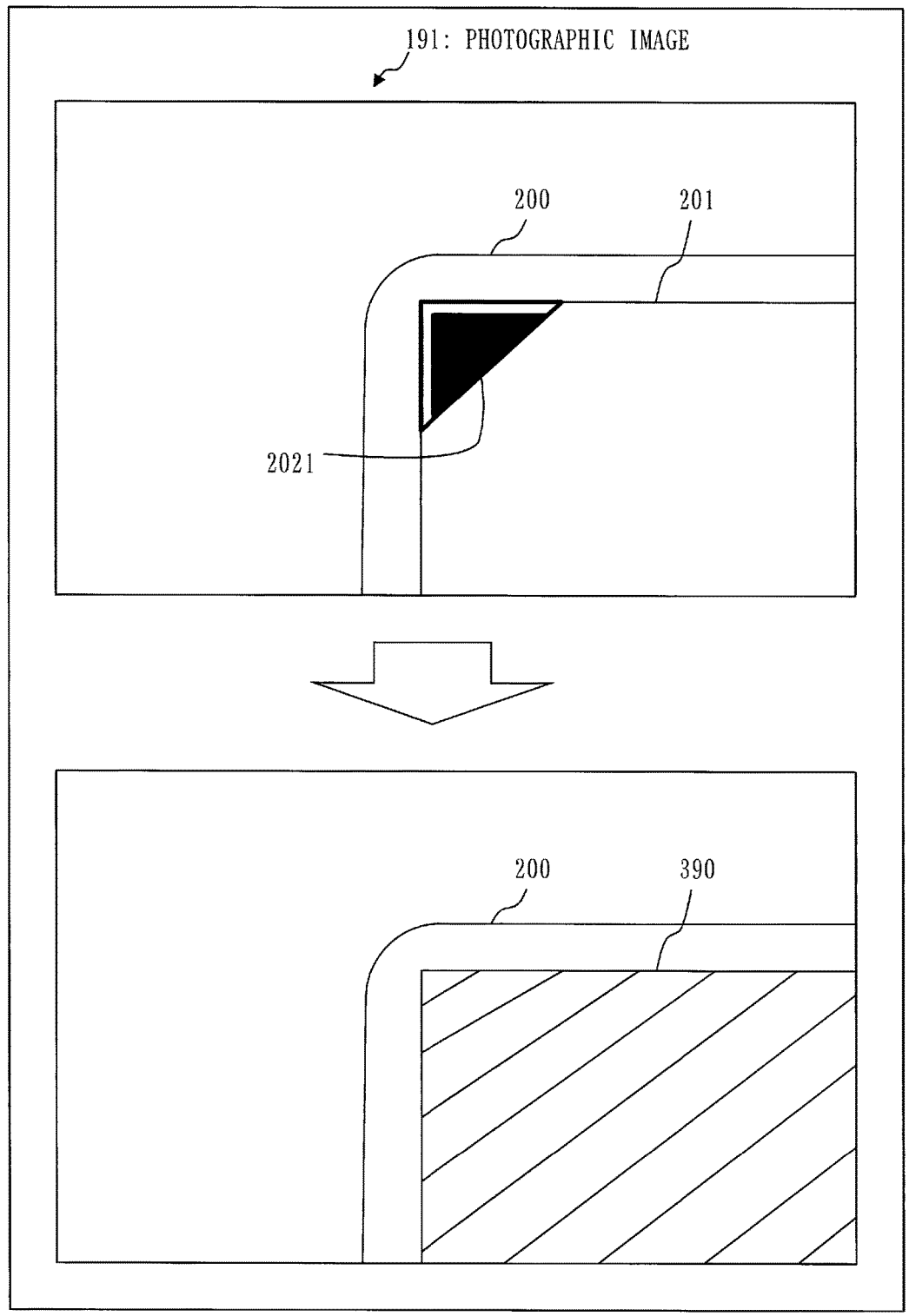
FIG. 41 is a diagram illustrating an example of the unusable area 390 involved in the photographic image 191 according to Embodiment 6.

FIG. 41 is a diagram illustrating an example of the unusable area 390 involved in the photographic image 191 according to Embodiment 6.

When only the marker 2021 displayed on the upper left of the display area 201 can be detected from the photographic image 191 (see the upper half of FIG. 41), the unusable area selection unit 130 selects the image area (halftone portion) extending from the marker 2021 to the end of the photographic image 191, as an unusable area 390 (see lower half of FIG. 41).

Since the unusable area selection unit 130 cannot obtain an image area closed only by the marker 2021, the unusable area selection unit 130 may ignore the marker 2021 and need not necessarily select an unusable area 390.

Figure 42:
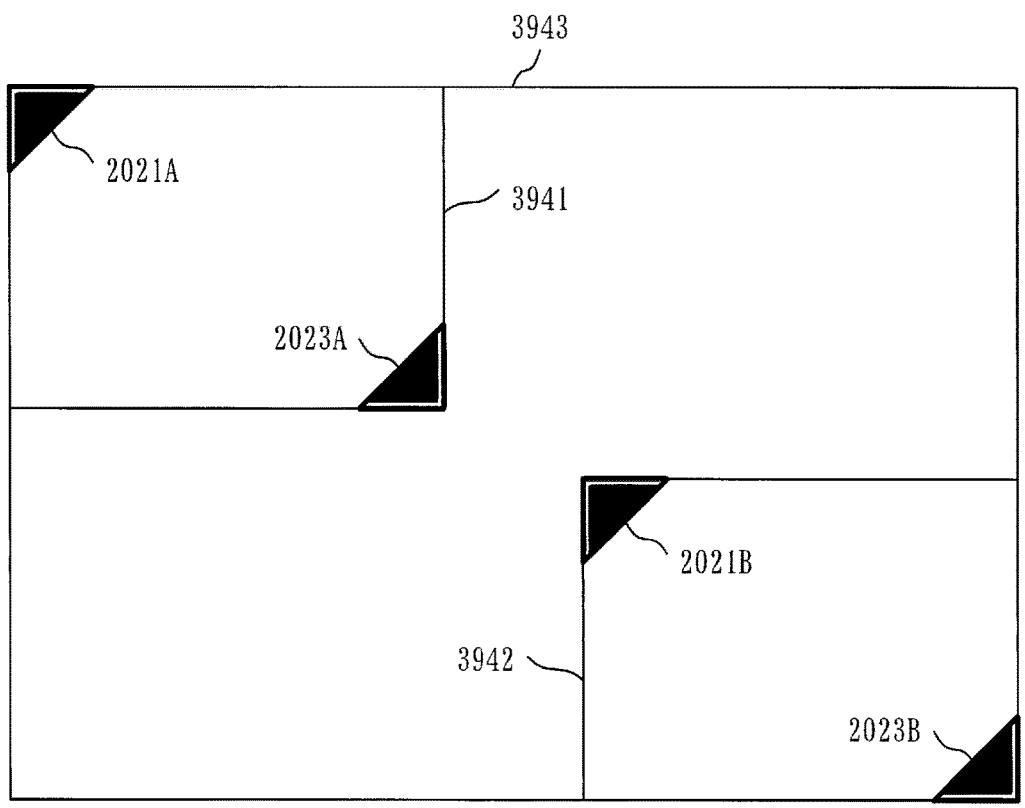
FIG. 42 is a diagram illustrating an example of the unusable area 390 according to Embodiment 6.

FIG. 42 is a diagram illustrating an example of the unusable area 390 according to Embodiment 6.

Referring to FIG. 42, a marker 2021A and a marker 2023A form a closed area 3941, and a marker 2021B and a marker 2023B form a closed area 3942. Furthermore, the marker 2021A and the marker 2023B form a closed area 3943.

In this manner, when a plurality of closed areas 394 are obtained from the markers 202, the unusable area selection unit 130 may select the individual small closed areas 3941 and 3942 as unusable areas 390, or a large closed area 3943 involving the individual closed areas 3941 and 3942 as an unusable area 390.

Back to FIG. 38, the explanation resumes with S140.

In S140, the AR image generation unit 140 generates the AR image 194 based on the superimposing information 192 and the unusable area information 193.

The AR image 194 is the photographic image 191 with the superimposing information 192 being superimposed to avoid the unusable area.

An AR image generation process (S140) will be described later in detail in another embodiment.

After S140, the process proceeds to S150.

Figure 43:
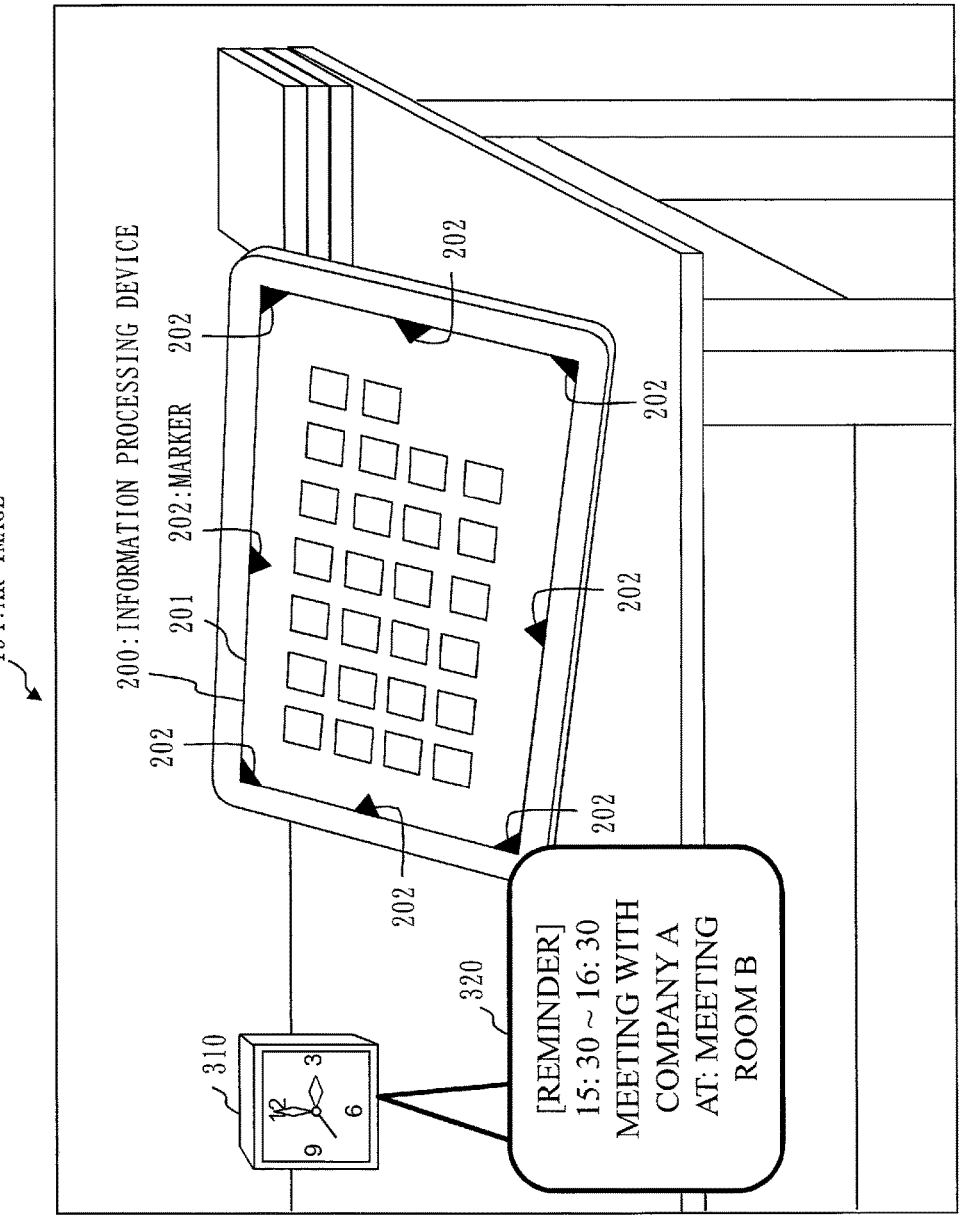
FIG. 43 is a diagram illustrating an example of an AR image 194 according to Embodiment 6.

FIG. 43 is a diagram illustrating an example of the AR image 194 according to Embodiment 6.

For example, the AR image generation unit 140 generates the AR image 194 as illustrated in FIG. 43.

The AR image 194 includes a speech-balloon-like information illustration 320. The information illustration 320 indicates, as superimposing information 192, schedule information of a time close to the current time indicated by a clock 310. The information illustration 320 is CG (Computer Graphics).

Back to FIG. 38, the explanation resumes with S150.

In S150, the AR image display unit 150 displays the AR image 194 on the display device of the AR device 100.

For example, the AR image display unit 150 displays the AR image 194 to a display area 101 of the display device provided to the AR device 100, as illustrated in FIG. 1.

After S150, the AR process for one photographic image 191 ends.

Figure 44:
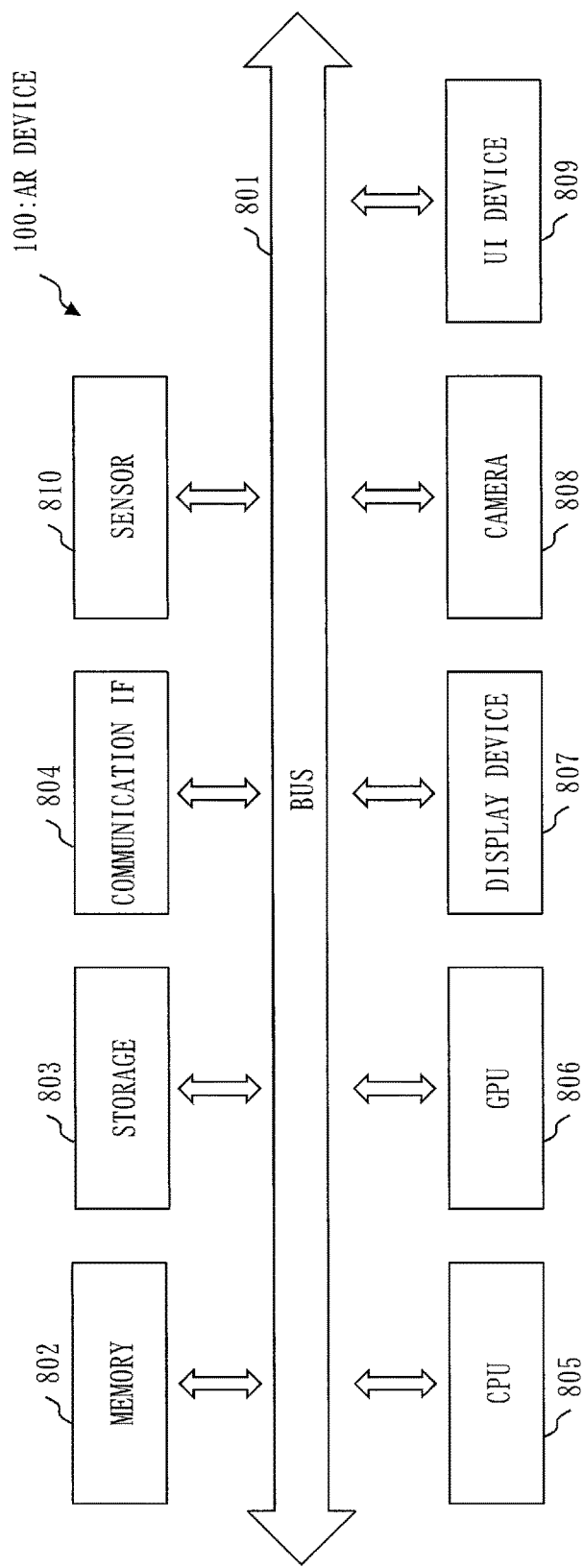
FIG. 44 is a hardware configuration diagram of the AR device 100 according to Embodiment 6.

FIG. 44 is a hardware configuration diagram of the AR device 100 according to Embodiment 6.

The hardware configuration of the AR device 100 according to Embodiment 6 will be described with referring to FIG. 44. The hardware configuration of the AR device 100 may be different from the configuration illustrated in FIG. 44.

The AR device 100 is provided with hardware that is similar to the hardware provided to the information processing device 200 (see FIG. 15).

A bus 801 is a data transmission path which the hardware of the AR device 100 uses to exchange data.

A memory 802 is a volatile storage device into which data is written or from which data is read out by the hardware of the AR device 100.

A storage 803 is a non-volatile storage device into which data is written or from which data is read out by the hardware of the AR device 100.

A communication interface 804 is a communication device which the AR device 100 uses to exchange data with an external computer.

A CPU 805 is a computation device that executes a process (for example, the AR process) carried out by the AR device 100.

A GPU 806 is a computation device that executes a process related to computer graphics (CG).

A display device 807 is a device that converts CG data into an optical output.

A user interface device 809 is an input device which the user utilizing the AR device 100 uses to operate the AR device 100.

A sensor 810 is a measuring device for detecting the AR device 100 or the surrounding circumstances.

The AR device 100 is further provided with a camera 808.

The camera 808 is a device that converts an optical input into data. Namely, the camera 808 is a photographing device that generates an image by photographing. Each image is called a still image. A plurality of still images that are time-base consecutive are called a motion image or video image.

Programs each for implementing the function described as "unit" are stored in the storage 803, loaded to the memory 802 from the storage 803, and executed by the CPU 805.

Information, data, files, signal values, or variable values representing the results of processes such as "determination", "checking", "extraction", "detection", "setting", "registration", "selection", "generation", "inputting", and "outputting" are stored in the memory 802 or storage 803.

According to Embodiment 6, the superimposing information 192 can be displayed over the photographic image 191 without hiding the display area 201 of the information processing device 200 shown on the photographic image 191.

Embodiment 7.

An embodiment will be described in which whether a window area is selected as an unusable area is determined based on the significance degree of the window indicated by markers.

Matters that are not described in Embodiments 1 to 6 will mainly be described hereinafter. Matters whose description is omitted are equivalent to their counterparts in Embodiments 1 to 6.

The functional configuration of an AR device 100 is equivalent to that of Embodiment 6 (see FIG. 37).

Note that a superimposing information acquisition unit 120 acquires superimposing information 192 together with the significance degree of the superimposing information 192.

For each unusable area 390, an unusable area selection unit 130 specifies the significance degree of a window 340 based on the shapes, colors, and so on of markers 202 superimposed on the window 340 shown in the unusable area 390.

The AR image generation unit 140 superimposes each piece of superimposing information 192 over a photographic image 191 to avoid the unusable area 390 that shows the window 340 having a higher significance degree than the significance degree of the superimposing information 192. That is, an AR image generation unit 140 may superimpose the superimposing information 192 over an unusable area 390 that shows a window 340 having a lower significance degree than the significance degree of the superimposing information 192.

According to Embodiment 7, the significant superimposing information 192 can be displayed prior to the information indicated by the non-significant window 340. For example, a situation can be prevented where, as a result of avoiding an image area showing a non-significant window 340, an image area that can display significant superimposing information 192 cannot be found and the significant superimposing information 192 cannot be displayed accordingly.

Embodiment 8.

An embodiment will be described in which a superimposing information acquisition unit 120 acquires, as superimposing information 192, information concerning an information processing image shown in a display area.

Matters that are not described in Embodiments 1 to 7 will mainly be described hereinafter. Matters whose description is omitted are equivalent to their counterparts in Embodiments 1 to 7.

Figure 45:
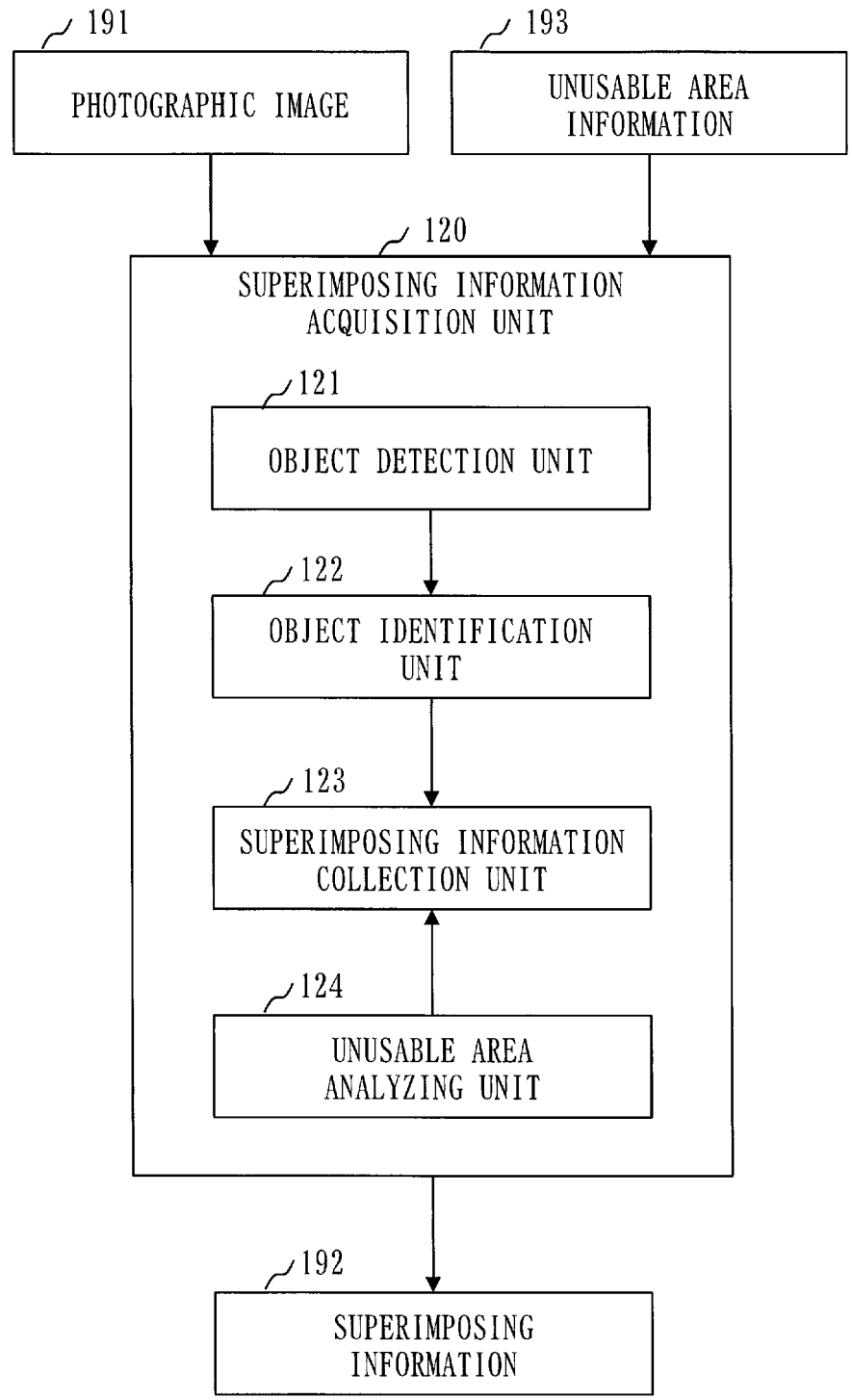
FIG. 45 is a functional configuration diagram of a superimposing information acquisition unit 120 according to Embodiment 8.

FIG. 45 is a functional configuration diagram of a superimposing information acquisition unit 120 according to Embodiment 8.

The functional configuration of the superimposing information acquisition unit 120 according to Embodiment 8 will be described with referring to FIG. 45. The functional configuration of the superimposing information acquisition unit 120 may be different from that in FIG. 45.

The superimposing information acquisition unit 120 is provided with an object detection unit 121, an object identification unit 122, a superimposing information collection unit 123, and an unusable area analyzing unit 124.

The object detection unit 121 detects an object shown on a photographic image 191 from the photographic image 191. In other words, the object detection unit 121 detects an object area where the object is shown, from the photographic image 191.

For example, the object detection unit 121 detects a clock 310 shown on the photographic image 191 (see FIG. 39) from the photographic image 191.

For example, the object detection unit 121 detects an object from the photographic image 191 by a marker method or markerless method.

The marker method is a method of detecting an object added with a marker, by detecting the marker added to the object (including the image of the object) from the photographic image 191. The marker is a special pattern such as barcode. The marker is created based on object information concerning the object. The object information includes type information indicating the type of the object, coordinate values representing the position of the object, size information indicating the size of the object, and so on.

The markerless method is a method of extracting a geometric or optical feature amount from the photographic image 191 and detecting an object based on the extracted feature amount. Amounts expressing the shape, color, and luminance of the object are examples of the feature amount expressing the feature of the object. Characters and symbols described on the object are examples of the feature amount expressing the feature of the object.

For example, the object detection unit 121 extracts an edge representing the shape of the object shown on the photographic image 191 and detects an object area surrounded by the extracted edge. Namely, the object detection unit 121 detects an object area whose boundary lines are formed of the extracted edge.

The object identification unit 122 identifies the type of the object detected by the object detection unit 121. The object identification unit 122 also acquires type information indicating the type of the object detected by the object detection unit 121.

For example, the type information is described in JSON format. The JSON is an abbreviation of JavaScript Object Notation. Java and JavaScript are registered trademarks.

For example, the object identification unit 122 identifies the detected object as a clock 310 based on the shape, face, hour hand, minute hand, second hand, and so on of the object detected from the photographic image 191 (see FIG. 39).

For example, when the object is detected by the marker method, the object identification unit 122 reads the type information of the object from the marker.

For example, when the object is detected by the markerless method, the object identification unit 122 acquires the type information of the object from the type information database using the feature amount of the detected object. The type information database is a database in which the type information of the object is related to the feature amount of the object. The type information database is created by machine learning of the feature amount of the object. The type information database may be either an external database provided to another computer, or an internal database provided to an AR device 100.

The superimposing information collection unit 123 acquires the object information concerning the object as superimposing information 192 based on the type of the object identified by the object identification unit 122. For example, the object information is described in JSON format.

The superimposing information collection unit 123 may acquire information other than the object information as the superimposing information 192. For example, the superimposing information collection unit 123 may acquire information related to the current date and time, position, climate, and so on as the superimposing information 192.

For example, when the object is detected by the marker method, the superimposing information collection unit 123 reads object information from the marker.

For example, when the object is detected by the markerless method, the superimposing information collection unit 123 acquires the object information or URI from the object information database using the type information of the object. The object information database is a database in which the object information or URI is related to the type information. The object information database may be either an external database or an internal database. URI is an abbreviation of Uniform Resource Identifier. URI may be replaced with URL (Uniform Resource Locator).

When a URI is acquired from the object information database, the superimposing information collection unit 123 acquires the object information from a storage area indicated by the URI. The storage area indicated by the URI may be a storage area provided to either the storage device included in another computer or a storage device included in the AR device 100.

Based on unusable area information 193, the unusable area analyzing unit 124 analyzes an information processing image 300 shown in an unusable area 390.

For example, the unusable area analyzing unit 124 detects an icon from the information processing image 300 by analyzing the information processing image 300.

The icon is linked to an electronic file (including an application program). The icon is a picture representing the contents of the linked electronic file. Sometimes a character string is added to the picture.

Based on the analysis result of the information processing image 300, the superimposing information collection unit 123 collects information related to the information processing image 300, as the superimposing information 192.

For example, the superimposing information collection unit 123 collects information related to the electronic file distinguished by the icon detected from the information processing image 300, as the superimposing information 192. The application program is an example of the electronic file.

For example, the superimposing information collection unit 123 collects application information from an application information database in which application information is related to the icon. The application name and version number are examples of information included in the application information. The application information database may be any one of a database provided to an information processing device 200, a database provided to the AR device 100, and a database provided to another computer.

Figure 46:
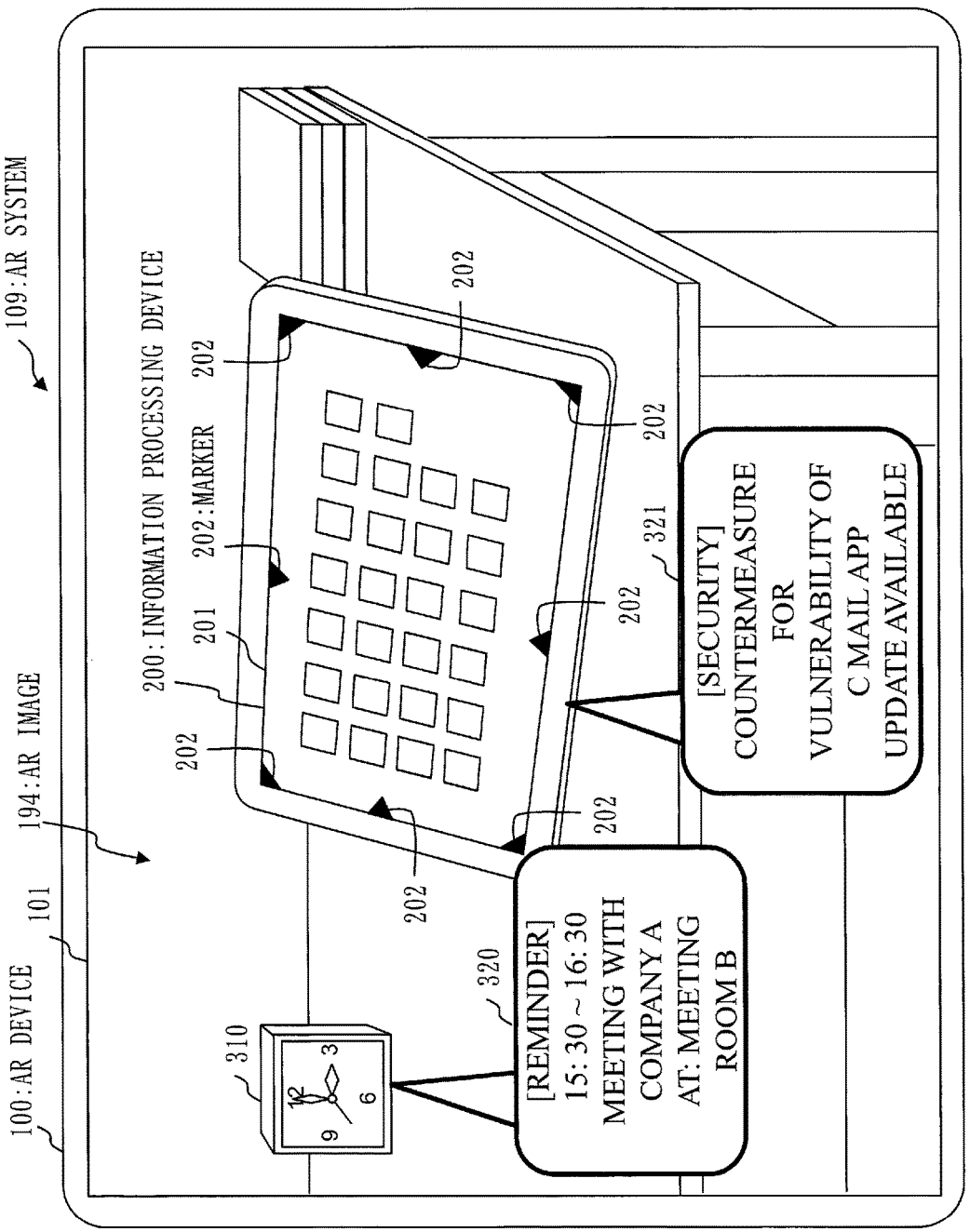
FIG. 46 is a diagram illustrating an example of an AR image 194 according to Embodiment 8.

FIG. 46 is a diagram illustrating an example of an AR image 194 according to Embodiment 8.

Referring to FIG. 46, the AR image 194 includes an information illustration 321 illustrating the application information and update information as the superimposing information 192. The update information is information indicating whether an update for the application program is available.

For example, the unusable area analyzing unit 124 detects a square icon from the information processing image 300.

Then, the superimposing information collection unit 123 acquires the application information concerning the application program which is discriminated by the detected icon, from the application information database. The superimposing information collection unit 123 also acquires the update information from an application management server with using the application name and version number included in the acquired application information. The application management server is a server for managing the application program.

According to Embodiment 8, the superimposing information 192 concerning an image displayed in the display area of the display device being a subject can be acquired.

Embodiment 9.

An AR image generation unit 140 of an AR device 100 will be described.

Matters that are not described in Embodiments 1 to 8 will mainly be described hereinafter. Matters whose description is omitted are equivalent to their counterparts in Embodiments 1 to 8.

Figure 47:
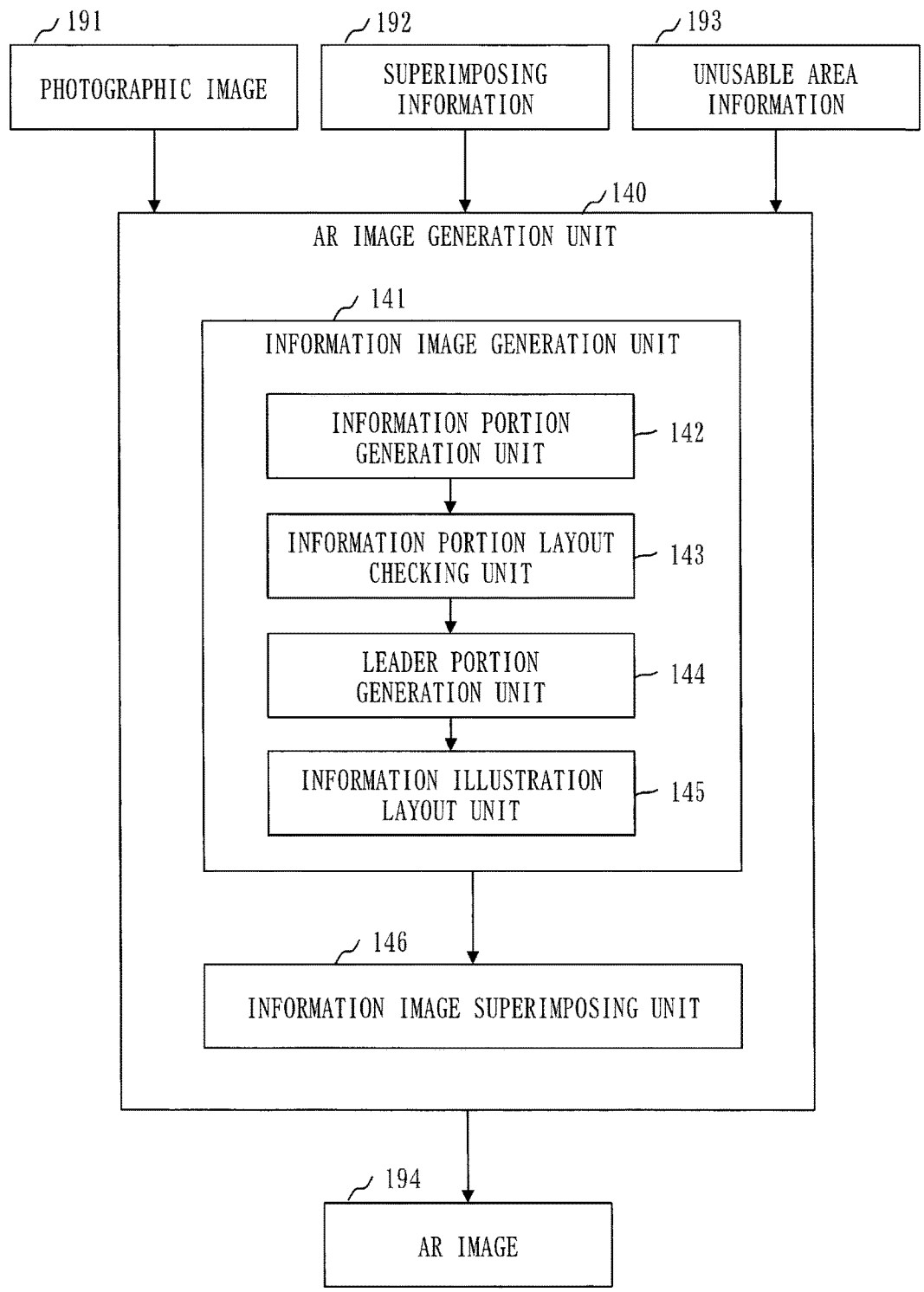
FIG. 47 is a functional configuration diagram of an AR image generation unit 140 according to Embodiment 9.

FIG. 47 is a functional configuration diagram of an AR image generation unit 140 according to Embodiment 9.

The functional configuration of the AR image generation unit 140 according to Embodiment 9 will be described with referring to FIG. 47. The functional configuration of the AR image generation unit 140 may be a functional configuration different from that in FIG. 47.

The AR image generation unit 140 is provided with an information image generation unit 141 and an information image superimposing unit 146.

The information image generation unit 141 generates an information image 329 including an information illustration 320 describing superimposing information 192.

The information image superimposing unit 146 generates an AR image 194 by superimposing the information image 329 over a photographic image 191.

The information image generation unit 141 is provided with an information portion generation unit 142, an information portion layout checking unit 143, a leader portion generation unit 144, and an information illustration layout unit 145.

The information portion generation unit 142 generates an information part illustration 322 showing the superimposing information 192 out of the information illustration 320.

Based on unusable area information 193, the information portion layout checking unit 143 checks whether or not the information part illustration 322 can be arranged on the photographic image 191 to avoid an unusable area 390. If the information part illustration 322 cannot be arranged on the photographic image 191 to avoid the unusable area 390, the information portion generation unit 142 generates an information part illustration 322 again.

The leader portion generation unit 144 generates a leader illustration 323 being an illustration in which the information part illustration 322 is associated with an object area showing an object related to the superimposing information 192.

The information illustration layout unit 145 generates the information image 329 in which an information illustration 320 including the information part illustration 322 and leader illustration 323 is arranged to avoid the unusable area 390.

Figure 48:
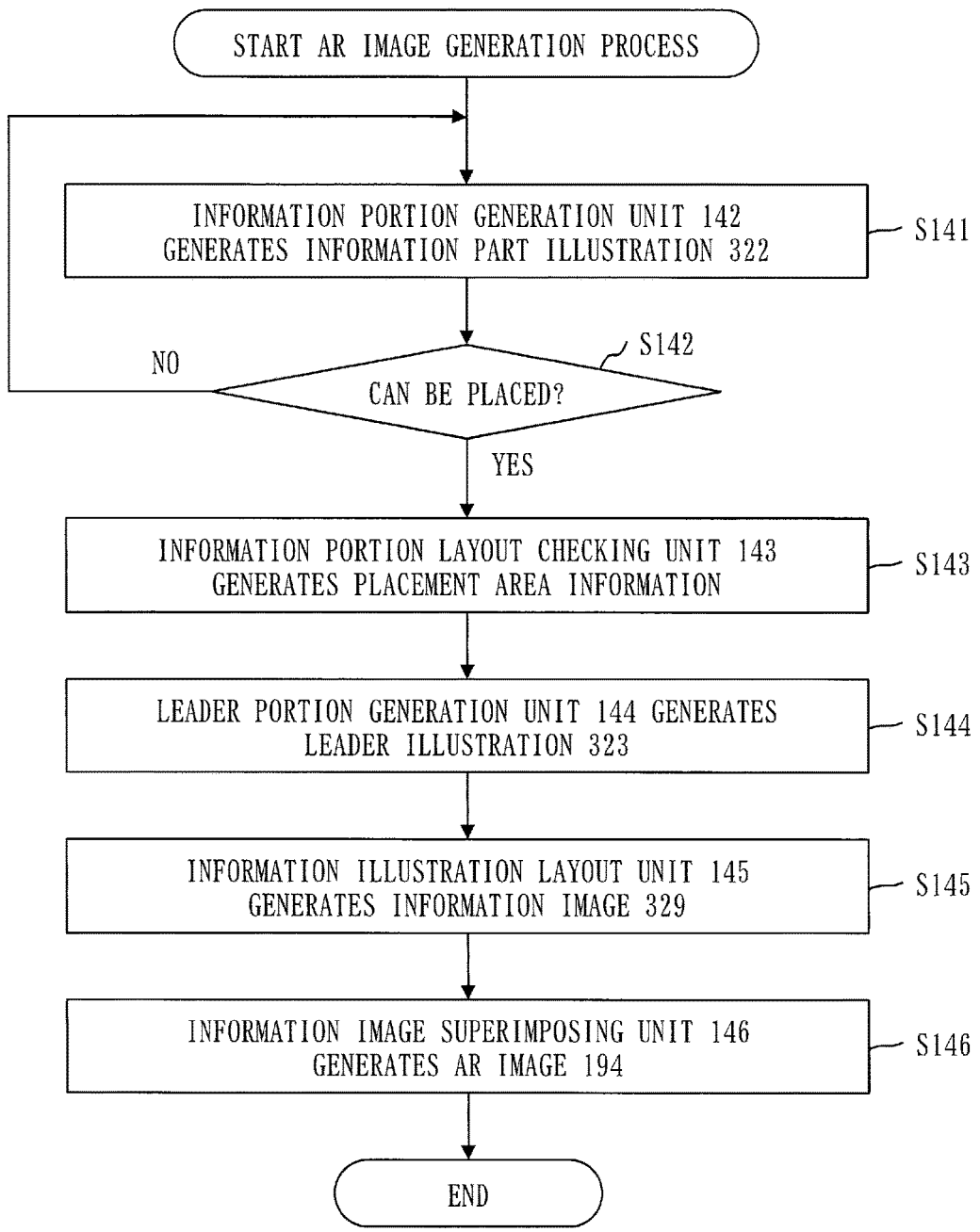
FIG. 48 is a flowchart illustrating an AR image generation process of the AR image generation unit 140 according to Embodiment 9.

FIG. 48 is a flowchart illustrating an AR image generation process of the AR image generation unit 140 according to Embodiment 9.

The AR image generation process of the AR image generation unit 140 according to Embodiment 9 will be described with referring to FIG. 48. The AR image generation process may be a process different from that in FIG. 48.

In S141, the information portion generation unit 142 generates the information part illustration 322 being an illustration representing the contents of the superimposing information 192. Where there are a plurality of pieces of superimposing information 192, the information portion generation unit 142 generates an information part illustration 322 for each piece of superimposing information 192.

After S141, the process proceeds to S142.

Figure 49:
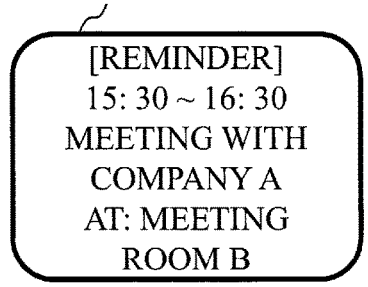
FIG. 49 is a diagram illustrating an example of an information part illustration 322 according to Embodiment 9.

FIG. 49 is a diagram illustrating an example of the information part illustration 322 according to Embodiment 9.

For example, the information portion generation unit 142 generates an information part illustration 322 as illustrated in FIG. 49. The information part illustration 322 is formed by surrounding a character string expressing the contents of the superimposing information 192 with a frame.

Back to FIG. 48, the explanation resumes with S142.

In S142, based on the unusable area information 193, the information portion layout checking unit 143 checks whether or not the information part illustration 322 can be arranged in the photographic image 191 to avoid the unusable area 390. Where there are a plurality of information part illustrations 322, the information portion layout checking unit 143 carries out checking for each information part illustration 322.

If the information part illustration 322 overlaps the unusable area 390 no matter where the information part illustration 322 is arranged in the photographic image 191, the information part illustration 322 cannot be arranged in the photographic image 191 to avoid the unusable area 390.

The information portion layout checking unit 143 may check whether the information part illustration 322 can be arranged in the photographic image 191 to avoid a remaining portion of the unusable area 390 which remains after that part of the unusable area 390 which shows a window 340 less significant than the superimposing information 192 is excluded.

If the information part illustration 322 can be arranged in the photographic image 191 to avoid the unusable area 390 (YES), the process proceeds to S143.

If the information part illustration 322 cannot be arranged in the photographic image 191 to avoid the unusable area 390 (NO), the process returns to S141.

When the process returns to S141, the information portion generation unit 142 generates an information part illustration 322 again.

For example, the information portion generation unit 142 deforms the information part illustration 322 or reduces the information part illustration 322.

Figure 50:
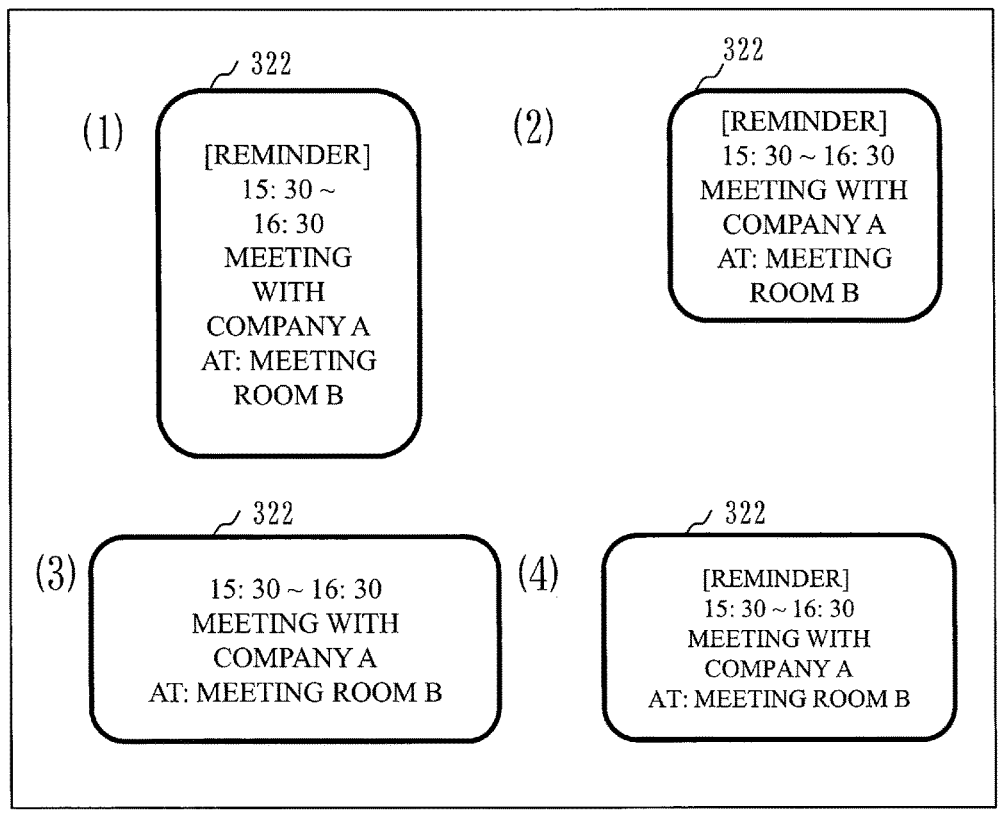
FIG. 50 is a diagram illustrating modifications of the information part illustration 322 according to Embodiment 9.

FIG. 50 is a diagram illustrating modifications of the information part illustration 322 according to Embodiment 9.

For example, the information portion generation unit 142 generates an information part illustration 322 (see FIG. 49) again as illustrated in (1) to (4) of FIG. 50.

In (1) of FIG. 50, the information portion generation unit 142 deforms the information part illustration 322 by changing the aspect ratio of the information part illustration 322.

In (2) of FIG. 50, the information portion generation unit 142 reduces the information part illustration 322 by deleting a blank around the character string (a blank included in the information part illustration 322).

In (3) of FIG. 50, the information portion generation unit 142 reduces the information part illustration 322 by changing or deleting part of the character string.

In (4) of FIG. 50, the information portion generation unit 142 reduces the information part illustration 322 by downsizing the characters in the character string.

Where the information part illustration 322 is an illustration expressed three-dimensionally, the information portion generation unit 142 may reduce the information part illustration 322 by changing the information part illustration 322 to a two-dimensional illustration. For example, if the information part illustration 322 is a shadowed illustration, the information portion generation unit 142 deletes the shadow portion from the information part illustration 322.

Back to FIG. 48, the explanation resumes with S143.

In S143, the information portion layout checking unit 143 generates layout area information indicating a layout area where the information part illustration 322 can be arranged. Where there are a plurality of information part illustrations 322, the information portion layout checking unit 143 generates layout area information for each information part illustration 322.

Where there are plurality of candidates for the layout area where the information part illustration 322 can be arranged, the information portion layout checking unit 143 selects the layout area based on object area information.

The object area information is information indicating an object area showing an object related to the information part illustration 322. The object area information can be generated by the object detection unit 121 of the superimposing information acquisition unit 120.

For example, the information portion layout checking unit 143 selects a candidate for a layout area nearest to the object area indicated by the object area information, as the layout area.

For example, where there are a plurality of information part illustrations 322, the information portion layout checking unit 143 selects, for each information part illustration 322, a candidate for a layout area that does not overlap with another information part illustration 322, as the layout area.

After S143, the process proceeds to S144.

In S144, based on the layout area information and the object area information, the leader portion generation unit 144 generates the leader illustration 323 being an illustration that associates the information part illustration 322 with the object area.

Thus, the information illustration 320 including the information part illustration 322 and the leader illustration 323 is generated.

After S144, the process proceeds to S145.

Figure 51:
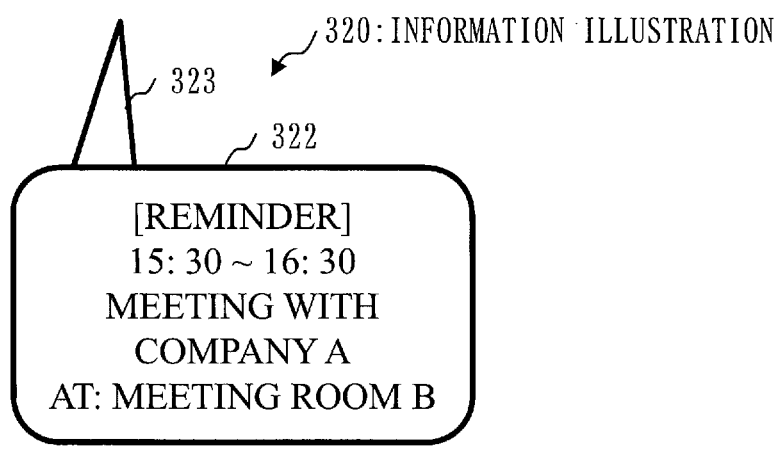
FIG. 51 is a diagram illustrating an example of an information illustration 320 according to Embodiment 9.

FIG. 51 is a diagram illustrating an example of the information illustration 320 according to Embodiment 9.

For example, the leader portion generation unit 144 generates an information illustration 320 as illustrated in FIG. 51 by generating the leader illustration 323.

The leader portion generation unit 144 may generate the leader illustration 323 integrally with the information part illustration 322 such that the information part illustration 322 and leader illustration 323 are seamless.

The shape of the leader illustration 323 is not limited to a triangle but may be an arrow or a simple line (straight line, curved line).

Where the distance between the object area and the layout area is less than the leader threshold, the leader portion generation unit 144 need not generate the leader illustration 323. Namely, where the layout area is near to the object area, the leader portion generation unit 144 need not generate the leader illustration 323. In this case, the information illustration 320 does not include a leader illustration 323.

Back to FIG. 48, the explanation resumes with S145.

In S145, the information illustration layout unit 145 generates an information image 329 in which the information illustration 320 is arranged in the layout area.

After S145, the process proceeds to S146.

Figure 52:
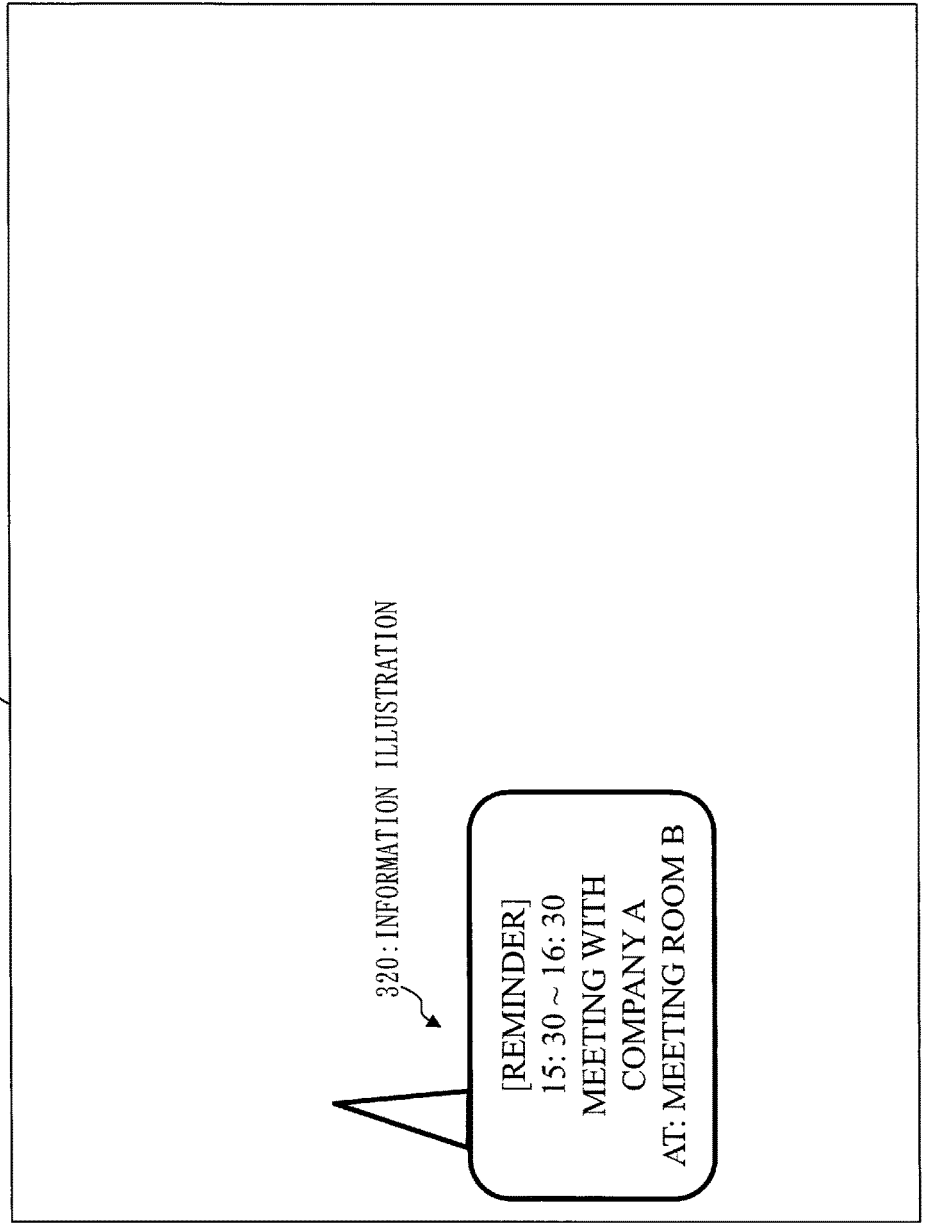
FIG. 52 is a diagram illustrating an example of an information image 329 according to Embodiment 9.

FIG. 52 is a diagram illustrating an example of the information image 329 according to Embodiment 9.

For example, the information illustration layout unit 145 generates an information image 329 in which the information illustration 320 is arranged as illustrated in FIG. 52.

Back to FIG. 48, the explanation resumes with S146.

In S146, the information image superimposing unit 146 generates the AR image 194 by superimposing the information image 329 over the photographic image 191.

For example, the information image superimposing unit 146 generates the AR image 194 (see FIG. 43) by superimposing the information image 329 (see FIG. 52) over the photographic image 191 (see FIG. 39).

After S146, the AR image generation process ends.

According to Embodiment 9, superimposing information can be superimposed and displayed over a photographic image to avoid an unusable area (for example, an unusable area where a significant window is shown).

Embodiment 10.

An embodiment will be described in which a new display area 201 is selected from a photographic image 191 while excluding a detected display area 201.

Matters that are not described in Embodiments 1 to 9 will mainly be described hereinafter. Matters whose description is omitted are equivalent to their counterparts in Embodiments 1 to 9.

Figure 53:
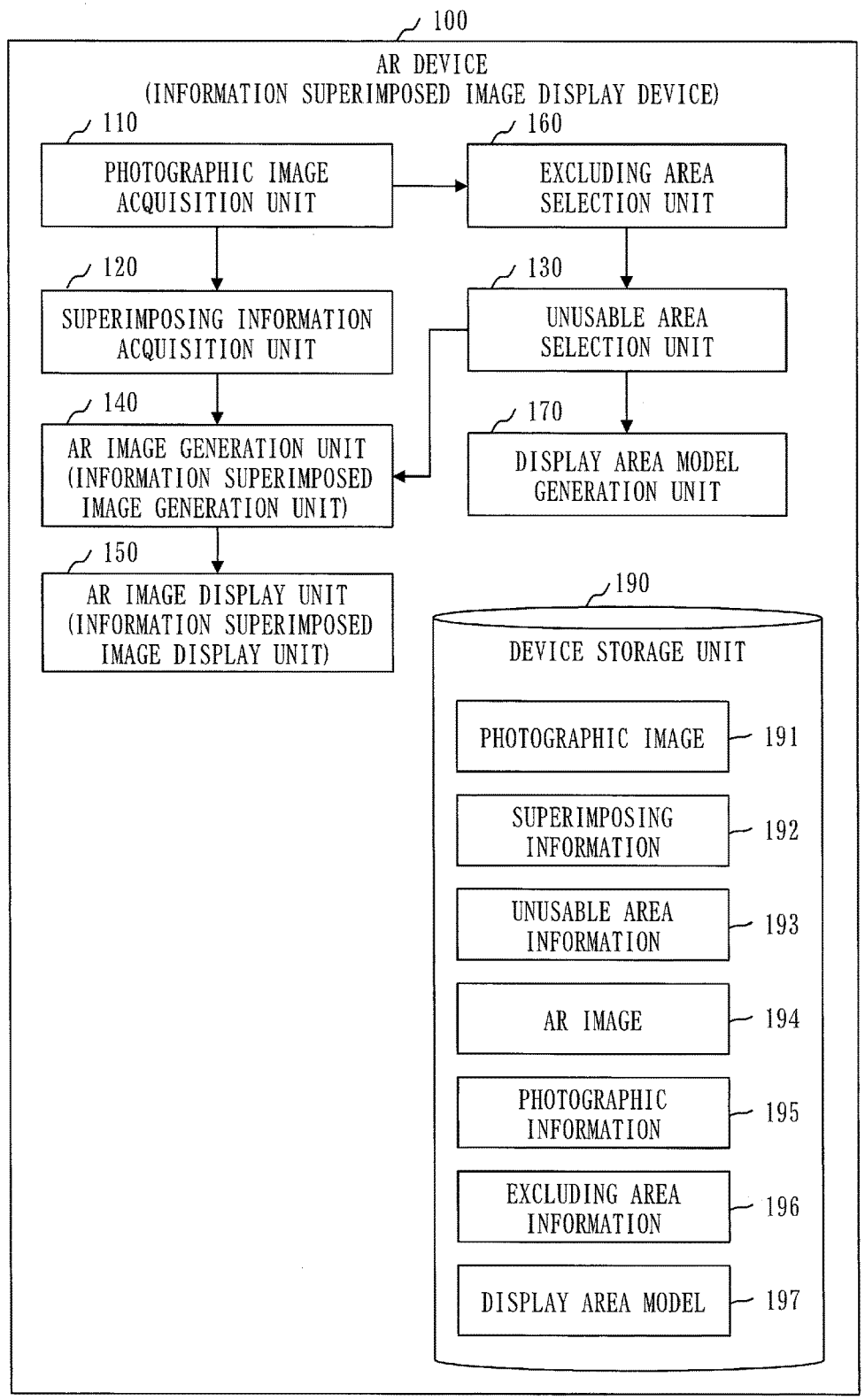
FIG. 53 is a functional configuration diagram of an AR device 100 according to Embodiment 10.

FIG. 53 is a functional configuration diagram of an AR device 100 according to Embodiment 10.

The functional configuration of the AR device 100 according to Embodiment 10 will be described with referring to FIG. 53. The functional configuration of the AR device 100 may be a configuration different from that in FIG. 53.

The AR device 100 is provided with an excluding area selection unit 160 and a display area model generation unit 170, in addition to the function described in Embodiment 6 (see FIG. 37).

Based on photographic information 195 and unusable area information 193, the display area model generation unit 170 generates a display area model 197 which expresses the display area 201 three-dimensionally. The display area model 197 is also called a three-dimensional model or three-dimensional planar model.

The photographic information 195 is information that includes the position information, orientation information, photographic range information, and so on of a camera of when the camera photographed the photographic image 191. The position information is information that indicates the position of the camera. The orientation information is information that indicates the orientation of the camera. The photographic range information is information that indicates a photographic range such as the angle of view or focal length. The photographic information 195 is acquired by a photographic image acquisition unit 110 together with the photographic image 191.

Based on the photographic information 195, the excluding area selection unit 160 selects the display area 201 indicated by the display area model 197 from a new photographic image 191. The selected display area 201 corresponds to an excluding area 398 to be excluded from the process of the unusable area selection unit 130.

The excluding area selection unit 160 generates excluding area information 196 indicating the excluding area 398.

An unusable area selection unit 130 excludes the excluding area 398 from the new photographic image 191 based on the excluding area information 196, selects a new unusable area 390 from the remaining image portion, and generates new unusable area information 193.

An AR image generation unit 140 generates an AR image 194 based on the excluding area information 196 and the new unusable area information 193.

Figure 54:
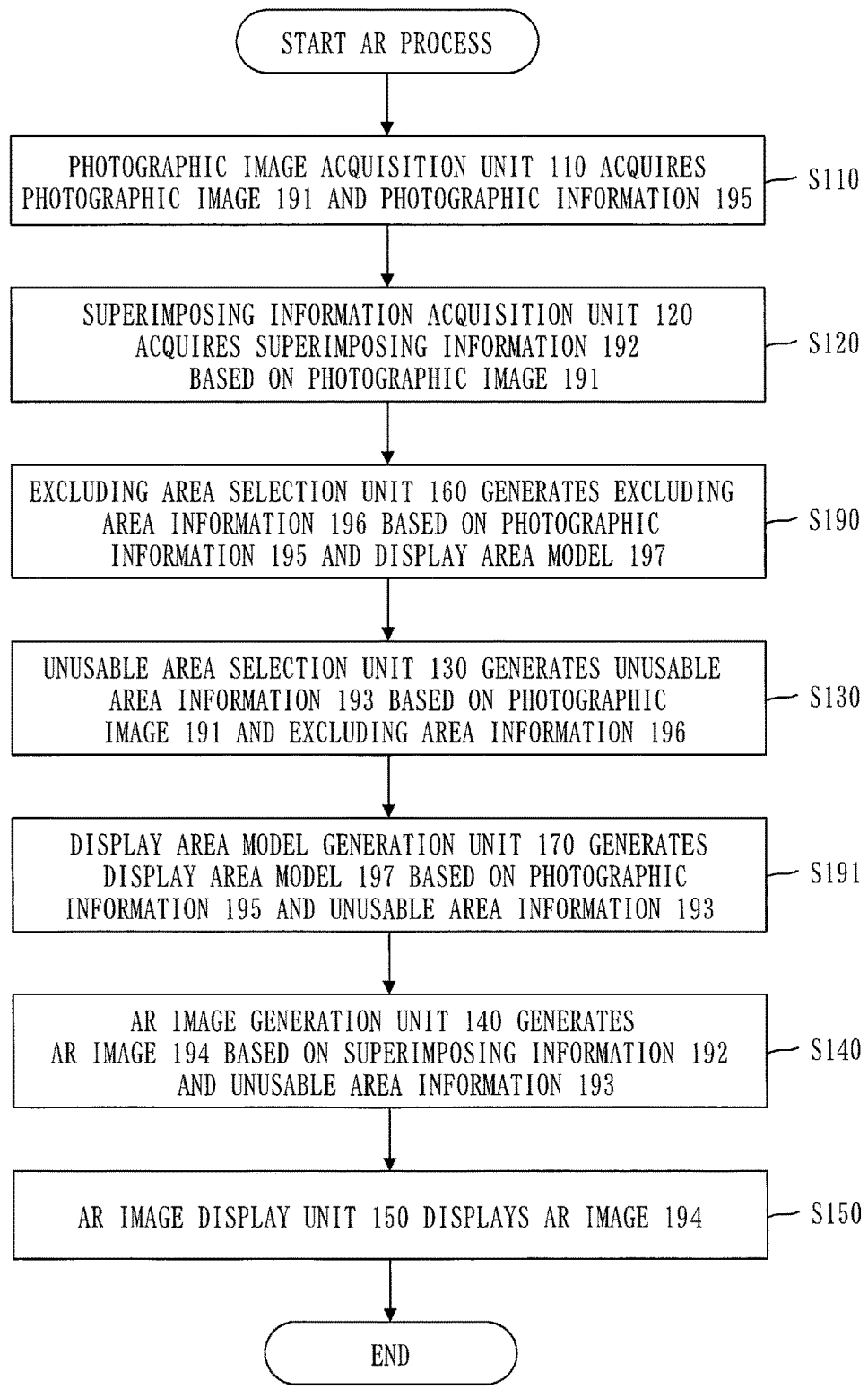
FIG. 54 is a flowchart illustrating an AR process of the AR device 100 according to Embodiment 10.

FIG. 54 is a flowchart illustrating an AR process of the AR device 100 according to Embodiment 10.

The AR process of the AR device 100 according to Embodiment 10 will be described with referring to FIG. 54. The AR process may be a process different from that in FIG. 54.

In S110, the photographic image acquisition unit 110 acquires the photographic image 191 in the same manner as in the other embodiments.

Note that the photographic image acquisition unit 110 acquires the photographic information 195 together with the photographic image 191.

For example, the photographic image acquisition unit 110 acquires the position information, orientation information, and photographic range information of a camera 808 of when the camera photographed the photographic image 191, from a GPS, a magnetic sensor, and the camera 808. The GPS and the magnetic sensor are examples of a sensor 810 provided to the AR device 100.

After S110, the process proceeds to S120.

In S120, the superimposing information acquisition unit 120 acquires the superimposing information 192 in the same manner as in the other embodiments.

After S120, the process proceeds to S190. S190 may be executed during a time period of between when S191 is executed and when S140 is executed.

In S190, the excluding area selection unit 160 generates the excluding area information 196 based on the photographic information 195 and the display area model 197.

After S190, the process proceeds to S130.

Figure 55:
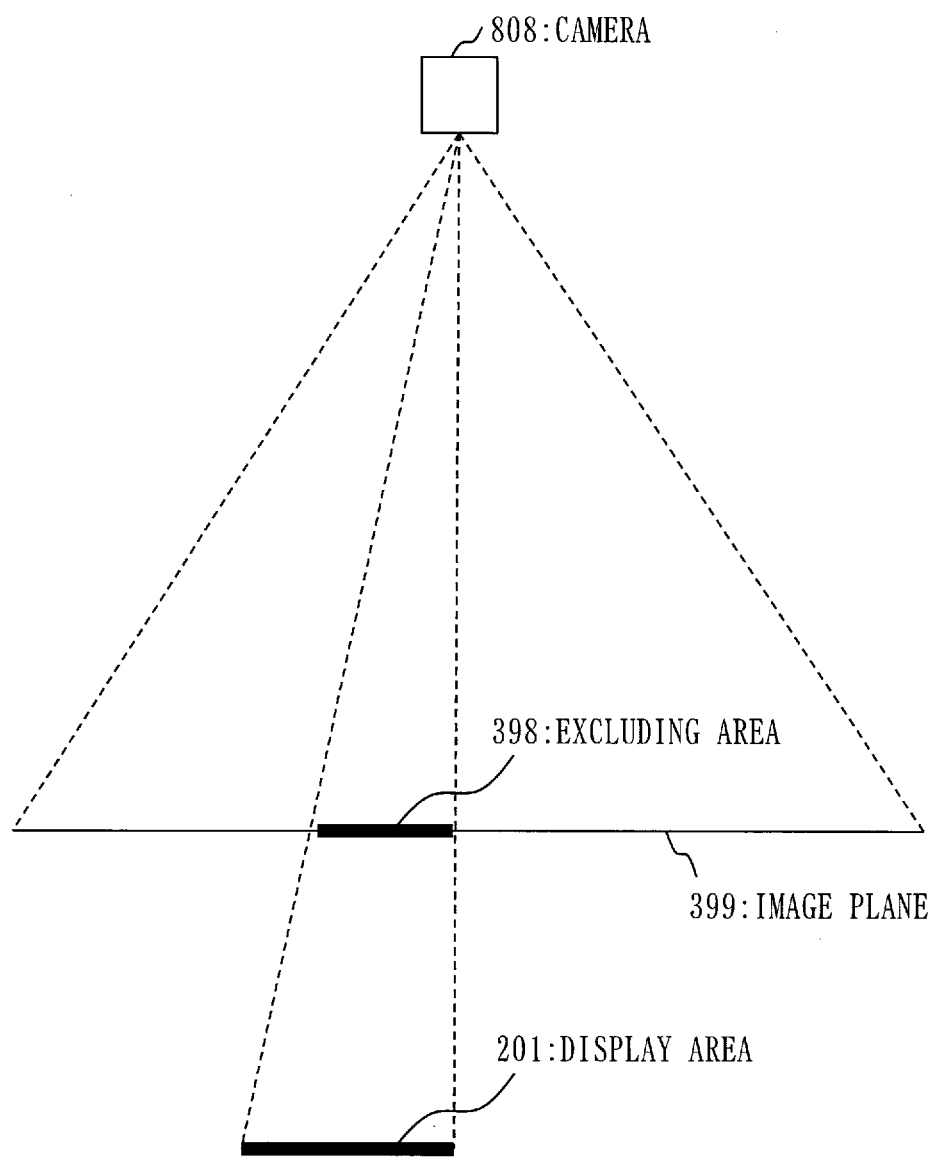
FIG. 55 is a diagram illustrating a positional relationship of an excluding area 398 according to Embodiment 10.

FIG. 55 is a diagram illustrating a positional relationship of the excluding area 398 according to Embodiment 10.

Referring to FIG. 55, the excluding area selection unit 160 generates an image plane 399 based on the position, orientation, and angle of view of the camera 808 indicated by the photographic information 195. The image plane 399 is a plane included in the photographic range of the camera 808. The photographic image 191 corresponds to the image plane 399 where the object is projected.

The excluding area selection unit 160 projects the display area 201 onto the image plane 399 based on the display area model 197.

Then, the excluding area selection unit 160 generates the excluding area information 196 which indicates, as an excluding area 398, the display area 201 projected onto the image plane 399.

Back to FIG. 54, the explanation resumes with S130.

In S130, the unusable area selection unit 130 generates the unusable area information 193 in the same manner as in the other embodiments.

Note that the unusable area selection unit 130 excludes the excluding area 398 from the photographic image 191 based on the excluding area information 196, selects the unusable area 390 from the remaining image portion, and generates the unusable area information 193 indicating the selected unusable area 390.

After S130, the process proceeds to S191.

In S191, based on the photographic information 195 and the unusable area information 193, the display area model generation unit 170 generates the display area model 197 which expresses three-dimensionally the display area 201 existing in the photographic range.

For example, the display area model generation unit 170 generates the display area model 197 in accordance with an SFM technique, using the current photographic information 195 and the last and preceding photographic information 195. SFM is a technique which, using a plurality of images, restores the three-dimensional shapes of the objects shown by the images and the positional relationships between the camera and the objects, simultaneously. SFM is an abbreviation of Structure from Motion.

For example, the display area model generation unit 170 generates the display area model 197 using the technique disclosed in Non-Patent Literature 1.

After S191, the process proceeds to S140.

In S140, the AR image generation unit 140 generates the AR image 194 based on the superimposing information 192 and the unusable area information 193, in the same manner as in the other embodiments.

After S140, the process proceeds to S150.

In S150, an AR image display unit 150 displays the AR image 194 in the same manner as in the other embodiments.

After S150, the AR process for one photographic image 191 ends.

According to Embodiment 10, a new display area 201 can be selected from the photographic image 191 to exclude the detected display area 201. Namely, the processing load can be reduced by treating the detected display area 201 as falling outside the processing target.

Embodiment 11.

An embodiment will be described in which an information processing device 200 deletes markers 202 detected by an AR device 100, from a display area 201.

Matters that are not described in Embodiments 1 to 10 will mainly be described hereinafter. Matters whose description is omitted are equivalent to their counterparts in Embodiments 1 to 10.

Figure 56:
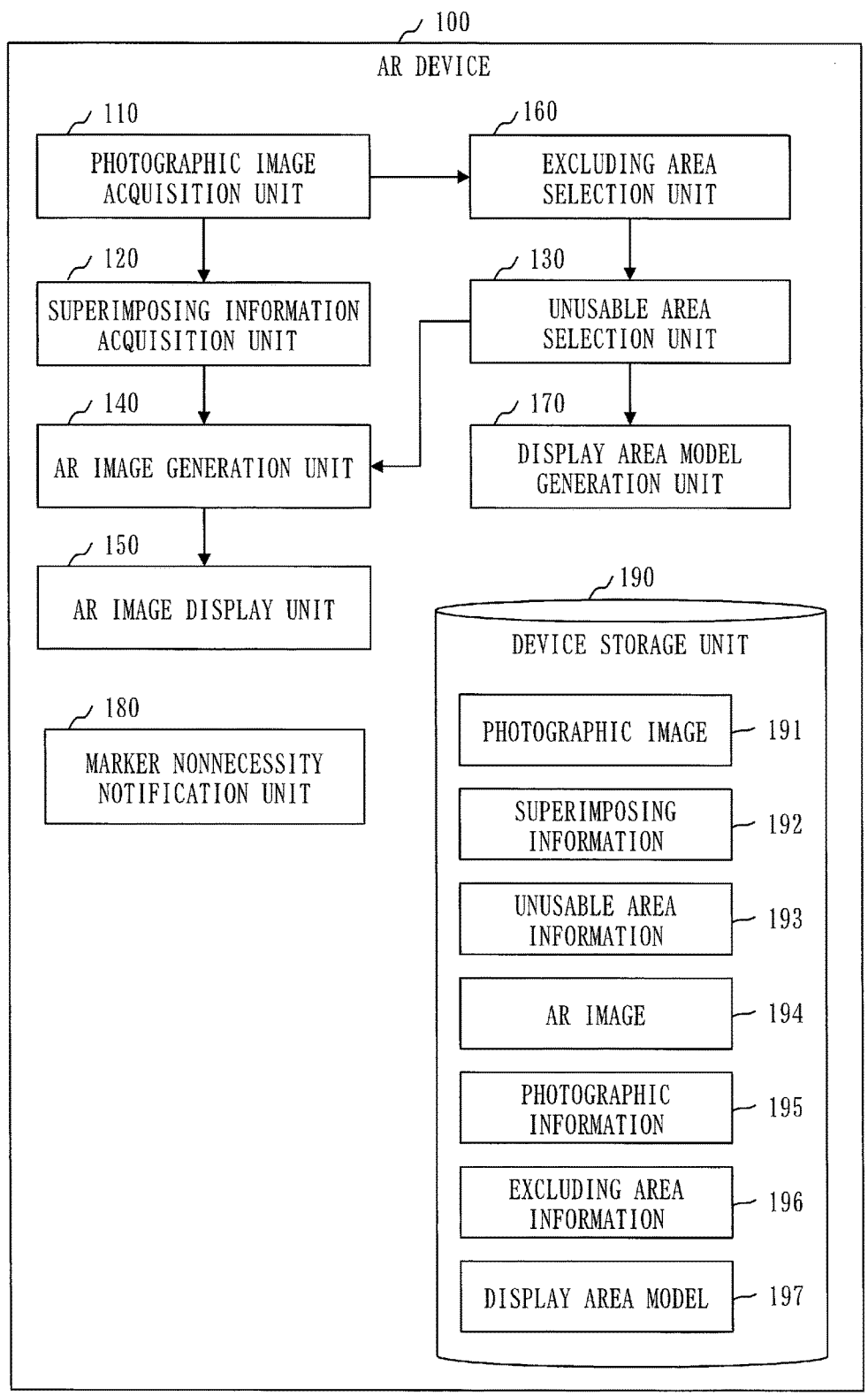
FIG. 56 is a functional configuration diagram of an AR device 100 according to Embodiment 11.

FIG. 56 is a functional configuration diagram of the AR device 100 according to Embodiment 11.

The functional configuration of the AR device 100 according to Embodiment 11 will be described with referring to FIG. 56. The functional configuration of the AR device 100 may be different from that of FIG. 56.

The AR device 100 is provided with a marker nonnecessity notification unit 180 in addition to the function described in Embodiment 10 (see FIG. 53).

After a display area model generation unit 170 generates a display area model 197, the markers 202 displayed in the display area 201 are no longer needed by the AR device 100.

Hence, after the display area model generation unit 170 generates the display area model 197, the marker nonnecessity notification unit 180 transmits a marker nonnecessity notification to the information processing device 200.

Figure 57:
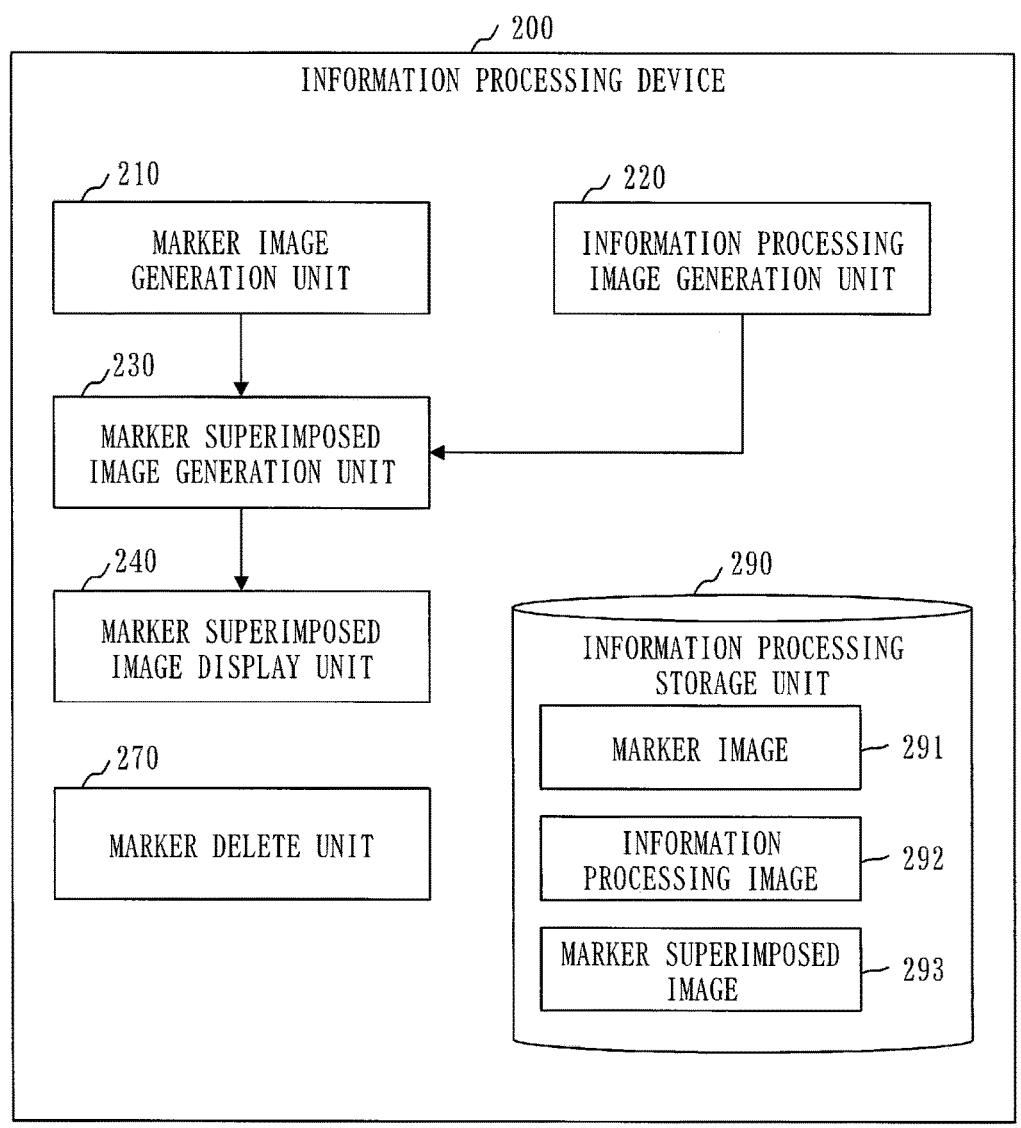
FIG. 57 is a functional configuration diagram of an information processing device 200 according to Embodiment 11.

FIG. 57 is a functional configuration of the information processing device 200 according to Embodiment 11.

The functional configuration of the information processing device 200 according to Embodiment 11 will be described with referring to FIG. 57. The functional configuration of the information processing device 200 may be different from that of FIG. 57.

The information processing device 200 is provided with a marker delete unit 270 in addition to the function described in Embodiment 1 (see FIG. 2).

The information processing device 200 may be provided with a window information acquisition unit 250 (see FIG. 17), a significant window selection unit 251 (see FIG. 22), a window management unit 252 (see FIG. 22), and a window merging unit 260 (see FIGS. 27 and 35), as described in the other embodiments.

After receiving the marker unnecessary notification transmitted from the AR device 100, the marker delete unit 270 deletes the markers 202 from a marker superimposed image 293.

Namely, the marker delete unit 270 displays an information processing image 292 instead of the marker superimposed image 293.

A plurality of AR devices 100 each displaying a photographic image showing an information processing device 200 may possibly exist around the information processing device 200.

In view of this, the marker delete unit 270 may delete the markers 202 after receiving the marker unnecessary notifications from all the AR devices 100 existing around the information processing device 200. For example, the marker delete unit 270 deletes the markers 202 after receiving marker unnecessary notifications from all the AR devices 100 existing within the communication range of wireless communication.

According to Embodiment 11, the information processing device 200 can delete the markers 202 that become unnecessary, so that the visibility of the display area 201 is improved.

Each embodiment is an example of the embodiment of the information processing device 200 and AR device 100.

Namely, the information processing device 200 and AR device 100 need not be provided with some of the constituent elements described in each embodiment. The information processing device 200 and AR device 100 may be provided with a constituent element not described in each embodiment. Each of the information processing device 200 and AR device 100 may be a combination of some or all of the constituent elements of each embodiment.

The processing procedure described in each embodiment with using a flowchart and so on is an example of the processing procedure of a method and program according to the embodiment. The method and program according to each embodiment may be implemented by a processing procedure that is partly different from the processing procedure described in the embodiment.

In each embodiment, "unit" may be replaced with "process", "stage", "program", and "device". In each embodiment, the arrows in the drawing mainly express the flow of data or process.

REFERENCE SIGNS LIST

100: AR device; 101: display area; 109: AR system; 110: photographic image acquisition unit; 120: superimposing information acquisition unit; 121: object detection unit; 122: object identification unit; 123: superimposing information collection unit; 124: unusable area analyzing unit; 130: unusable area selection unit; 140: AR image generation unit; 141: information image generation unit; 142: information portion generation unit; 143: information portion layout checking unit; 144: leader portion generation unit; 145: information illustration layout unit; 146: information image superimposing unit; 150: AR image display unit; 160: excluding area selection unit; 170: display area model generation unit; 180: marker nonnecessity notification unit; 190: device storage unit; 191: photographic image; 192: superimposing information; 193: unusable area information; 194: AR image; 195: photographic information; 196: excluding area information; 197: display area model; 200: information processing device; 201: display area; 202: marker; 203: black area; 204: white area; 205: perpendicular vector; 206: extension line; 207: diagonal vector; 210: marker image generation unit; 220: information processing image generation unit; 230: marker superimposed image generation unit; 240: marker superimposed image display unit; 250: window information acquisition unit; 251: significant window selection unit; 252: window management unit; 260: window merging unit; 270: marker delete unit; 290: information processing storage unit; 291: marker image; 292: information processing image; 293: marker superimposed image; 294: window information; 295: significance degree table; 296: significant window list; 297: merged information; 310: clock; 320: information illustration; 321: information illustration; 322: information part illustration; 323: leader illustration; 329: information image; 340: window; 350: merged area; 390: unusable area; 394: closed area; 398: excluding area; 399: image plane; 801: bus; 802: memory; 803: storage; 804: communication interface; 805: CPU; 806: GPU; 807: display device; 808: camera; 809: user interface device; 810: sensor

The invention claimed is:

1. An information processing device comprising
a marker display unit to display in a display area of a display device, a marker which is determined to cause a computer having acquired a photographic image showing the display device having the display area, to select the display area from the photographic image,
the marker having a shape that specifies a direction where a central portion of the display area exists and being arranged at a corner of the display area or on a side of the display area;
a marker display unit to display in the display area of the display device the marker which is determined to cause the computer having acquired the photographic image showing the display device having the display area, to select the display area from the photographic image; and
a window generation unit to generate a window to be displayed in the display area,
wherein the marker display unit displays the marker in a window area to lie along an edge of the window area where the window generated by the window generation unit is displayed.

2. The information processing device according to claim 1, wherein
the display area is a polygonal area, and
the information processing device comprising a marker generation unit to generate a marker to be arranged at a corner of the display area, as a corner marker.

3. The information processing device according to claim 2, wherein the marker generation unit generates a marker involving an L-shaped illustration and a polygonal illustration, as the corner marker, the L-shaped illustration being colored with a first color and in contact with a corner of the display area, the polygonal illustration having two sides in contact with the L-shaped illustration and being colored with a second color.

4. The information processing device according to claim 2, wherein the marker generation unit generates a two-dimensional code as the corner marker, the two-dimensional code being arranged in any one corner of the display area and including information that specifies a corner where the two-dimensional code will be arranged.

5. The information processing device according to claim 1, wherein
the display area is a polygonal area, and
the information processing device comprising a marker generation unit to generate a marker to be arranged along a side of the display area, as a side marker.

6. The information processing device according to claim 5, wherein the marker generation unit generates a marker involving a linear illustration and a polygonal illustration, as the side marker, the linear illustration being colored with a first color and in contact with the side of the display area, the polygonal illustration having a side in contact with the linear illustration and being colored with a second color.

7. The information processing device according to claim 5, wherein the marker generation unit generates a two-dimensional code as the side marker, the two-dimensional code being in contact with any one side of the display area and including information that specifies the contact side.

8. The information processing device according to claim 1, comprising:
a marker generation unit to determine the number of the markers and positions where the markers are to be arranged, based on a size of the display area.

9. The information processing device according to claim 1, comprising a significant window selection unit,
wherein the window generation unit generates a plurality of windows being correlated to significance degrees,
wherein the significant window selection unit selects at least one window from among the plurality of windows generated by the window generation unit, as a significant window based on the significance degrees of the plurality of windows, and
wherein the marker display unit displays the marker to the window area, the window area being an area where the significant window selected by the significant window selection unit is displayed.

10. The information processing device according to claim 1, comprising a marker generation unit to generate, as the marker, an illustration indicating significance degree of the window generated by the window generation unit.

11. The information processing device according to claim 1, comprising:
a window generation unit to generate a plurality of windows to be displayed in the display area; and
a window merging unit to calculate a merged area involving window areas where the plurality of windows generated by the window generation units are displayed individually,
wherein the marker display unit displays the marker to the merged area to lie along an edge of the merged area calculated by the window merging unit.

12. The information processing device according to claim 1, comprising a marker delete unit to delete the marker from the display area of the display device, when a marker nonnecessity notification transmitted from the computer is received.

13. An information superimposed image display device comprising:
- a photographic image acquisition unit to acquire a photographic image showing an information processing display device which has an information processing display area where a marker serving as a sign is displayed;
- a superimposing information acquisition unit to acquire, as superimposing information, information which is to be superimposed over the photographic image acquired by the photographic image acquisition unit;
- an unusable area selection unit to select the information processing display area from the photographic image, as an unusable area based on the marker shown in the photographic image acquired by the photographic image acquisition unit;
- an information superimposed image generation unit to generate an information superimposed image by superimposing the superimposing information acquired by the superimposing information acquisition unit over the photographic image to avoid the unusable area selected by the unusable area selection unit; and
- an information superimposed image display unit to display the information superimposed image generated by the information superimposed image generation unit, to a main body display area of a main body display device having the main body display area as a display area,
- wherein the information processing display device displays in a window area displaying a window in the information processing display area an illustration indicating a significance degree of the window, as the marker,
- wherein the superimposing information acquisition unit acquires significance degree of the superimposing information, and
- wherein the information superimposed image generation unit checks whether the superimposing information is to be superimposed to avoid the unusable area selected based on the marker, based on the significance degree of the superimposing information and significance degree of the window indicated by the marker.

14. A non-transitory computer readable recording medium recorded with a marker display program that causes a computer to execute
- a marker display process of displaying in a display area of a display device, a marker which is determined as a sign for the display area in order to cause the computer having acquired a photographic image showing the display device having the display area, to select the display area from the photographic image,
- the marker having a shape that specifies a direction where a central portion of the display area exists and being arranged at a corner of the display area or on a side of the display area;
- a marker display process of displaying in the display area of the display device, the marker which is determined to cause the computer having acquired the phot graphic image showing the display device having the display area to select the display area from the photographic image: and
- a window generation process of generating a window to be displayed in the display area,
- wherein the marker display process displays the marker in a window to lie along a edge of the window area where the window generated by the window generation process is displayed.

15. A non-transitory computer readable recording medium recorded with an information superimposed image display program that causes a computer to execute:
- a photographic image acquisition process of acquiring a photographic image showing an information processing display device which has an information processing display area where a marker serving as a sign is displayed;
- a superimposing information acquisition process of acquiring, as superimposing information, information which is to be superimposed over the photographic image acquired by the photographic image acquisition process;
- an unusable area selection process of selecting the information processing display area from the photographic image, as an unusable area based on the marker shown in the photographic image acquired by the superimposing information acquisition process;
- an information superimposed image generation process of generating an information superimposed image by superimposing the superimposing information acquired by the superimposed information acquisition process over the photographic image to avoid the unusable area selected by the unusable area selection process; and
- an information superimposed image display process of displaying the information superimposed image generated by the information superimposed image display process to a main body display area of a main body display device having the main body display area as a display area,
- wherein the information processing display devise displays, in a window area displaying a window in the information processing display area, an illustration indicating a significance degree of the window, as the marker,
- wherein the superimposing information acquisition unit acquires significance degree of the superimposing information, and
- wherein the information superimposed image, generation unit checks whether the superimposing information is to be superimposed to avoid the unusable area selected based on the marker on the significance degree of the superimposing information and significance degree of the window indicated by the marker.

16. A marker display method, by a marker display unit, comprising
- displaying in a display area of a display device, a marker which is determined in order to cause a computer having acquired a photographic image showing the display device having the display area, to select the display area from the photographic image,
- the marker having a shape that specifies a direction where a central portion of the display area exists and being arranged at a corner of the display area or on a side of the display area;
- a marker display process of displaying in the display area of the display device, the marker which is determined to cause the computer having acquired the photographic image showing the display device having the display area, to select the display area from the photographic image; and
- a window generation process of generating a window to be displayed in the display area,
- wherein the marker display process displays the marker in a window area to lie along an edge of the window area where the window generated by the window generation process is displayed.

17. An information superimposed image display method comprising:
- acquiring, by a photographic image acquisition unit, a photographic image showing an information processing display device which has an information processing display area where a marker serving as a sign is displayed;
- acquiring, by a superimposing information acquisition unit, as superimposing information, information which is to be superimposed over the photographic image acquired by the photographic image acquisition unit;
- selecting, by an unusable area selection unit, the information processing display area from the photographic image, as an unusable area based on the marker shown in the photographic image acquired by the superimposing information acquisition unit:
- generating, by an information superimposed image generation unit, an information superimposed image by superimposing the superimposing information acquired by the superimposed information acquisition unit over the photographic image to avoid the unusable area selected by the unusable area selection unit; and
- displaying, by an information superimposed image display unit, the information superimposed image generated by the information superimposed image display unit to a main body display area of a main body display device having the main body display area as a display area, wherein the information processing display devise displays, in the window area displaying a window in the information processing display area, an illustration indicating a significance degree of the window, as the marker, wherein the superimposing information acquisition unit acquires significance degree of the superimposing information, and wherein the information superimposed image generation unit checks whether the superimposing information is to be superimposed to avoid the unusable area selected based on the marker, based on the significance degree of the superimposing information and significance degree of the window indicated by the marker.

* * * * *